US012239285B2

(12) United States Patent
Lee et al.

(10) Patent No.: US 12,239,285 B2
(45) Date of Patent: Mar. 4, 2025

(54) STATION DEVICE AND OPERATING METHOD OF STATION DEVICE

(71) Applicant: SAMSUNG ELECTRONICS CO., LTD., Suwon-si (KR)

(72) Inventors: Seongu Lee, Suwon-si (KR); Seehyun Kim, Suwon-si (KR); Jeonghee Cho, Suwon-si (KR); Sanghyuk Park, Suwon-si (KR); Kiyong Lee, Suwon-si (KR); Yeongju Lee, Suwon-si (KR); Jaeshik Jeong, Suwon-si (KR); Jiwon Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/326,016

(22) Filed: May 31, 2023

(65) Prior Publication Data
US 2023/0380647 A1 Nov. 30, 2023

Related U.S. Application Data

(63) Continuation of application No. PCT/KR2023/007188, filed on May 25, 2023.

(30) Foreign Application Priority Data

May 31, 2022 (KR) .................. 10-2022-0067180
Dec. 5, 2022 (KR) .................. 10-2022-0168158

(51) Int. Cl.
A47L 9/28 (2006.01)
A47L 9/10 (2006.01)
(Continued)

(52) U.S. Cl.
CPC ............. *A47L 9/2873* (2013.01); *A47L 9/106* (2013.01); *A47L 9/149* (2013.01); *A47L 9/2821* (2013.01);
(Continued)

(58) Field of Classification Search
CPC ........ A47L 9/2873; A47L 9/106; A47L 9/149; A47L 9/2821; A47L 9/2842;
(Continued)

(56) References Cited

U.S. PATENT DOCUMENTS 7,779,504 B2  8/2010  Lee et al.
7,891,045 B2  2/2011  Kim et al.
(Continued)

FOREIGN PATENT DOCUMENTS

JP  2016182301 A  10/2016
JP  2020142066 A  9/2020
(Continued)

OTHER PUBLICATIONS

International Search Report mailed Aug. 30, 2023 for PCT/KR2023/007188.

*Primary Examiner* — David Redding
(74) *Attorney, Agent, or Firm* — CANTOR COLBURN LLP

(57) ABSTRACT

An operating method of a station device for discharging dust from a cordless vacuum cleaner includes detecting occurrence of an event requesting discharging dust from a dustbin included in the cordless vacuum cleaner to the station device, and performing a dust discharge operation for discharging dust in the dustbin to a collector of the station device based on detecting of the occurrence of the event. The performing a dust discharge operation includes transmitting, to the cordless vacuum cleaner via short-range wireless communication, a control signal for operating a first suction motor of the cordless vacuum cleaner, and operating a second suction motor of the station device in cooperation with the first suction motor.

14 Claims, 29 Drawing Sheets

(51) Int. Cl.
*A47L 9/14* (2006.01)
*A47L 9/30* (2006.01)

(52) U.S. Cl.
CPC ........... *A47L 9/2842* (2013.01); *A47L 9/2857* (2013.01); *A47L 9/2889* (2013.01); *A47L 9/2894* (2013.01); *A47L 9/30* (2013.01); *A47L 2201/024* (2013.01)

(58) Field of Classification Search
CPC .... A47L 9/2857; A47L 9/2889; A47L 9/2894; A47L 9/30; A47L 5/24; A47L 5/30; A47L 7/00; A47L 9/22; A47L 9/28; A47L 9/2884; A47L 2201/024; H02J 7/00
See application file for complete search history.

(56) References Cited

U.S. PATENT DOCUMENTS

| | | | |
|---|---|---|---|
| 9,027,199 | B2 | 5/2015 | Jung et al. |
| 11,357,372 | B2 | 6/2022 | Buening et al. |
| 11,357,373 | B2 | 6/2022 | Buening et al. |
| 11,503,969 | B2 | 11/2022 | Cho et al. |
| 2020/0187736 | A1 | 6/2020 | Jeong et al. |
| 2021/0282610 | A1 | 9/2021 | Cho et al. |
| 2022/0287524 | A1 | 9/2022 | Cho et al. |
| 2023/0012532 | A1 | 1/2023 | Kim et al. |
| 2023/0111023 | A1 | 4/2023 | Cho et al. |
| 2023/0146588 | A1 | 5/2023 | Kim et al. |
| 2023/0199637 | A1 | 6/2023 | Dou et al. |

FOREIGN PATENT DOCUMENTS

| | | |
|---|---|---|
| JP | 2020142073 A | 9/2020 |
| KR | 1996-0006870 A | 3/1996 |
| KR | 10-2007-0074146 A | 7/2007 |
| KR | 10-1204440 B1 | 11/2012 |
| KR | 10-2020-0073677 A | 6/2020 |
| KR | 10-2166773 B1 | 10/2020 |
| KR | 10-2021-0002057 A | 1/2021 |
| KR | 102208334 B1 | 1/2021 |
| KR | 10-2021-0058786 A | 5/2021 |
| KR | 10-2315412 B1 | 10/2021 |
| KR | 10-2315416 B1 | 10/2021 |
| WO | 2022048510 A1 | 3/2022 |

FIG. 14

| CONDITION | | A (1410) | B (1420) | C (1430) | D (1440) | E (1450) |
|---|---|---|---|---|---|---|
| SUCTION MOTOR | #1 | OFF | ON | OFF | PWM ON | PWM ON |
| | #2 | ON | ON | PWM ON | ON | PWM ON |
| Air Flow | | | | | | |
| AMOUNT OF AIRFLOW | α | 70% | 140% | 70%→0%→70%→… | 140%→70%→140%→… | 140%→0%→70%→… |
| | β | 30% | -20% | 30%→0%→30%→… | -20%→30%→-20%→… | -20%→0%→30%→… |
| SUCTION FORCE | | Normal | INCREASE | Normal, CHANGE IN FLOW PATH | INCREASE, CHANGE IN FLOW PATH | MAXIMAL INCREASE, CHANGE IN FLOW PATH |

FIG. 15A

| OPERATION MODE (1510) | SUCTION FORCE GENERATION PATTERN (1520) | OPERATION SEQUENCE (1530) |
|---|---|---|
| A MODE (1511) | PATTERN 1 (1521) | A → B → C → D → B → D → A → C → ... |
| B MODE (1512) | PATTERN 2 (1522) | A → B → C → E → B → D → E → C → ... |
| C MODE (1513) | PATTERN 3 (1523) | A → B → C → E' → E'' → D → E''' → C → ... |
| ... | ... | ... |

FIG. 16
| CONDITION | | A-1 | A-2 | B-1 | B-2 | B-3 |
|---|---|---|---|---|---|---|
| SUCTION MOTOR | #1 | OFF | OFF | ON (20W) | ON (90W) | ON (90W) |
| | #2 | ON (250W) → ON (100W) | ON (100W) | ON (250W) | ON (250W) | ON (100W) |
| Air Flow | | 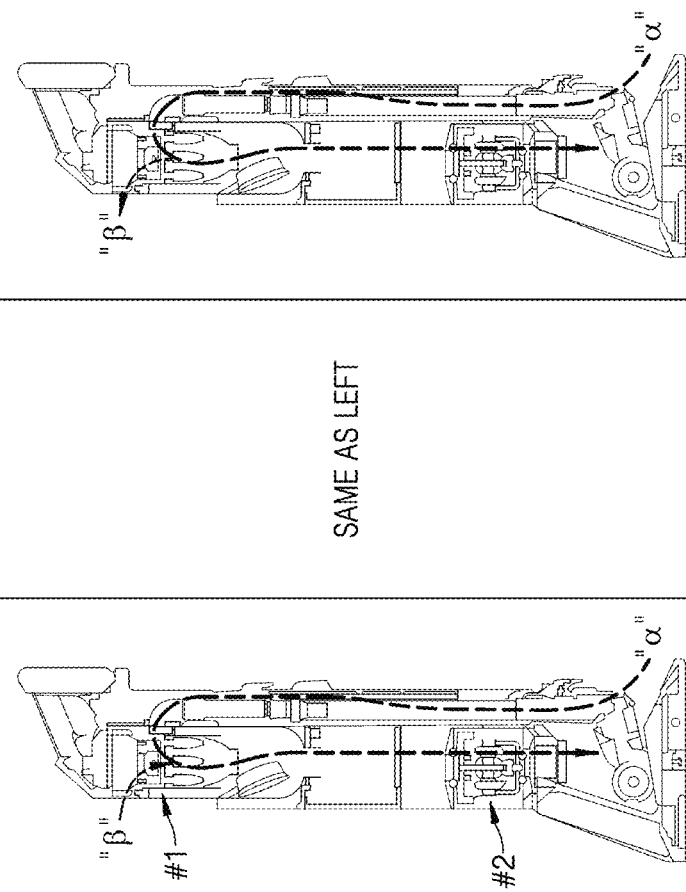 | SAME AS LEFT |  | SAME AS LEFT | SAME AS LEFT |
| AMOUNT OF AIRFLOW | α | 70% | 30% | 140% | 200% | 110% |
| | β | 30% | 10% | -20% | -40% | -60% |
| SUCTION FORCE | | REFERENCE (A-1) | DECREASE COMPARED TO (A-1) REFERENCE | REFERENCE (B-1) | INCREASE COMPARED TO (B-1) REFERENCE | DECREASE COMPARED TO (B-1) REFERENCE |
| | | 1601 | 1602 | 1603 | 1604 | 1605 |

FIG. 17

| OPERATION MODE (1710) | SUCTION FORCE GENERATION PATTERN (1720) | OPERATION SEQUENCE |
|---|---|---|
| A MODE (1711) | PATTERN 1 (1721) | A-1 → B-1 → C → D → B-2 → D → A-2 → C → ⋯ |
| B MODE (1712) | PATTERN 2 (1722) | A-1 → A-2 → B-1 → B-2 → C → E → B-3 → D → E → C → ⋯ |
| C MODE (1713) | PATTERN 3 (1723) | A-1 → B-1 → C → E' → E'' → D → E''' → C → ⋯ |
| ⋯ | ⋯ | ⋯ |

STATION DEVICE AND OPERATING METHOD OF STATION DEVICE

TECHNICAL FIELD

An embodiment of the disclosure relates to a station device for performing a dust discharge operation, and an operating method of the station device.

BACKGROUND ART

A cordless cleaner is a type of cleaner which uses a chargeable battery embedded in the cleaner and does not need to connect to an outlet. The cordless vacuum cleaner may include a suction motor to generate a suction force, thereby collecting dust by sucking up air with foreign substances such as dust from a cleaner head (brush) due to the suction force generated by the suction motor, and separating the sucked-up foreign substances from the air.

Recently, not only the cordless vacuum cleaner but also a function of a station device to store the cordless vacuum cleaner has been updated. The station device serves to store the cordless vacuum cleaner and charge the battery of the cordless vacuum cleaner and further provides a function of discharging collected dust in a dustbin of the cordless vacuum cleaner. However, as various types of dust are collected in the dustbin of the cordless vacuum cleaner, and due to the content (combination) of the dust or an inner structure of the dustbin, it is practically not possible to empty 100% of the dust from the dustbin. Therefore, there are various ongoing studies to improve a dust discharging rate.

SUMMARY

According to an embodiment of the disclosure, a station device includes a communication interface configured to communicate with a cordless vacuum cleaner including a first suction motor, a second suction motor configured to generate a suction force for sucking up dust in a dustbin included in the cordless vacuum cleaner, a collector configured to collect dust discharged from the dustbin, and at least one processor configured to control a dust discharge operation for discharging the dust in the dustbin to the collector. The at least one processor is configured to, based on detection of occurrence of an event requesting dust discharging from the dustbin, transmit, to the cordless vacuum cleaner via the communication interface, a control signal for operating the first suction motor of the cordless vacuum cleaner for the dust discharge operation. The at least one processor is configured to operate the second suction motor in cooperation with the first suction motor for the dust discharge operation.

According to an embodiment of the disclosure, an operating method of a station device for discharging dust from a cordless vacuum cleaner includes detecting occurrence of an event requesting discharging dust from a dustbin included in a cordless vacuum cleaner, and performing a dust discharge operation for discharging dust in the dustbin to a collector of the station device based on detecting of the occurrence of the event. The performing the dust discharge operation for discharging dust includes transmitting, to the cordless vacuum cleaner via short-range wireless communication, a control signal for operating a first suction motor of the cordless vacuum cleaner, and operating a second suction motor of the station device in cooperation with the first suction motor.

BRIEF DESCRIPTION OF DRAWINGS

FIG. 14 illustrates various operation conditions for dust discharging according to an embodiment of the disclosure.

FIG. 15A illustrates a suction force generation pattern corresponding to a preset operation mode according to an embodiment of the disclosure.

FIG. 16 illustrates various operation conditions according to a change in a suction force level, according to an embodiment of the disclosure.

FIG. 17 illustrates a suction force generation pattern corresponding to a preset operation mode, according to an embodiment of the disclosure.

DETAILED DESCRIPTION

Figure 1:
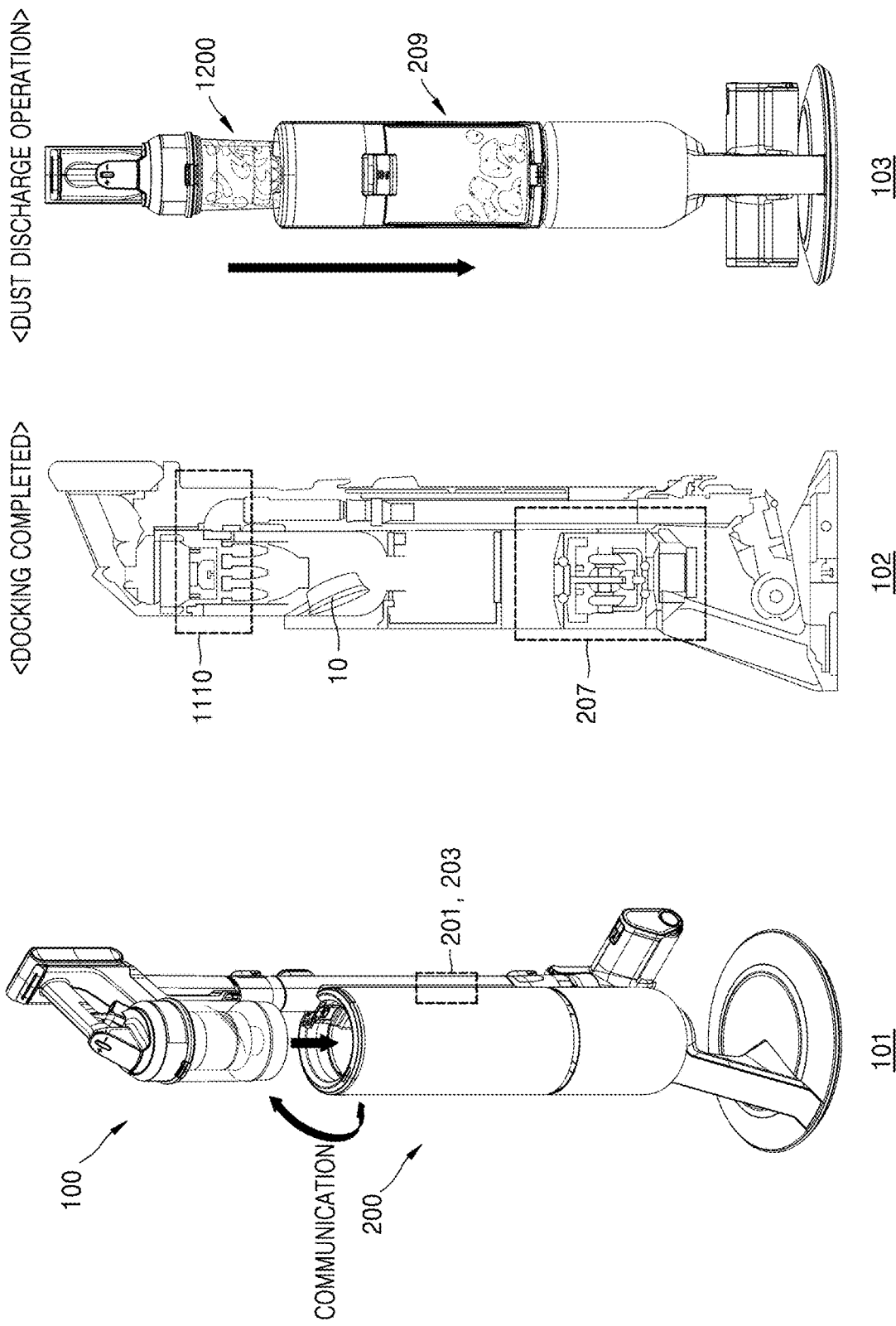
FIG. 1 illustrates a vacuum cleaner system according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

All terms including descriptive or technical terms which are used in the disclosure should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b or c" or "at least one selected from a, b and c" indicates only a, only b, only c, both a and b, both a and c, both b and c, all of a, b, and c, or variations thereof.

Throughout the disclosure, when a part "includes" or "comprises" an element, unless there is a particular description contrary thereto, the part may further include other elements, not excluding the other elements. As used in the disclosure, the term "unit" or "module" denotes an entity for performing at least one function or operation, and may be implemented as hardware, software, or a combination of hardware and software.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 illustrates a vacuum cleaner system according to an embodiment of the disclosure.

Referring to FIG. 1, the vacuum cleaner system according to an embodiment of the disclosure may include a cordless vacuum cleaner 100 and a station device 200. However, one or more elements shown in FIG. 1 may be omitted. The vacuum cleaner system may be embodied with more elements than the elements shown in FIG. 1 or may be embodied with fewer elements than the shown elements. For example, the vacuum cleaner system may further include a server device (not shown) and a user terminal (not shown). The vacuum cleaner system further including the server device and the user terminal will be described in detail with reference to FIG. 6 below.

The cordless vacuum cleaner 100 may have a chargeable battery embedded therein, and may refer to a vacuum cleaner that operates in a state not connecting a power cord to an outlet for cleaning. A user may have a brush device (cleaner head) suck up dust or foreign substances (e.g.: dust, hair, garbage) from a cleaning-target surface, by moving back and forth the cordless vacuum cleaner 100 by using a handle mounted at a cleaner body. The foreign substances sucked up from the cleaning-target surface via the brush device may be collected in a dustbin 1200 (also referred to as the dust collector bin) of the cleaner body. The cordless vacuum cleaner 100 may include a suction motor 1110 to move the dust or foreign substances to a space (e.g., the dustbin 1200) inside the cordless vacuum cleaner 100. Hereinafter, for convenience of descriptions, the suction motor 1110 of the cordless vacuum cleaner 100 may be expressed as the first suction motor 1110. The cordless vacuum cleaner 100 may include a communication interface for communication with the station device 200. For example, the cordless vacuum cleaner 100 may transceive data with the station device 200 via a wireless personal area network (WPAN). A configuration of the cordless vacuum cleaner 100 will be described in detail with reference to FIGS. 2 to 4 below.

The station device 200 may be a device for dust discharging from the cordless vacuum cleaner 100, charging the battery of the cordless vacuum cleaner 100, or storage of the cordless vacuum cleaner 100. The station device 200 may be expressed as a clean station. According to an embodiment of the disclosure, the station device 200 may perform communication with the cordless vacuum cleaner 100 or the server device via a network. For example, the station device 200 may transceive data with the cordless vacuum cleaner 100 via a WPAN without accessing an access point (AP). The station device 200 may transceive data with the server device via an AP that connects a local area network (LAN) to a wide area network (WAN), where the station device 200 is connected to the LAN and the server device is connected to the WAN. For example, the station device 200 may be connected to the cordless vacuum cleaner 100 via Bluetooth Low Energy (BLE) communication and may be connected to the server device via Wi-Fi™ (IEEE 802.11) communication, but the disclosure is not limited thereto.

According to an embodiment of the disclosure, the station device 200 may include a communication interface 201, at least one processor 203, a suction motor 207 (hereinafter, also referred to as 'second suction motor'), and a collector 209, but the disclosure is not limited thereto. The second suction motor 207 may be an entity or module to generate a suction force for discharging foreign substances collected in the dustbin 1200 from the cordless vacuum cleaner 100 to the collector 209. For example, the second suction motor 207 may generate a pressure difference in the dustbin 1200. The second suction motor 207 may be located lower than the collector 209 while the station device 200 is at its upright position.

Referring to 101 of FIG. 1, after a user uses the cordless vacuum cleaner 100, the user may dock the cordless vacuum cleaner 100 on the station device 200. As a distance between the cordless vacuum cleaner 100 and the station device 200 is closer, the cordless vacuum cleaner 100 and the station device 200 may establish a short-range wireless communication channel and may transceive data.

Referring to 102 of FIG. 1, docking of the cordless vacuum cleaner 100 on the station device 200 may be completed. Here, a cover 10 of the dustbin 1200 included in the cordless vacuum cleaner 100 may be open. The cover 10 of the dustbin 1200 may be automatically open, or may be manually open, in response to a user input.

Referring to 103 of FIG. 1, after the cover 10 of the dustbin 1200 is open, the station device 200 may perform a dust discharge operation to allow dust in the dustbin 1200 to be discharged to the collector 209. The collector 209 of the station device 200 may include a replaceable dust bag.

According to an embodiment of the disclosure, the station device 200 may perform the dust discharge operation by both using the first suction motor 1110 and the second suction motor 207 to increase dust discharging efficiency. For example, the station device 200 may transmit a control signal to operate the first suction motor 1110 for dust discharging, and may operate the second suction motor 207 in synchronization (or cooperation) with operation of the first suction motor 1110.

In general, due to types of foreign substances (e.g.: shredded paper, long hair) collected in the dustbin 1200, a state of the foreign substances (moisture content), an inner structure of the dustbin 1200 (e.g.: cyclone structure), or the like, it may be difficult to empty 100% of foreign substances in the dustbin 1200. In particular, when foreign substances with high moisture content or shredded papers are included in the dustbin 1200, a dust discharging rate may deteriorate. In an embodiment of the disclosure, the first suction motor 1110 of the cordless vacuum cleaner 100 and the second suction motor 207 of the station device 200 are operated together based on various patterns, such that a pressure difference in the dustbin 1200 may be sharply changed, thereby substantially increasing a dust discharging rate.

In such an embodiment, when the first suction motor 1110 and the second suction motor 207 are operated together based on various patterns, a flow path in the dustbin may vary, and an amount of airflow (an amount of air flowing per unit time) for dust discharging may be increased. For example, compared to a case where only the second suction motor 207 is operated, when both the first suction motor 1110 and the second suction motor 207 are operated, an amount of air inflow via a suction hole of the brush device may be increased. Also, compared to a case where only the second suction motor 207 is operated, when both the first suction motor 1110 and the second suction motor 207 are operated, a separate flow path in an against-gravity direction may be formed, in addition to a main flow path formed in a gravity direction.

Therefore, compared to a case where the station device 200 operates only the second suction motor 207 to discharge dust, when the first suction motor 1110 and the second suction motor 207 are operated together based on various patterns, a dust discharging rate of the cordless vacuum cleaner 100 may be substantially or effectively increased.

A method by which the station device 200 performs a dust discharge operation by using both the first suction motor 1110 and the second suction motor 207 will be described in detail with reference to FIG. 7, and hereinafter, with reference to FIG. 2, a configuration of the station device 200 will now be described in detail.

Figure 2:
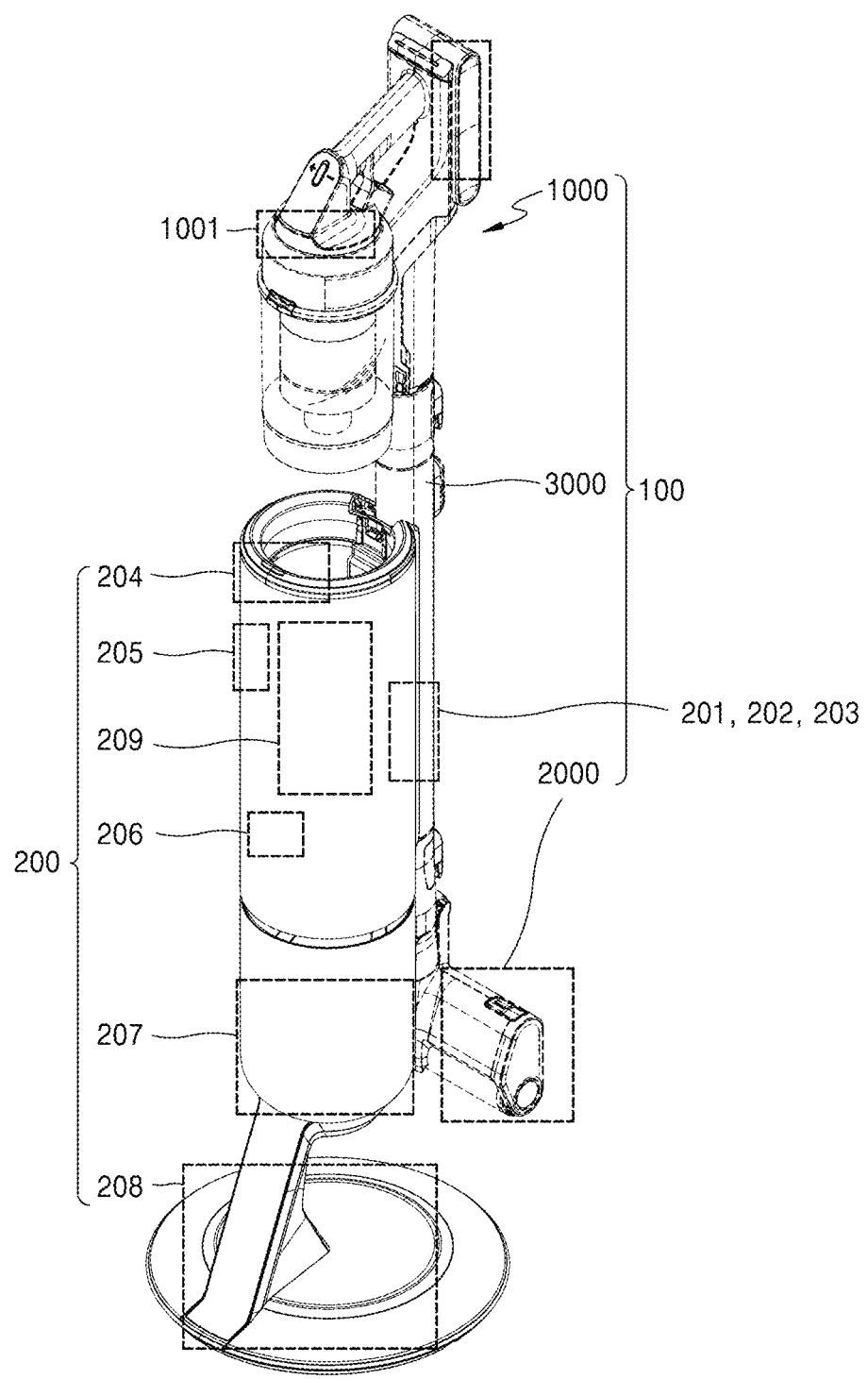
FIG. 2 illustrates a station device and a cordless vacuum cleaner, according to an embodiment of the disclosure.

FIG. 2 illustrates the station device 200 and the cordless vacuum cleaner 100 according to an embodiment of the disclosure.

Referring to FIG. 2, the station device 200 according to an embodiment of the disclosure may include the communication interface 201, a memory 202, and the at least one processor 203. Also, the station device 200 may further include a user interface 204, a wire connector 205 (e.g.: home appliance smart service (HASS) connector), a pressure sensor 206 (hereinafter, also referred to as the second pressure sensor), the suction motor 207 (also referred to as the second suction motor), a power supply unit 208, a dust collector bin coupling portion (not shown), the collector 209, a filter unit (not shown), or the like. However, one or more elements shown in FIG. 2 may be omitted. The station device 200 may be embodied with more elements than the elements shown in FIG. 2 or may be embodied with fewer elements than the shown elements. Hereinafter, each configuration will now be described.

The station device 200 may include the communication interface 201 to perform communication with an external device. For example, the station device 200 may perform communication with a cleaner body 1000 of the cordless vacuum cleaner 100 or a server device 300 via the communication interface 201. Here, the communication interface 201 may communicate with the server device 300 via a first communication scheme (e.g.: a Wi-Fi communication scheme), and may communicate with the cordless vacuum cleaner 100 via a second communication scheme (e.g.: a BLE communication scheme).

The communication interface 201 may include a short-range wireless communication interface, a long-range wireless communication interface, or the like. The short-range wireless communication interface may include a Bluetooth communication interface, a BLE communication interface, a near field communication (NFC) interface, a wireless local area network (WLAN) (or Wi-Fi) communication interface, a ZigBee communication interface, an Infrared Data Association (IrDA) communication interface, a Wi-Fi Direct (WFD) communication interface, an ultra-wideband (UWB) communication interface, or an Ant+ communication interface, but the disclosure is not limited thereto. The long-range wireless communication interface may be used for the station device 200 to remotely communicate with the server device 300. The long-range wireless communication interface may include Internet, a computer network (e.g.: LAN or WAN), a mobile communication interface, and the like. The mobile communication interface may include, but is not limited to, a $3^{rd}$ generation (3G) module, a $4^{th}$ generation (4G) module, a $5^{th}$ generation (5G) module, a long term evolution (LTE) module, a narrowband Internet of Things (NB-IoT) module, and an LTE-M module.

The communication interface 201 may transmit data to the at least one processor 203 via universal asynchronous receiver/transmitter (UART) but the disclosure is not limited thereto.

The memory 202 of the station device 200 may store a program (e.g.: one or more instructions) for processing and control by the at least one processor 203, and may store a plurality of pieces of input/output data. For example, the memory 202 of the station device 200 may include, but is not limited to, software related to control of the station device 200, state data of the suction motor 207, a measurement value of the pressure sensor 206, error occurrence data (error history data), information about an operation mode for dust discharging (e.g.: an operation time of the suction motor 207 for each operation mode, a suction force generation pattern for each operation mode). The memory 202 of the station device 200 may store data received from the cleaner body 1000. For example, the station device 200 may store product information (e.g.: identification information, model information, etc.) of the cordless vacuum cleaner docked on the station device 200, version information of software installed in the cordless vacuum cleaner 100, error occurrence data (error history data) of the cordless vacuum cleaner 100, or the like.

The memory 202 may include at least one type of storage medium selected from flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disk, and an optical disc. The programs stored in the memory 202 may be classified into a plurality of modules depending on functions thereof.

The station device 200 may include the at least one processor 203. The station device 200 may include a single processor or may include a plurality of processors. The at least one processor 203 according to the disclosure may include at least one of a central processing unit (CPU), a graphics processing unit (GPU), an accelerated processing unit (APU), a many integrated core (MIC), a digital signal processor (DSP), or a neural processing unit (NPU). The at least one processor 203 may be implemented in the form of system on chip (SoC) in which one or more electronic parts are integrated. Each of the at least one processor 203 may be implemented as separate hardware (H/W). The at least one processor 203 may be referred to as a microprocessor controller (MICOM), a micro-processor unit (MPU), or a micro-controller unit (MCU).

The at least one processor 203 according to an embodiment of the disclosure may be implemented as a single core processor or a multicore processor.

The at least one processor 203 may control general operations of the station device 200. For example, as the least one processor 203 detects occurrence of an event requesting dust discharging from the dustbin 1200, the least one processor 203 may control the communication interface 201 to transmit, to the cordless vacuum cleaner 100, a control signal for operating the first suction motor 1110 of the cordless vacuum cleaner 100 to discharge dust. Also, the least one processor 203 may perform a dust discharge operation for discharging dust of the dustbin 1200 to the collector 209, by operating both the first suction motor 1110 and the second suction motor 207 in a predetermined manner.

The least one processor 203 may control the communication interface 201 to receive, from the cordless vacuum cleaner 100, information about availability or non-availability of the first suction motor 1110 for dust discharging. When the first suction motor 1110 is available for dust discharging, the least one processor 203 may operate the second suction motor 207 together or in cooperation with the first suction motor 1110, and when the first suction motor 1110 is not available for dust discharging, the least one processor 203 may perform the dust discharge operation by operating only the second suction motor 207.

The least one processor 203 may identify a preset operation mode associated with the dust discharge operation and a suction force generation pattern corresponding to the preset operation mode. In the suction force generation pattern, a first operation sequence of the first suction motor 1110 and a second operation sequence of the second suction motor 207 may be defined. The least one processor 203 may transmit information of the suction force generation pattern to the cordless vacuum cleaner 100 to allow the first suction motor 1110 to operate according to the first operation sequence of the suction force generation pattern. Also, the least one processor 203 may control an operation of the second suction motor 207, according to the second operation sequence of the suction force generation pattern.

The user interface 204 of the station device 200 may include an input interface and an output interface. The input interface may include a discharge start button, a discharge end button, a mode selection button, or the like. The output interface may include, but is not limited to, a light-emitting diode (LED), a liquid crystal display (LCD), a touchscreen, an audio output module for audio guidance, etc. The output interface may display a charge capacity and software update progress information of the cleaner body 1000, but the disclosure is not limited thereto.

The station device 200 may include the wire connector 205 (e.g.: home appliance smart service (HASS) connector). The wire connector 205 may include a terminal to which a computing device of a system manager (e.g.: service staff) is connected. The system manager may connect the computing device storing new version software to the wire connector 205, and may transfer the new version software to the memory 202 of the station device 200. Here, when the new version software is associated with control of the station device 200, pre-installed software in the station device 200 may be updated. On the other hand, when the new version software is associated with control of the cordless vacuum cleaner 100, the station device 200 may transfer the new version software to the cordless vacuum cleaner 100, according to whether a preset condition is satisfied. For example, in a case where the cordless vacuum cleaner 100 is docked on the station device 200 and BLE communication with the cordless vacuum cleaner 100 is available, the station device 200 may transfer the new version software to the cordless vacuum cleaner 100. Here, the cordless vacuum cleaner 100 may update pre-installed software.

The pressure sensor 206 (also referred to as the second pressure sensor) of the station device 200 may be a sensor to measure pressure in the station device 200. The pressure sensor 206 may measure a pressure value before dust discharging, may measure a pressure value during dust discharging, or may measure a pressure value after dust discharging. The pressure sensor 206 may transfer a measured pressure value to the at least one processor 203 via inter integrated circuit (I2C) or UART communication. The pressure sensor 206 may be provided between the collector 209 and the suction motor 207, but the disclosure is not limited thereto. In an embodiment where the pressure sensor 206 is provided between the collector 209 and the suction motor 207, the pressure sensor 206 may be implemented as a negative pressure sensor as the pressure sensor 206 is located at the front end of the suction motor 207.

The suction motor 207 (that is, the second suction motor) may be a device to generate a suction force for discharging, from the cleaner body 1000, foreign substances collected in the dustbin 1200 of the cleaner body 1000. The suction motor 207 may rotate a suction fan for moving air.

The power supply unit 208 may include a switching mode power supply (SMPS) for converting alternating current to direct current, where the alternating current is supplied from a power source. When the cordless vacuum cleaner 100 is docked on the station device 200, the direct current converted by the power supply unit 208 is supplied to a battery of the cleaner body 1000 via a charge terminal, such that the battery may be charged.

The dust collector bin coupling portion may be provided to allow the dust collector bin (dustbin) 1200 of the cleaner body 1000 to be docked therein. When the dustbin 1200 is placed in the dust collector bin coupling portion, docking of the cleaner body 1000 on the station device 200 may be completed. The dust collector bin coupling portion may include a docking detection sensor for detecting docking of the cleaner body 1000. The docking detection sensor may be a tunnel magneto-resistance (TMR) sensor, but the disclosure is not limited thereto. The TMR sensor may detect a magnetic substance attached to the dustbin 1200, thereby sensing docking of the cleaner body 1000. The station device 200 may include a step motor (also referred to as the first step motor) to press one side of the cover 10 of the dustbin 1200 to open the cover 10 (also referred to as the door) when the dustbin 1200 is docked in the station device 200. The station device 200 may further include a step motor (also referred to as the second step motor) to press one side of the cover 10 of the dustbin 1200 to close the cover 10 after dust discharging is completed.

The collector 209 refers to a space in which foreign substances discharged from the dustbin 1200 of the cleaner body 1000 may be collected. The collector 209 may include a dust bag in which foreign substances discharged from the dustbin 1200 are collected. The dust bag may include a material that allows air to pass through while preventing foreign substances from passing through, so that foreign substances introduced from the dustbin 1200 to the collector 209 may be collected therein. The dust bag may be detachable from the collector 209. The station device 200 may include an ultraviolet (UV) emitter to emit UV rays to the collector 209. The UV emitter may include a plurality of UV ramps.

The filter unit may filter out ultrafine particles that are not collected by the collector 209. The filter unit may include a discharge port to allow air passing through a filter to be discharged from the station device 200. The filter unit may include a motor filter, a high-efficiency particulate air (HEPA) filter, etc., but the disclosure is not limited thereto.

The cordless vacuum cleaner 100 according to an embodiment of the disclosure may be a stick-type cleaner including the cleaner body 1000, a brush device 2000, and an extension tube 3000. However, one or more elements shown in FIG. 2 may be omitted. The cordless vacuum cleaner 100 may be embodied with more elements than the elements shown in FIG. 2 or may be embodied with fewer elements than the shown elements. For example, the cordless vacuum cleaner 100 may be implemented with the cleaner body 1000 and the brush device 2000, without the extension tube 3000.

The cleaner body 1000 is a part a user can hold and move during cleaning, and may include the suction motor 1110 (the first suction motor) that creates vacuum in the cordless vacuum cleaner 100. The suction motor 1110 may be provided in the dustbin 1200 in which foreign substances sucked up from a cleaning-target surface (e.g.: a floor, bedding, sofa, etc.) are contained. The cleaner body 1000 may further include at least one processor, a battery, a memory storing software associated with control of the cordless vacuum cleaner 100, or the like, in addition to the suction motor 1110, but the disclosure is not limited thereto. The cleaner body 1000 will be described in detail with reference to FIG. 3 below.

The brush device 2000 is a device that tightly contacts the cleaning-target surface to suck up air and foreign substances of the cleaning-target surface. The brush device 2000 may also be referred to as the cleaner head. The brush device 2000 may be rotatably coupled to the extension tube 3000. The brush device 2000 may include a motor, a drum having a rotary brush attached thereto, or the like, but the disclosure is not limited thereto. According to an embodiment of the disclosure, the brush device 2000 may further include at least one processor for controlling communication with the cleaner body 1000. A type of the brush device 2000 may vary, and the type of the brush device 2000 will be described in detail with reference to FIG. 5 below.

The extension tube 3000 may include a pipe or a flexible hose, which has certain hardness. The extension tube 3000 may transfer a suction force generated by the suction motor 1110 of the cleaner body 1000 to the brush device 2000, and may move air and foreign substances sucked up by the brush device 2000 to the cleaner body 1000. The extension tube 3000 may be detachably connected to the brush device 2000. The extension tube 3000 may be provided in steps between the cleaner body 1000 and the brush device 2000. In an embodiment, at least two extension tubes 3000 may be provided.

According to an embodiment of the disclosure, each of the cleaner body 1000, the brush device 2000, and the extension tube 3000 included in the cordless vacuum cleaner 100 may include power lines (e.g., + (positive) line, − (negative) line) and a signal line.

The power lines may be provided to deliver power supplied from a battery to the cleaner body 1000 and the brush device 2000 connected to the cleaner body 1000. The signal line is different from the power lines and may be provided to transceive a signal between the cleaner body 1000 and the brush device 2000. The signal line may be implemented to be connected to the power lines in the brush device 2000.

According to an embodiment of the disclosure, each of at least one processor 1001 of the cleaner body 1000 and a processor of the brush device 2000 controls an operation of a switching device connected to the signal line, thereby performing bi-direction communication between the cleaner body 1000 and the brush device 2000. Hereinafter, when the cleaner body 1000 and the brush device 2000 communicate with each other via the signal line, communication between the cleaner body 1000 and the brush device 2000 may be defined as 'signal line communication'. The cleaner body 1000 and the brush device 2000 may communicate with each other using I2C or UART.

According to an embodiment of the disclosure, the cleaner body 1000 may not only detect attachment or detachment of the brush device 2000 but may also identify a type of the brush device 2000, and may adaptively control an operation (e.g.: a drum revolution per minute (RPM)) of the brush device 2000, based on a usage environment state (e.g.: a hard floor, a carpet, a mat, a corner, a state being lifted from the cleaning-target surface, etc.) of the brush device 2000. For example, the cleaner body 1000 may periodically communicate with the brush device 2000, thereby transmitting a signal for controlling an operation of the brush device 2000 to the brush device 2000. Hereinafter, a configuration of the cleaner body 1000 will now be described in detail with reference to FIG. 3.

Figure 3:
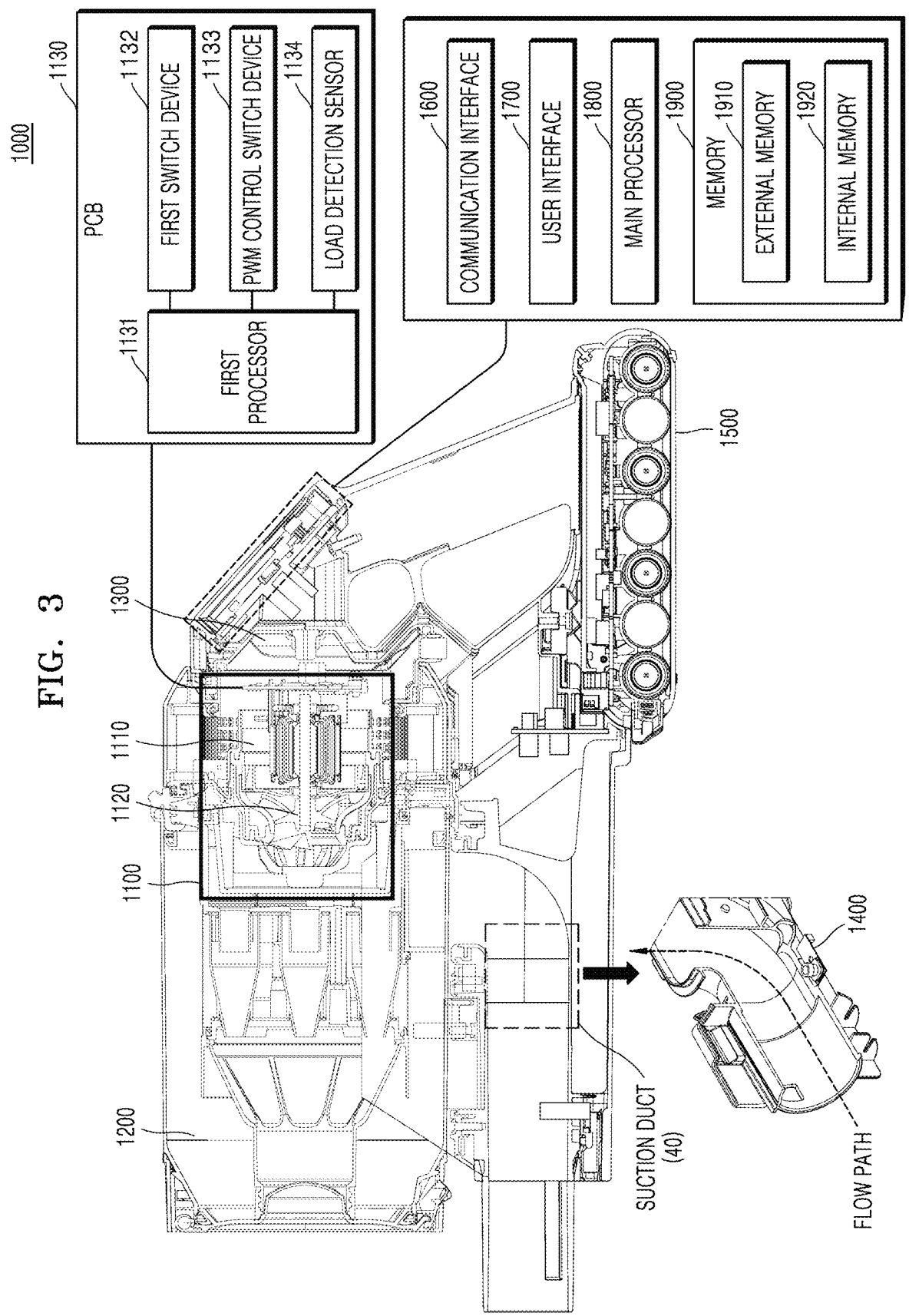
FIG. 3 illustrates a cleaner body according to an embodiment of the disclosure.

FIG. 3 illustrates the cleaner body 1000 according to an embodiment of the disclosure.

Referring to FIG. 3, the cleaner body 1000 may include a suction force generator (hereinafter, also referred to as a motor assembly 1100) to generate a suction force to suck up foreign substances on a cleaning-target surface, the dust collector bin 1200 (also referred to as the dustbin) in which foreign substances sucked up from a cleaning-target surface are contained, a filter unit 1300, a pressure sensor 1400, a battery 1500 to supply power to the motor assembly 1100, a communication interface 1600, a user interface 1700, at least one processor 1001 (e.g.: a main processor 1800), and a memory 1900. However, one or more elements shown in FIG. 3 may be omitted. The cleaner body 1000 may be embodied with more elements than the elements shown in FIG. 3 or may be embodied with fewer elements than the shown elements.

Hereinafter, each configuration will now be described.

The motor assembly 1100 may include the suction motor 1110 for converting an electric force to mechanical rotary power, a fan 1120 connected to the suction motor 1110 to rotate, and a printed circuit board (PCB) 1130 connected to the suction motor 1110. The suction motor 1110 may create vacuum in the cordless vacuum cleaner 100. Here, vacuum indicates a state lower than a barometric pressure. The suction motor 1110 may include a brushless direct current (BLDC), but the disclosure is not limited thereto.

The PCB 1130 may include, but is not limited to, a processor (hereinafter, also referred to as a first processor 1131) to control the suction motor 1110 and control communication with the brush device 2000, a first switch device 1132 connected to a signal line, a switch device (hereinafter, also referred to as a pulse width modulation (PWM) control switch device 1133) (e.g.: a field effect transistor (FET), a transistor, an insulated gate bipolar transistor (IGBT), etc.) to control power supply to the brush device 2000, a load detection sensor 1134 (e.g.: a shunt resistor, shunt resistor and amplifier circuit (operational amplifier (OP-AMP)), a current detection sensor, a magnetic field sensor (non-invasive scheme), etc. Hereinafter, for convenience of descriptions, embodiments where the PWM control switch device 1133 is the FET and the load detection sensor 1134 is the shunt resistor will now be described as an example.

The first processor 1131 may obtain data associated with a state of the suction motor 1110 (hereinafter, referred to as the state data), and may transfer the state data of the suction motor 1110 to the main processor 1800. Also, the first processor 1131 may transmit a signal (hereinafter, also referred to as the first signal) to the brush device 2000 via the signal line by controlling (e.g.: turn-on or turn-off) an operation of the first switch device 1132 connected to the signal line. The first switch device 1132 is a device capable of switching a state of the signal line to Low. For example, the first switch device 1132 is a device capable of switching a voltage of the signal line to 0 volt (V). The first signal may include data indicating at least one of a target rotation count per minute (hereinafter, also referred to as the target drum RPM) of the rotary brush of the brush device 2000, a target trip level of the brush device 2000, or power consumption of the suction motor 1110, but the disclosure is not limited thereto. For example, the first signal may include data for controlling a lighting device included in the brush device 2000. The first signal may be implemented as a preset number of bits. For example, the first signal may be implemented as 5 bits or 8 bits, and may have a transmission period of 10 milliseconds (ms) per 1 bit, but the disclosure is not limited thereto.

The first processor 1131 may detect a signal (hereinafter, also referred to as the second signal) transmitted from the brush device 2000 via the signal line. The second signal may include data indicating a current state of the brush device

2000, but the disclosure is not limited thereto. For example, the second signal may include data (e.g.: a current drum RPM, a current trip level, a current lighting device setting value, etc.) about a current operation condition. Also, the second signal may further include data indicating a type of the brush device 2000. The first processor 1131 may transfer, to the main processor 1800, the data indicating the current state of the brush device 2000 or the data indicating the type of the brush device 2000.

The motor assembly 1100 may be provided in the dust collector bin (the dustbin 1200). The dust collector bin 1200 may be configured such that dust in the air or garbage drawn via the brush device 2000 are sorted out and collected. The dust collector bin 1200 may be detachably provided from (or connected to) the cleaner body 1000.

The dust collector bin 1200 may collect foreign substances by using a cyclone scheme to separate foreign substances by using a centrifugal force. Air from which foreign substances are removed according to the cyclone scheme may be discharged from the cleaner body 1000, and the foreign substances may be stored in the dust collector bin 1200. A multi-cyclone structure may be provided in the dust collector bin 1200. The dust collector bin 1200 may be provided such that foreign substances are collected at the lower side of the multi-cyclone structure. The dust collector bin 1200 may include a dust collector bin door (also referred to as the cover 10 of the dustbin 1200) provided to be open when the station device 200 is connected. The dust collector bin 1200 may include a first dust collector in which relatively large foreign substances are firstly collected, and a second dust collector in which relatively small foreign substances are secondly collected. Both the first dust collector and the second dust collector may be provided to be open to the outside when the dust collector bin door is open.

The filter unit 1300 may filter out ultrafine particles that are not filtered out by the dust collector bin 1200. The filter unit 1300 may include a discharge port to allow air passing through a filter to be discharged from the cordless vacuum cleaner 100. The filter unit 1300 may include a motor filter, a HEPA filter, etc., but the disclosure is not limited thereto.

The pressure sensor 1400 may measure a pressure (hereinafter, also referred to as a flow path pressure) in a flow path. When the pressure sensor 1400 is provided at the suction end (e.g.: a suction duct 40), the pressure sensor 1400 may measure a change in a flow speed at its location by measuring a static pressure. The pressure sensor 1400 may be an absolute pressure sensor or a relative pressure sensor. In an embodiment where the pressure sensor 1400 is the absolute pressure sensor, the main processor 1800 may sense, by using the pressure sensor 1400, a first pressure value before the suction motor 1110 is operated. Then, the main processor 1800 may sense a second pressure value after the suction motor 1110 is operated at a target RPM, and may use or determine a difference between the first pressure value and the second pressure value, as a pressure value in the flow path. Here, the first pressure value may be a pressure value due to inside/outside affects such as weather, altitude, a state of the cordless vacuum cleaner 100, an amount of sucked up dust, etc., the second pressure value may be a pressure value due to inside/outside affects such as altitude, a state of the cordless vacuum cleaner 100, an amount of sucked up dust, etc., and a pressure value due to operation of the suction motor 1110, and a difference between the first pressure value and the second pressure value may be a pressure value due to operation of the suction motor 1110. Therefore, when the difference between the first pressure value and the second pressure value is used as a pressure value in the flow path, inside/outside affects other than the suction motor 1110 may be minimized.

A flow path pressure measured by the pressure sensor 1400 may be used to identify a current usage environment state of the brush device 2000 (e.g.: a state of a cleaning-target surface (hard floor, carpet, mat, corner, etc.), or a state being lifted from the cleaning-target surface, etc.), or may be used to measure a suction force that changes due to a contamination level or an amount of collected dust.

The pressure sensor 1400 may be provided at the suction end (e.g.: the suction duct 40). The suction duct 40 may be a structure via which the dust collector bin 1200 and the extension tube 3000 or the dust collector bin 1200 and the brush device 2000 are connected to each other to allow a flow including foreign substances to be moved to the dust collector bin 1200. The pressure sensor 1400 may be located at the end of a straight portion (or a knee point between the straight portion and a curve portion) of the suction duct 40, in consideration of contamination of foreign substances/dust, but the disclosure is not limited thereto. The pressure sensor 1400 may be provided at the middle of the straight portion of the suction duct 40. In an embodiment where the pressure sensor 1400 is located at the suction duct 40, as the pressure sensor 1400 is located at the front end of the suction motor 1110 which generates a suction force, the pressure sensor 1400 may be implemented as a negative pressure sensor.

In the disclosure, an embodiment where the pressure sensor 1400 is located at the suction duct 40 is described, but the disclosure is not limited thereto. In an embodiment, the pressure sensor 1400 may be located at a discharge end (e.g.: in the motor assembly 1100). In such an embodiment where the pressure sensor 1400 is located at the discharge end, as the pressure sensor 1400 is located at the rear end of the suction motor 1110, the pressure sensor 1400 may be implemented as a positive pressure sensor. Also, the pressure sensor 1400 may be provided in a multiple number in the cordless vacuum cleaner 100.

The battery 1500 may be detachably mounted at the cleaner body 1000. The battery 1500 may be electrically connected to a charge terminal provided at the station device 200. The battery 1500 may be charged by receiving power from the charge terminal.

The cleaner body 1000 may include the communication interface 1600 to perform communication with an external device. For example, the cleaner body 1000 may perform communication with the station device 200 (or the server device 300) via the communication interface 1600. The communication interface 1600 may include a short-range wireless communication interface, a long-range wireless communication interface, or the like. The short-range wireless communication interface may include a Bluetooth communication interface, a BLE communication interface, an NFC interface, a WLAN (or Wi-Fi) communication interface, a ZigBee communication interface, an IrDA communication interface, a WFD communication interface, an UWB communication interface, or an Ant+ communication interface, but the disclosure is not limited thereto.

The user interface 1700 may be provided at a handle. The user interface 1700 may include an input interface and an output interface. The cleaner body 1000 may receive a user input associated with an operation of the cordless vacuum cleaner 100 via the user interface 1700, and may output information associated with the operation of the cordless vacuum cleaner 100. The cleaner body 1000 may output information about a docking state, information about a state of the dustbin 1200, information about a dust bag, or the like via the user interface 1700. The input interface may include a power button, a suction force level adjustment button, or the like. The output interface may include, but is not limited to, a LED display, an LCD, a touchscreen, or the like.

The cleaner body 1000 may include the at least one processor 1001. The cleaner body 1000 may include a single processor or may include a plurality of processors. For example, the cleaner body 1000 may include the main processor 1800 connected to the user interface 1700, and the first processor 1131 connected to the suction motor 1110. The at least one processor 1001 may control all operations of the cordless vacuum cleaner 100. For example, the at least one processor 1001 may determine power consumption (suction force level) of the suction motor 1110, a drum RPM of the brush device 2000, a trip level of the brush device 2000, or the like. The at least one processor 1001 may operate the suction motor 1110 to discharge dust, based on a control signal received from the station device 200.

The at least one processor 1001 according to the disclosure may include at least one of a CPU, a GPU, an APU, a MIC, a DSP, or an NPU. The at least one processor 1001 may be implemented in the form of system on chip (SoC) in which one or more electronic parts are integrated. Each of the at least one processor 1001 may be implemented as separate hardware (H/W). The at least one processor 1001 may be referred to as a microprocessor controller (MICOM), a micro-processor unit (MPU), a micro-controller unit (MCU).

The at least one processor 1001 according to an embodiment of the disclosure may be implemented as a single core processor or a multicore processor.

The memory 1900 may store a program for processing and control by the at least one processor 1001, and may store a plurality of pieces of input/output data. For example, the memory 1900 may store a pre-trained artificial intelligence (AI) model (e.g.: a support vector machine (SVM) algorithm, etc.), state data of the suction motor 1110, a measurement value of the pressure sensor 1400, state data of the battery 1500, state data of the brush device 2000, error occurrence data (error history data), power consumption of the suction motor 1110 corresponding to an operation condition, an RPM of a drum having a rotary brush attached thereto, a trip level, an operation sequence of the suction motor 1110 corresponding to a suction force generation pattern, or the like. The trip level is to prevent overload of the brush device 2000 and may indicate a reference load value (e.g.: a reference current value) for stopping an operation of the brush device 2000.

The memory 1900 may include an external memory 1910 and an internal memory 1920. For example, the memory 1900 may include at least one type of storage medium from among flash memory, a hard disk, a multimedia card micro, a memory card (e.g., a SD or XD memory card), RAM, SRAM, ROM, EEPROM, PROM, magnetic memory, a magnetic disk, and an optical disc. The programs stored in the memory 1900 may be classified into a plurality of modules depending on functions thereof.

Hereinafter, with reference to FIG. 4, operations of processors of the cordless vacuum cleaner 100 will now be described in detail.

Figure 4:
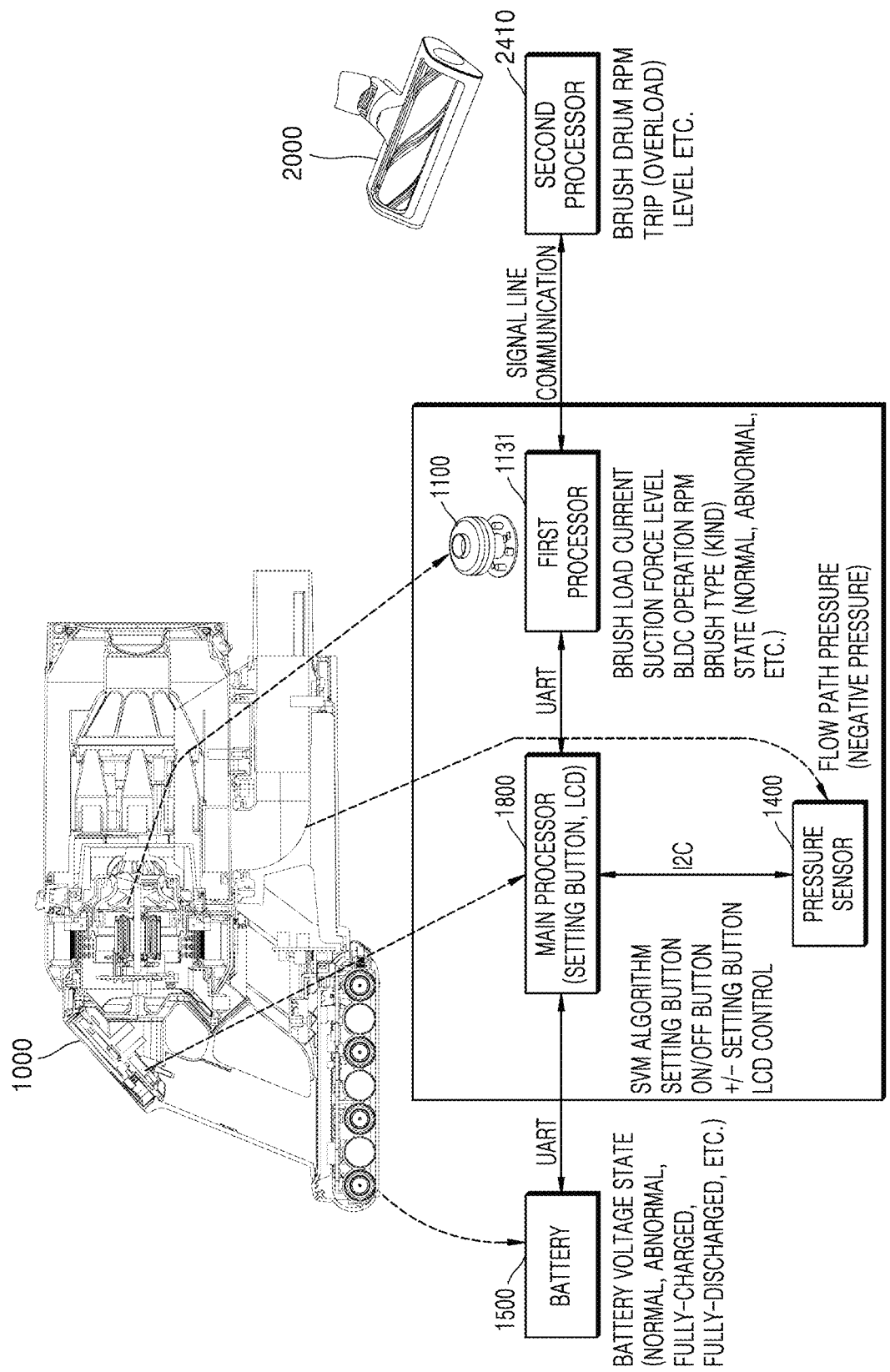
FIG. 4 illustrates operations of processors of a cordless vacuum cleaner according to an embodiment of the disclosure.

FIG. 4 illustrates operations of processors of the cordless vacuum cleaner 100 according to an embodiment of the disclosure.

Referring to FIG. 4, the main processor 1800 may check a state of parts in the cordless vacuum cleaner 100 by communicating with the battery 1500, the pressure sensor 1400, and the first processor 1131 in the motor assembly 1100. Here, the main processor 1800 may communicate with each of the parts by using a UART or an I2C, but the disclosure is not limited thereto. For example, the main processor 1800 may obtain data about a voltage state (e.g.: normal, abnormal, fully-charged, fully-discharged, etc.) of the battery 1500 from the battery 1500 by using the UART. The main processor 1800 may obtain, from the pressure sensor 1400, data about a flow path pressure by using the I2C.

In an embodiment, the main processor 1800 may obtain data about a suction force level, an RPM of the suction motor 1110, a state (e.g.: normal, abnormal, etc.) of the suction motor 1110, or the like from the first processor 1131 connected to the suction motor 1110, by using the UART. A suction force correspond to an electric force consumed to operate the cordless vacuum cleaner 100, and may be expressed as power consumption. The main processor 1800 may obtain, from the first processor 1131, data associated with a load of the brush device 2000 and data associated with a type of the brush device 2000.

The first processor 1131 may obtain state data (e.g.: a drum RPM, a trip level, normal, abnormal, etc.) of the brush device 2000 from the brush device 2000 via signal line communication with a second processor 2410 of the brush device 2000. Here, the first processor 1131 may transfer the state data of the brush device 2000 to the main processor 1800 via the UART. According to an embodiment of the disclosure, the first processor 1131 may transfer, in different periods, state data of the suction motor 1110 and the state data of the brush device 2000 to the main processor 1800. For example, the first processor 1131 may transfer the state data of the suction motor 1110 to the main processor 1800 once per 0.02 seconds, and may transfer the state data of the brush device 2000 to the main processor 1800 once every 0.2 seconds, but the disclosure is not limited thereto.

The main processor 1800 may determine whether an error occurs, based on a state of parts in the cordless vacuum cleaner 100, a state of the suction motor 1110, and a state of the brush device 2000, and may periodically transmit data associated with error occurrence to the station device 200 via short-range wireless communication (e.g.: BLE communication).

When the first processor 1131 of the cleaner body 1000 is connected to the second processor 2410 of the brush device 2000 via a UART or an I2C, damage (e.g.: an excess of a maximum voltage of a MiCom AD port) to a circuit device by high impedance influence due to an inner line of the extension tube 3000, electro static discharge (ESD) and/or over voltage may occur or may cause a problem. Therefore, according to an embodiment of the disclosure, the first processor 1131 of the cleaner body 1000 and the second processor 2410 of the brush device 2000 may perform signal line communication, instead of the UART or the I2C. Here, a circuit for the signal line communication may include a voltage distribution circuit (hereinafter, also referred to as the voltage distributor) to prevent the circuit device from being damaged due to over voltage, power noise, a surge, electrical overstress (ESD), electrical discharge (EOS), or the like. However, communication between the first processor 1131 of the cleaner body 1000 and the second processor 2410 of the brush device 2000 is not limited to the signal line communication.

According to an embodiment of the disclosure, where a noise reduction circuit is applied to the cleaner body 1000 and the brush device 2000, the first processor 1131 of the cleaner body 1000 and the second processor 2410 of the brush device 2000 may perform communication using the UART or the I2C. The noise reduction circuit may include at least one of a low pass filter, a high pass filter, a band pass filter, a damping resistor, or a distribution resistor, but the disclosure is not limited thereto. According to an embodiment of the disclosure, a level shifter circuit may be applied to the cleaner body 1000 and the brush device 2000, the first processor 1131 of the cleaner body 1000 and the second processor 2410 of the brush device 2000 may perform communication using the UART or the I2C. Hereinafter, for convenience of descriptions, an embodiment in which the cleaner body 1000 and the brush device 2000 perform the signal line communication will be mainly described.

The main processor 1800 may receive a user input with respect to a setting button (e.g.: ON/OFF button, +/− setting button) included in the user interface 1700, and may control output of an LCD. By using the pre-trained AI model (e.g.: the SVM algorithm), the main processor 1800 may identify a usage environment state (e.g.: a state (hard floor, carpet, mat, corner, etc.) of a cleaning-target surface, a state being lifted from the cleaning-target surface, etc.) of the brush device 2000, and may determine operation information (e.g.: power consumption of the suction motor 1110, a drum RPM, a trip level, etc.) of the cordless vacuum cleaner 100 which corresponds to the usage environment state of the brush device 2000. Here, the main processor 1800 may transfer, to the first processor 1131, the operation information of the cordless vacuum cleaner 100 which corresponds to the usage environment state of the brush device 2000. The first processor 1131 may adjust a suction force level (power consumption, RPM) of the suction motor 1110, according to the operation information of the cordless vacuum cleaner 100, and may transfer the operation information of the cordless vacuum cleaner 100 which corresponds to the usage environment state of the brush device 2000, to the second processor 2410 via signal line communication. In this case, the second processor 2410 may adjust a drum RPM, a trip level, a lighting device (e.g.: LED display), or the like, according to the operation information of the cordless vacuum cleaner 100. Hereinafter, with reference to FIG. 5, the brush device 2000 will now be further described.

Figure 5:
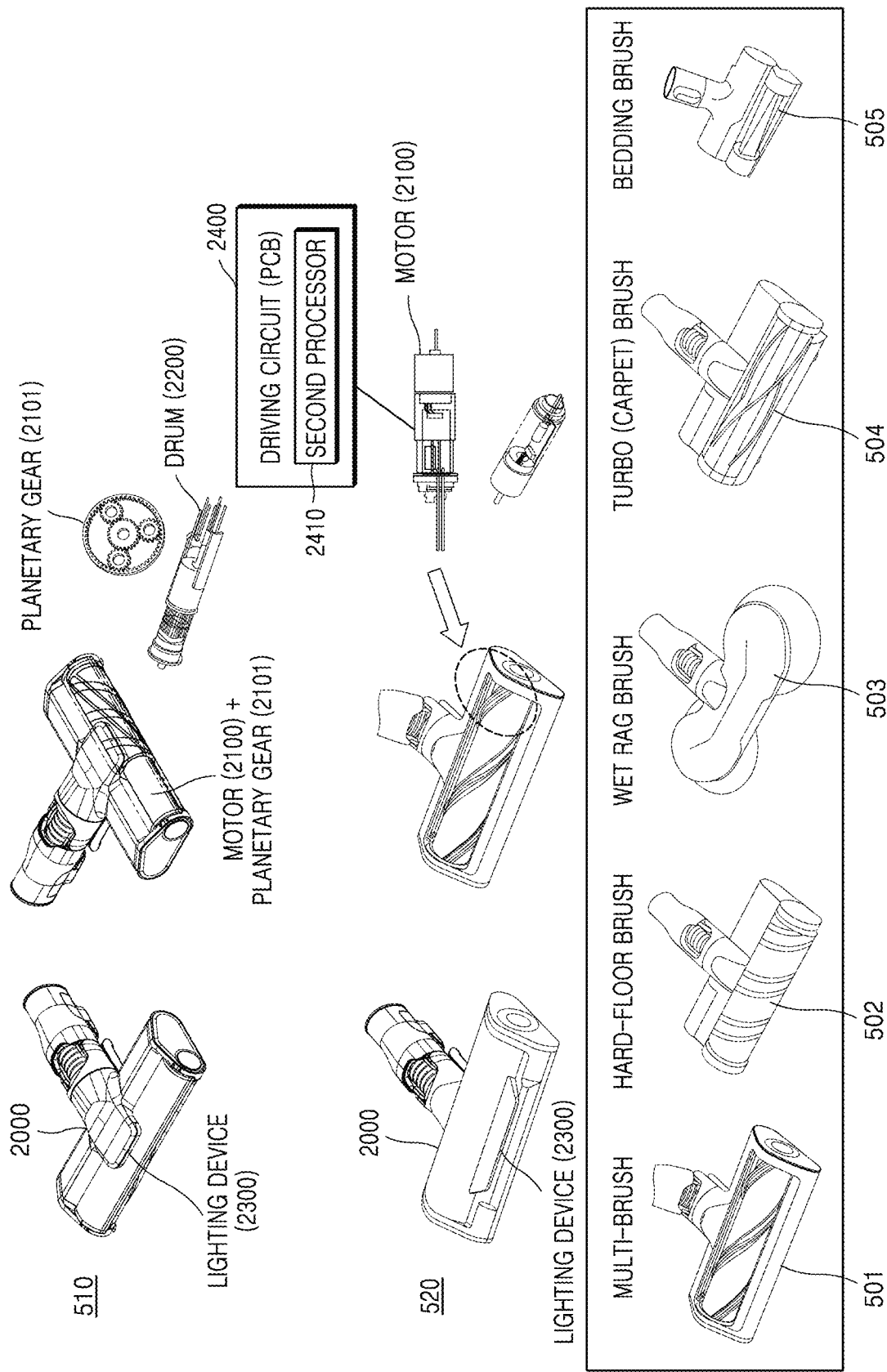
FIG. 5 illustrates a brush device according to an embodiment of the disclosure.

FIG. 5 illustrates the brush device 2000 according to an embodiment of the disclosure.

Referring to FIG. 5, the brush device 2000 may include, but is not limited to, a motor 2100, a drum 2200 with a rotary brush attached thereto, a lighting device 2300, etc., but the disclosure is not limited thereto. The motor 2100 of the brush device 2000 may be provided in the drum 2200 or in the outside of the drum 2200. In an embodiment where the motor 2100 is provided in the outside of the drum 2200, the drum 2200 may receive power from the motor 2100 via a belt.

Referring to 510 of FIG. 5, the motor 2100 may be a planetary geared motor. The planetary geared motor may have a structure in which a planetary gear 2101 is combined with a direct current (DC) motor. The planetary gear 2101 is provided to adjust an RPM of the drum 2200, according to a gear ratio. In the planetary geared motor, an RPM of the motor 2100 and the RPM of the drum 2200 may have a certain ratio. Referring to 520 of FIG. 5, the motor 2100 may be a BLDC, but the disclosure is not limited thereto. In an embodiment where the motor 2100 is the BLDC, the RPM of the motor 2100 and the RPM of the drum 2200 may be equal to each other.

The lighting device 2300 may emit light to a dim cleaning-target surface, may emit light for easy identification of dust or foreign substances on a cleaning-target surface, or may indicate a state of the brush device 2000 and may be provided at the front surface or the upper part of the brush device 2000. The lighting device 2300 may include an LED display but the disclosure is not limited thereto. For example, the lighting device 2300 may include a laser. The lighting device 2300 may automatically operate, in response to operation of the motor 2100, or may operate, under the control of the second processor 2410. According to an embodiment of the disclosure, the lighting device 2300 may change its color or brightness of light, under the control of the second processor 2410.

Referring to 520 of FIG. 5, the brush device 2000 may further include a driving circuit (PCB) 2400. The driving circuit 2400 may include a circuit for signal line communication with the cleaner body 1000. For example, the driving circuit 2400 may include the second processor 2410, a switch device (not shown) (hereinafter, also referred to as the second switch device) connected to a signal line, and an identification resistor (not shown) indicating a type of the brush device 2000, but the disclosure is not limited thereto.

The brush device 2000 may include various types of brush. For example, the brush device 2000 may include, but is not limited to, a multi-brush 501, a hard-floor brush 502, a wet rag brush 503, a turbo (carpet) brush 504, a bedding brush 505, a scraper brush (not shown), a gap brush (not shown), a pet brush (not shown), or the like.

According to an embodiment of the disclosure, the cleaner body 1000 may identify a type of the brush device 2000, based on the identification resistor included in the brush device 2000. The identification resistor indicates a type of the brush device 2000, and may vary depending on a type of the brush device 2000. For example, an identification resistor of the multi-brush 501 may be 330 kiloohm (KΩ), an identification resistor of the hard-floor brush 502 may be 2.2 megaohm (MΩ), and an identification resistor of the turbo (carpet) brush 504 may be 910 KΩ, but the disclosure is not limited thereto. The cleaner body 1000 may identify a type of the brush device 2000, based on a data signal transmitted from the brush device 2000. For example, the brush device 2000 may transmit, to the cleaner body 1000, the data signal including information indicating the type of the brush device 2000.

Hereinafter, a vacuum cleaner system further including a server device and a user terminal as well as the cordless vacuum cleaner 100 and the station device 200 will now be described with reference to FIG. 6.

Figure 6:
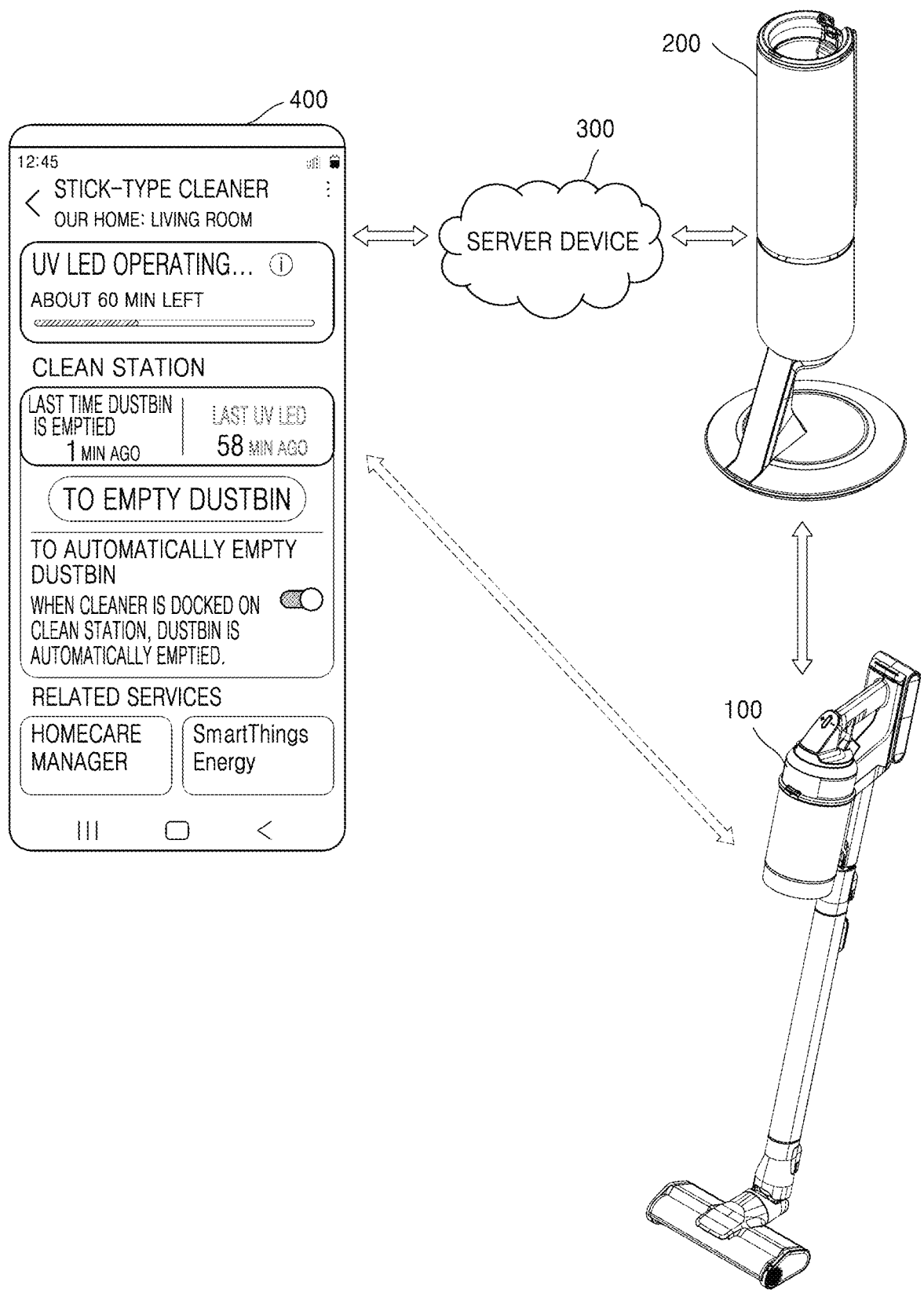
FIG. 6 illustrates a vacuum cleaner system according to an embodiment of the disclosure.

FIG. 6 illustrates a vacuum cleaner system according to an embodiment of the disclosure.

Referring to FIG. 6, the vacuum cleaner system according to an embodiment of the disclosure may further include the server device 300 and a user terminal 400 as well as the cordless vacuum cleaner 100 and the station device 200. As the vacuum cleaner system including the cordless vacuum cleaner 100 and the station device 200 is described above with reference to FIG. 1, hereinafter, the server device 300 and a user terminal 400 will now be described.

The server device 300 according to an embodiment of the disclosure may be a device to manage the station device 200 and the cordless vacuum cleaner 100. For example, the server device 300 may be a home appliance management server. The server device 300 may manage user count information and information of home appliances connected to a user account. For example, a user may create the user account by accessing the server device 300 via the user terminal. The user account may be identified by an identification (ID) and password which are set by the user. The server device 300 may register, in the user account, the station device 200 and the cordless vacuum cleaner 100 according to a preset procedure. For example, the server device 300 may connect identification information (e.g.: a serial number or a medium access control (MAC) address) of the station device 200 and identification information of the cordless vacuum cleaner 100 to the user account, thereby registering the station device 200 and the cordless vacuum cleaner 100. When the station device 200 and the cordless vacuum cleaner 100 are registered in the server device 300, the server device 300 may periodically receive state information of the station device 200 or state information of the cordless vacuum cleaner 100 from the station device 200, thereby managing a state of the station device 200 or a state of the cordless vacuum cleaner 100.

The user terminal 400 may be a device registered in the server device 300 via the same account as the station device 200 or the cordless vacuum cleaner 100, The user terminal 400 may be a smart phone, a notebook computer (laptop computer), a tablet PC, a digital camera, an electronic-book (e-book) terminal, a terminal for digital broadcasting, a personal digital assistant (PDA), a portable multimedia player (PMP), a wearable device, a device including a display, etc., but the disclosure is not limited thereto. Hereinafter, for convenience of descriptions, an embodiment in which the user terminal 400 is a smartphone will now be described.

According to an embodiment of the disclosure, the user terminal 400 may communicate with at least one of the server device 300, the station device 200, or the cordless vacuum cleaner 100. The user terminal 400 may directly communicate with the station device 200 or the cordless vacuum cleaner 100 via short-range wireless communication, or may indirectly communicate with the station device 200 or the cordless vacuum cleaner 100 via the server device 300.

According to an embodiment of the disclosure, the user terminal 400 may execute, in response to a user input, a particular application (e.g., a home appliance management application) provided by the server device 300. In such an embodiment, a user may check a state of the cordless vacuum cleaner 100 or a state of the station device 200 via an execution window of the application.

For example, the user terminal 400 may provide, via the execution window of the application, information (e.g.: UV LED operating) associated with an operation of an UV emitter, information (e.g.: When dustbin is emptied—1 minute ago) associated with dust discharging of the station device 200, an icon (e.g.: To empty dustbin) associated with dust discharging, an icon (e.g.: To automatically empty dustbin) for setting an operation mode associated with dust discharging, but the disclosure is not limited thereto. According to an embodiment of the disclosure, the user terminal 400 may provide a user a notification associated with a state of the cordless vacuum cleaner 100 or a state of the station device 200.

Hereinafter, an embodiment of a method by which the station device 200 performs a dust discharge operation will now be described in detail with reference to FIG. 7.

Figure 7:
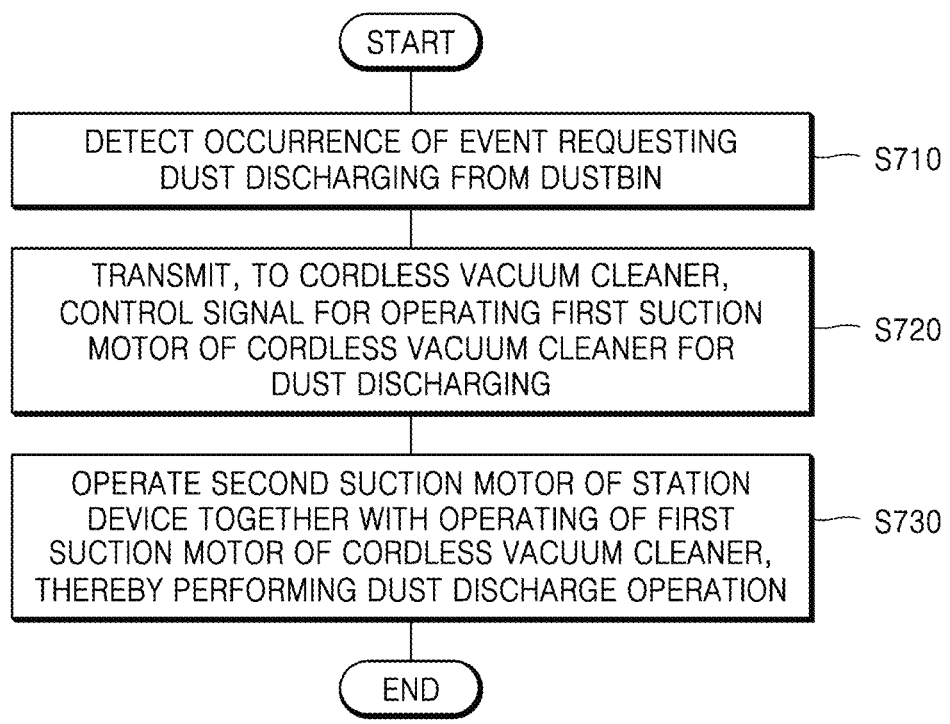
FIG. 7 illustrates a flowchart for describing an operating method of a station device, according to an embodiment of the disclosure.

FIG. 7 illustrates a flowchart for describing an operating method of the station device 200 according to an embodiment of the disclosure.

In operation S710, the station device 200 according to an embodiment of the disclosure may detect occurrence of an event requesting dust discharging from the dustbin 1200.

According to an embodiment of the disclosure, the event requesting dust discharging from the dustbin 1200 may include at least one of an event in which the cordless vacuum cleaner 100 is docked on the station device 200 or an event in which a user selects a dust discharging start button included in the station device 200.

For example, when an automatic discharge mode is set, the station device 200 may identify an event in which the cordless vacuum cleaner 100 is docked, as an event requesting dust discharging from the dustbin 1200. On the other hand, when a manual discharge mode is set, the station device 200 may identify an input of selecting, by a user, a dust discharging start button, as an event requesting dust discharging from the dustbin 1200. Even when the automatic discharge mode is set, when a user selects the dust discharging start button while the cordless vacuum cleaner 100 is docked on the station device 200, the station device 200 may determine that an event requesting dust discharging from the dustbin 1200.

Also, when a user selects the icon (e.g.: To empty dustbin) associated with dust discharging via the execution window of the application of the user terminal 400 (see FIG. 6), the station device 200 may receive, from the server device 300, information indicating that (or a command to perform a dust discharge operation) the user has selected the icon associated with dust discharging. Therefore, when the user selects the icon associated with dust discharging, the user terminal 400 may determine that an event requesting dust discharging occurs.

According to an embodiment of the disclosure, a dust discharging mode of the station device 200 may include an automatic discharge mode and a manual discharge mode. The automatic discharge mode may be a mode in which dust is automatically discharged from the dustbin 1200 when the cordless vacuum cleaner 100 is docked on the station device 200. The manual discharge mode may be a mode in which dust is discharged from the dustbin 1200 when a user presses a preset button while the cordless vacuum cleaner 100 is docked on the station device 200.

Figure 8:
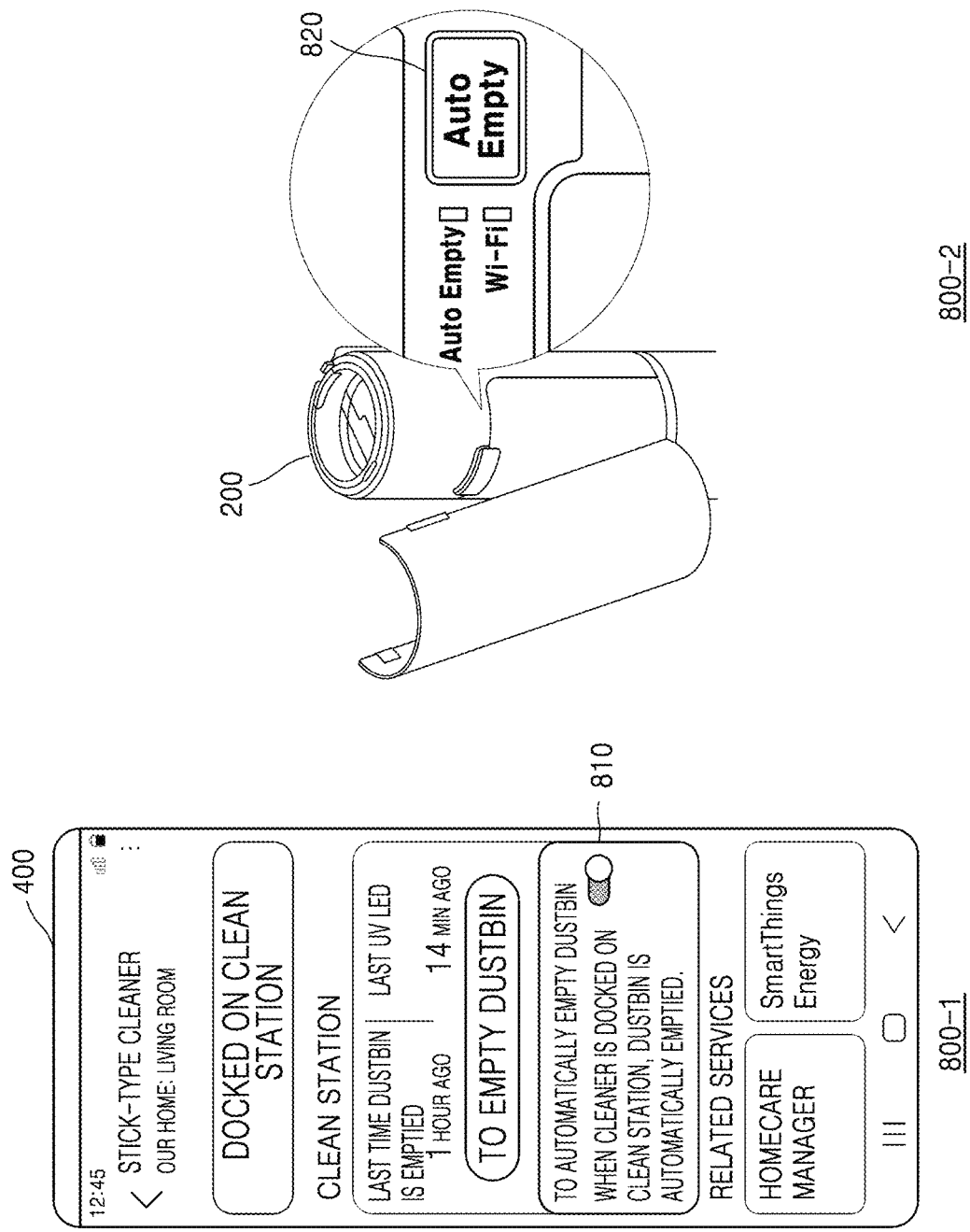
FIG. 8 illustrates an automatic discharge mode according to an embodiment of the disclosure.

Referring to FIG. 8, a user may set the dust discharging mode of the station device 200 via an execution window of an application executed in the user terminal 400 or a user interface of the station device 200.

For example, referring to 800-1 of FIG. 8, when the user terminal 400 receives, via an execution window of an application, a user input of activating "To automatically empty dustbin" 810, the user terminal 400 may transmit, to the server device 300, information indicating reception of the user input of activating "To automatically empty dustbin" 810. The server device 300 may transmit information indicating to set an automatic empty mode to the station device 200, based on the user input of activating "To automatically empty dustbin" 810. Alternatively, when the user terminal 400 receives, via an execution window of an application, a user input of deactivating "To automatically empty dustbin" 810, the user terminal 400 may transmit, to the server device 300, information indicating reception of the user input of deactivating "To automatically empty dustbin" 810. The server device 300 may transmit information indicating to set a manual mode to the station device 200, based on the user input of deactivating "To automatically empty dustbin" 810.

Referring to 800-2 of FIG. 8, a user may open the cover 10 of the station device 200, and may set the dust discharging mode of the station device 200 by using a preset button 820 (e.g.: Auto Empty). For example, when the user deactivates an automatic empty function by pressing the preset button 820, the station device 200 may set the manual mode. On the other hand, when the user activates the automatic empty function by pressing again the preset button 820, the station device 200 may set the automatic empty mode.

When the automatic discharge mode is set, the station device 200 may control, in response to detection of the cordless vacuum cleaner 100 being docked, a step motor to open the cover 10 of the dustbin 1200 of the cordless vacuum cleaner 100. The station device 200 may detect docking of the cordless vacuum cleaner 100, in various manners. For example, the station device 200 may determine that the cordless vacuum cleaner 100 is docked on the station device 200, by using a docking detection sensor. The docking detection sensor may be a TMR, but the disclosure is not limited thereto. Alternatively, when a user docks the cleaner body 1000 on the station device 200, a distance between a magnetic substance attached to the dustbin 1200 of the cleaner body 1000 and the docking detection sensor becomes close, such that the docking detection sensor may detect the magnetic substance attached to the dustbin 1200. When the docking detection sensor detects the magnetic substance, the station device 200 may identify that the cordless vacuum cleaner 100 is docked.

According to an embodiment of the disclosure, when the battery 1500 of the cleaner body 1000 is charged via a charge terminal of the station device 200, the station device 200 may detect power (current or voltage) being charged in the battery 1500 of the cleaner body 1000 via the charge terminal. Accordingly, when the station device 200 detects power (current or voltage) being charged in the battery 1500, the station device 200 may identify that the cordless vacuum cleaner 100 is docked.

According to an embodiment of the disclosure, when the battery 1500 of the cleaner body 1000 contacts the charge terminal of the station device 200, the cleaner body 1000 may detect a start of charging of the battery 1500. Therefore, when charging of the battery 1500 starts, the cleaner body 1000 may identify that the cleaner body 1000 is docked on the station device 200. Here, the cleaner body 1000 may transmit information indicating docking on the station device 200 to the station device 200 via short-range wireless communication (e.g.: BLE communication). The station device 200 may detect that the cordless vacuum cleaner 100 is docked, based on the information received from the cleaner body 1000.

Therefore, when docking of the cordless vacuum cleaner 100 is detected, the station device 200 may control the step motor to open the cover 10 of the dustbin 1200.

Figure 9:
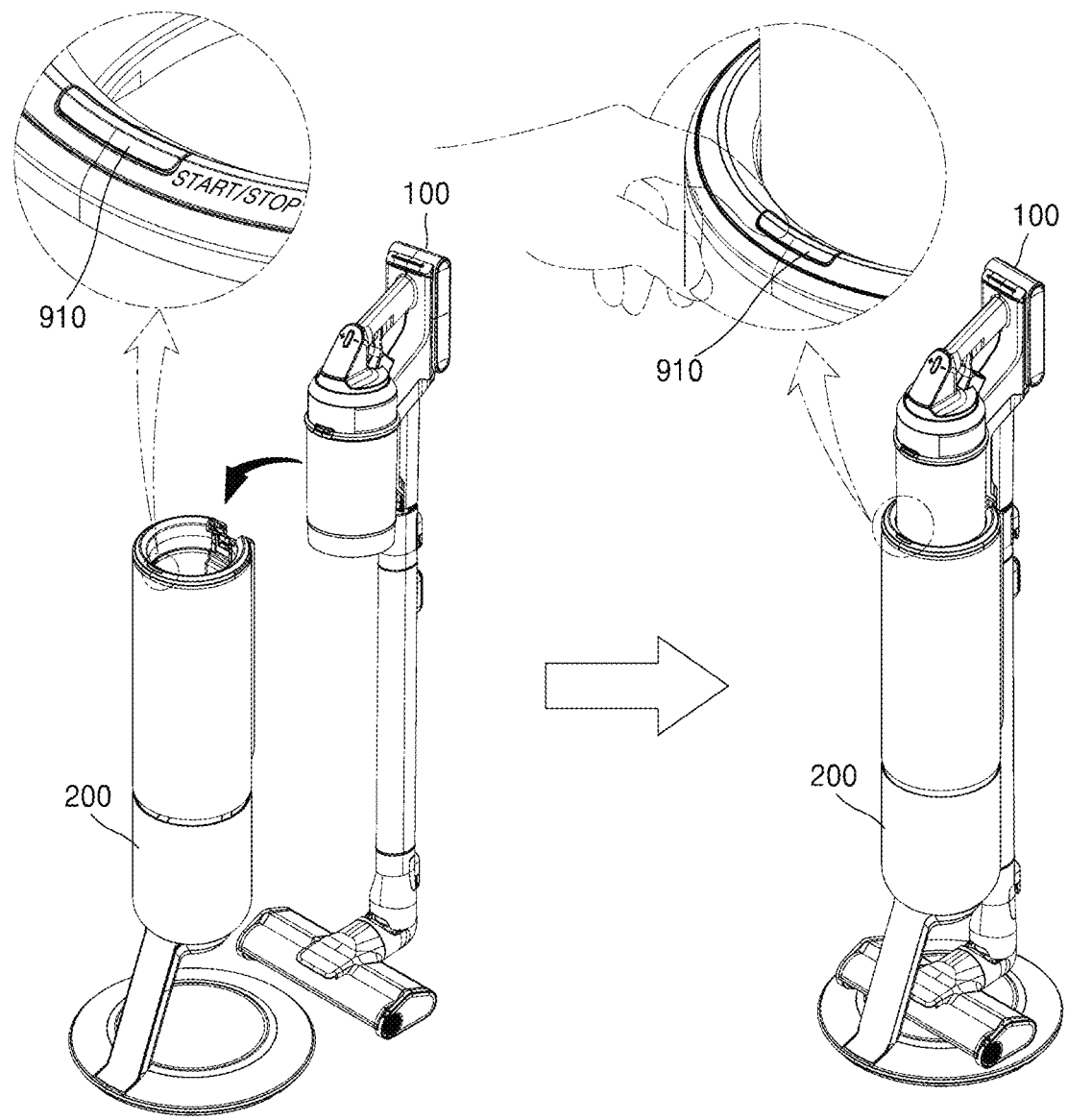
FIG. 9 illustrates a manual discharge mode according to an embodiment of the disclosure.

Referring to FIG. 9, as the station device 200 receives a user input of pressing a dust discharging start/end button 910 while the cordless vacuum cleaner 100 is docked on the station device 200, the station device 200 may control, regardless of a set mode, the step motor to open the cover 10 of the dustbin 1200. According to an embodiment of the disclosure, the dust discharging start/end button 910 may be provided on top of the station device 200. When the dust discharging start/end button 910 is pressed again, the station device 200 may stop a dust discharge operation and may control the step motor to close the cover 10 of the dustbin 1200.

Referring back to FIG. 7, in operation S720, as the station device 200 according to an embodiment of the disclosure detects occurrence of the event requesting dust discharging from the dustbin 1200, the station device 200 may transmit, to the cordless vacuum cleaner 100, a control signal for operating the first suction motor 1110 of the cordless vacuum cleaner 100 for dust discharging.

According to an embodiment of the disclosure, as the cordless vacuum cleaner 100 is docked, the station device 200 may transmit the control signal for operating the first suction motor 1110 to the cordless vacuum cleaner 100 via short-range wireless communication (e.g.: BLE communication).

According to an embodiment of the disclosure, the control signal may include information about a suction force generation pattern selected by the station device 200. For example, in an embodiment where a plurality of operation modes is provided, and different suction force generation patterns are respectively defined for the plurality of operation modes, the station device 200 may transmit, to the cordless vacuum cleaner 100, the control signal including information about a suction force generation pattern (e.g.: identification information of the suction force generation pattern) corresponding to a certain operation mode among the plurality of operation modes. However, in an embodiment where a single suction force generation pattern is defined, the control signal may simply include a signal for operating the first suction motor 1110 for dust discharging.

A suction force generation pattern may determine an operation of the first suction motor 1110 and an operation of the second suction motor 207. For example, the suction force generation pattern may be variously defined based on a combination of at least two selected from an ON/OFF operation of the first suction motor 1110, an ON/OFF operation of the second suction motor 207, a suction force level of the first suction motor 1110, and a suction force level of the second suction motor 207. The suction force generation pattern may include a plurality of time periods. In each time period, an operation condition which may be defined based on a combination of an operation of the first suction motor 1110 and an operation of the second suction motor 207 may vary. In each time period, an operation of the first suction motor 1110 and an operation of the second suction motor 207 may be the same as or different from each other. An operation of a suction motor (e.g.: the first suction motor 1110 or the second suction motor 207) may include an ON operation of operating the suction motor, an OFF operation of not-operating the suction motor, a PWM operation of alternately repeating operating and not-operating of the suction motor, or the like, but the disclosure is not limited thereto. The operation condition defined based on a combination of an operation of the first suction motor 1110 and an operation of the second suction motor 207 will be described in detail below with reference to FIGS. 13A and 13B.

The cordless vacuum cleaner 100 may store an operation sequence (hereinafter, also referred to as the first operation sequence) of the first suction motor 1110 for dust discharging, in the memory 1900. In an embodiment where a plurality of suction force generation patterns is defined, the cordless vacuum cleaner 100 may store, in the memory 1900, first operation sequences of the first suction motor 1110 which respectively correspond to the plurality of suction force generation patterns. When a control signal is received from the station device 200, the cordless vacuum cleaner 100 may operate the first suction motor 1110, according to a first operation sequence of the first suction motor 1110 which is stored in the memory 1900. For example, the cordless vacuum cleaner 100 may control an ON/OFF operation of the first suction motor 1110, and a suction force level (power consumption) of the first suction motor 1110, according to the first operation sequence. When the control signal includes identification information of a suction force generation pattern, the cordless vacuum cleaner 100 may identify, from among a plurality of first operation sequences, a first operation sequence corresponding to the identification information of the suction force generation pattern, and may operate the first suction motor 1110, according to the identified first operation sequence.

An operation in which the station device 200 transmits the control signal including information associated with a suction force generation pattern to the cordless vacuum cleaner 100 will be described in detail below with reference to FIG. 11.

In operation S730, the station device 200 according to an embodiment of the disclosure may operate the second suction motor 207 of the station device 200 together or in cooperation with operating of the first suction motor 1110 of the cordless vacuum cleaner 100, thereby performing a dust discharge operation.

According to an embodiment of the disclosure, the station device 200 may operate the second suction motor 207, in synchronization (or cooperation) with an operation point of the first suction motor 1110, based on a suction force generation pattern. Here, the first suction motor 1110 and the second suction motor 207 may simultaneously or sequentially operated.

According to an embodiment of the disclosure, the station device 200 may store, in the memory 202, an operation sequence (hereinafter, also referred to as the second operation sequence) of the second suction motor 207 for dust discharging. When there are a plurality of suction force generation patterns, the station device 200 may store, in the memory 202, second operation sequences of the second suction motor 207 which respectively correspond to the plurality of suction force generation patterns. Therefore, after the station device 200 transmits a control signal for operating the first suction motor 1110 to the cordless vacuum cleaner 100, the station device 200 may operate the second suction motor 207 according to a second operation sequence of the second suction motor 207 included in the memory 202. For example, the station device 200 may control an ON/OFF operation of the second suction motor 207, and a suction force level (power consumption) of the second suction motor 207, according to the second operation sequence. When a suction generation pattern is provided in a multiple number, the station device 200 may operate the second suction motor 207 according to a second operation sequence included in a suction generation pattern corresponding to a preset operation mode.

In a dust discharge operation of the station device 200, when the first suction motor 1110 is operated together or in cooperation with the second suction motor 207, a flow path in which air moves in the dustbin 1200 may vary and an amount of airflow may also be increased. When the flow path is changed, foreign substances stuck without going down to the collector 209 in the dustbin 1200 may go upward and may move to the collector 209 when there are going down to new locations, such that dust discharging efficiency may be improved. Also, the station device 200 may increase in response to an increase of an amount of airflow, a dust discharge operation time of the station device 200 may be decreased (e.g.: 30 seconds→15 seconds), a size of the second suction motor 207 may be decreased (minimization), or power consumption (e.g.: 1400 W→1000 W) of the second suction motor 207 may be decreased.

According to an embodiment of the disclosure, in a condition where operating of the first suction motor 1110 is available, the station device 200 may perform a dust discharge operation by both operating the first suction motor 1110 and the second suction motor 207. When operating of the first suction motor 1110 is not available, the station device 200 may perform a dust discharge operation by only operating the second suction motor 207. Afterward, when operating of the first suction motor 1110 is available, the station device 200 may perform a dust discharge operation again by both using the first suction motor 1110 and the second suction motor 207. Hereinafter, a method by which the station device 200 performs a dust discharge operation, depending on availability or non-availability of the first suction motor 1110, will be described in detail with reference to FIG. 10.

Figure 10:
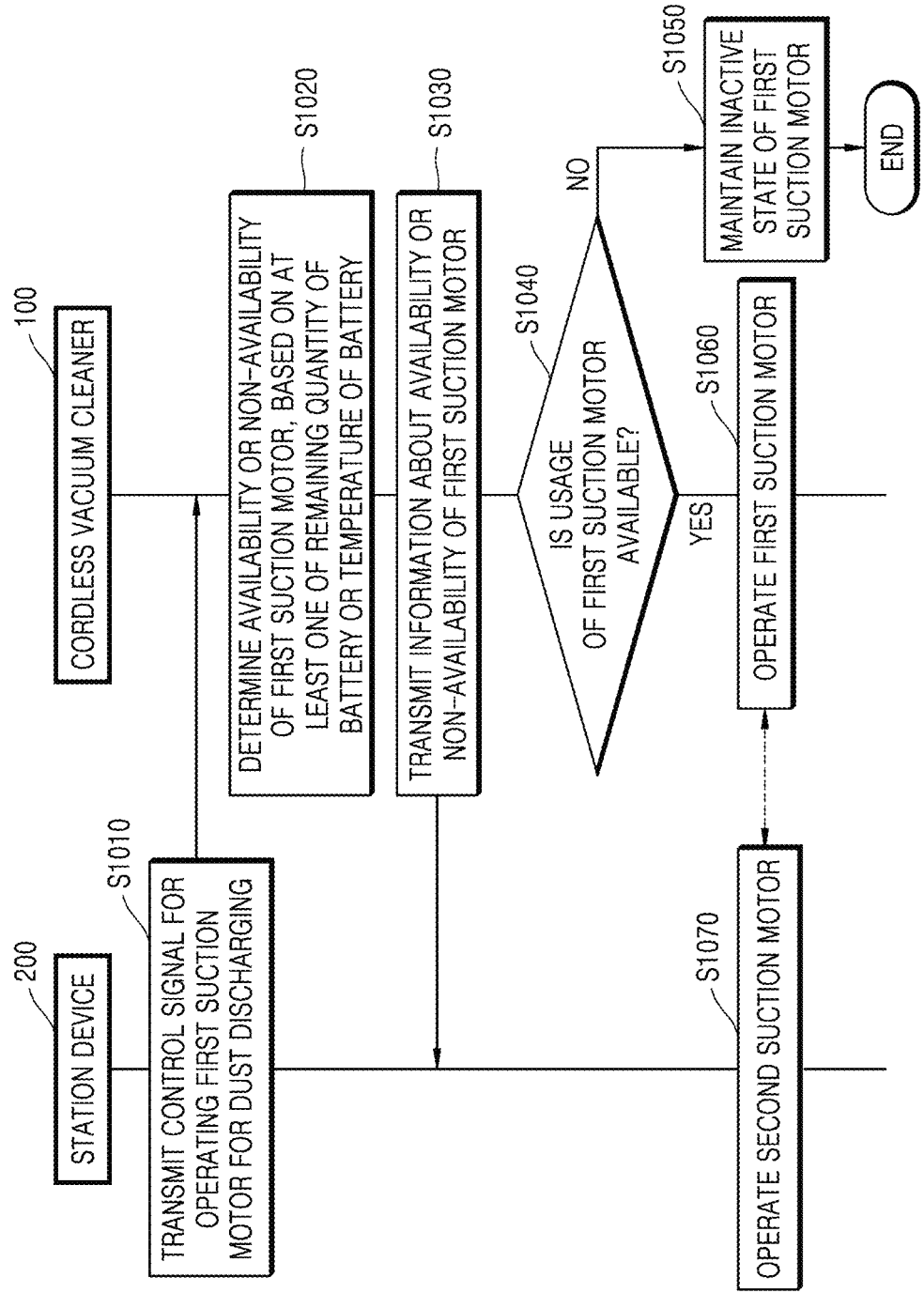
FIG. 10 illustrates a flowchart for describing a method of performing a dust discharge operation, depending on availability or non-availability of a first suction motor, according to an embodiment of the disclosure.

FIG. 10 illustrates a flowchart for describing a method of performing a dust discharge operation, depending on availability or non-availability of the first suction motor 1110, according to an embodiment of the disclosure.

In operation S1010, the station device 200 according to an embodiment of the disclosure may transmit, to the cordless vacuum cleaner 100, a control signal for operating the first suction motor 1110 for dust discharging.

According to an embodiment of the disclosure, as the cordless vacuum cleaner 100 is docked, the station device 200 may transmit the control signal for operating the first suction motor 1110 to the cordless vacuum cleaner 100 via short-range wireless communication (e.g.: BLE communication).

Operation S1010 corresponds to operation S720 of FIG. 7, and thus, any repetitive detailed descriptions thereof will be omitted.

In operation S1020, the cordless vacuum cleaner 100 according to an embodiment of the disclosure may determine availability or non-availability of the first suction motor 1110, based on at least one of a remaining quantity of the battery 1500 or a temperature of the battery 1500.

According to an embodiment of the disclosure, when the control signal is received from the station device 200, the cordless vacuum cleaner 100 may determine, before operating the first suction motor 1110, whether the first suction motor 1110 is operable. For example, the cordless vacuum cleaner 100 may determine whether the first suction motor 1110 is currently operable for dust discharging, based on at least one of a remaining quantity of the battery 1500 or a temperature of the battery 1500.

According to an embodiment of the disclosure, when the remaining quantity of the battery 1500 is equal to or less than a threshold value, the cordless vacuum cleaner 100 may determine that usage of the first suction motor 1110 is not available. For example, as power of the battery 1500 is used to operate the first suction motor 1110, when the remaining quantity of the battery 1500 is not enough to operate the first suction motor 1110, the cordless vacuum cleaner 100 may determine that usage of the first suction motor 1110 is not available According to an embodiment of the disclosure, when a temperature of the battery 1500 exceeds a reference temperature range of the first suction motor 1110, the cordless vacuum cleaner 100 may determine that usage of the first suction motor 1110 is not available. For example, when the cordless vacuum cleaner 100 is used in a long time or under a harsh condition and thus a temperature of the battery 1500 is equal to or greater than a first threshold temperature (abnormal high temperature) or is less than a second threshold temperature (abnormal low temperature), an output of the battery 1500 may be stopped to ensure stability, such that the cordless vacuum cleaner 100 may determine that usage of the first suction motor 1110 is not available.

In operation S1030, the cordless vacuum cleaner 100 according to an embodiment of the disclosure may transmit information about availability or non-availability of the first suction motor 1110 to the station device 200.

According to an embodiment of the disclosure, the cordless vacuum cleaner 100 may transmit information about availability or non-availability of the first suction motor 1110 to the station device 200 via short-range wireless communication (e.g.: BLE communication). For example, when it is determined that usage of the first suction motor 1110 is available, the cordless vacuum cleaner 100 may transmit, to the station device 200, information indicating that usage of the first suction motor 1110 is available. On the other hand, when it is determined that usage of the first suction motor 1110 is not available, the cordless vacuum cleaner 100 may transmit, to the station device 200, information indicating that usage of the first suction motor 1110 is not available.

In operations S1040 and S1050, the cordless vacuum cleaner 100 according to an embodiment of the disclosure may maintain an inactive state of the first suction motor 1110 when usage of the first suction motor 1110 is not available (NO of S1040).

Afterward, when the battery 1500 is charged or a temperature of the battery 1500 is in a normal temperature range, usage of the first suction motor 1110 may become available. Here, the cordless vacuum cleaner 100 may transmit information indicating that usage of the first suction motor 1110 is available to the station device 200 via short-range wireless communication (e.g.: BLE communication).

In operations S1040 and S1060, when usage of the first suction motor 1110 is available (YES of S1040), the cordless vacuum cleaner 100 according to an embodiment of the disclosure may operate the first suction motor 1110, based on the control signal of the station device 200.

According to an embodiment of the disclosure, when the control signal is received from the station device 200, the cordless vacuum cleaner 100 may operate the first suction motor 1110 according to a first operation sequence of the first suction motor 1110 which is stored in the memory 1900. For example, the cordless vacuum cleaner 100 may control an ON/OFF operation of the first suction motor 1110, and a suction force level (power consumption) of the first suction motor 1110, according to the first operation sequence. When the control signal includes identification information of a suction force generation pattern, the cordless vacuum cleaner 100 may identify, from among a plurality of first operation sequences, a first operation sequence corresponding to the identification information of the suction force generation pattern, and may operate the first suction motor 1110, according to the identified first operation sequence.

In operation S1070, the station device 200 according to an embodiment of the disclosure may operate the second suction motor 207.

According to an embodiment of the disclosure, when the first suction motor 1110 is available for dust discharging, the station device 200 may operate the second suction motor 207 in synchronization (or cooperation) with the first suction motor 1110. When the first suction motor 1110 is not available for dust discharging, the station device 200 may perform a dust discharge operation by only operating the second suction motor 207.

According to an embodiment of the disclosure, in a case where the cordless vacuum cleaner 100 is docked on the station device 200 but a remaining capacity of the battery 1500 is insufficient and thus the station device 200 performs a dust discharge operation by only using the second suction motor 207 but the battery 1500 is charged thereafter and thus usage of the first suction motor 1110 is available, the station device 200 may receive information indicating that usage of the first suction motor 1110 is available from the cordless vacuum cleaner 100 via short-range wireless communication (e.g.: BLE communication). Here, the station device 200 may perform a dust discharge operation again by using both the first suction motor 1110 and the second suction motor 207.

FIG. 10 shows an embodiment in which, after the station device 200 transmits a control signal for operating the first suction motor 1110 to the cordless vacuum cleaner 100, the station device 200 receives, from the cordless vacuum cleaner 100, information about availability or non-availability of the first suction motor 1110, but the disclosure is not limited thereto. Alternatively, before the station device 200 transmits a control signal for operating the first suction motor 1110 to the cordless vacuum cleaner 100, the station device 200 may receive information about availability or non-availability of the first suction motor 1110 from the cordless vacuum cleaner 100. For example, as the cordless vacuum cleaner 100 is docked, the station device 200 may transmit, to the cordless vacuum cleaner 100, a signal asking whether usage of the first suction motor 1110 for dust discharging is available. In response to the asking, the cordless vacuum cleaner 100 may transmit information about availability or non-availability of the first suction motor 1110 to the station device 200. Based on the information about availability or non-availability of the first suction motor 1110, the station device 200 may transmit a control signal for operating the first suction motor 1110 to the cordless vacuum cleaner 100 only when usage of the first suction motor 1110 is available. The cordless vacuum cleaner 100 may operate the first suction motor 1110, according to the control signal.

Hereinafter, an embodiment of a method by which, when the station device 200 has a plurality of operation modes for dust discharging, the station device 200 performs a dust discharge operation according to a preset operation mode from among the plurality of operation modes will now be described in detail with reference to FIG. 11.

Figure 11:
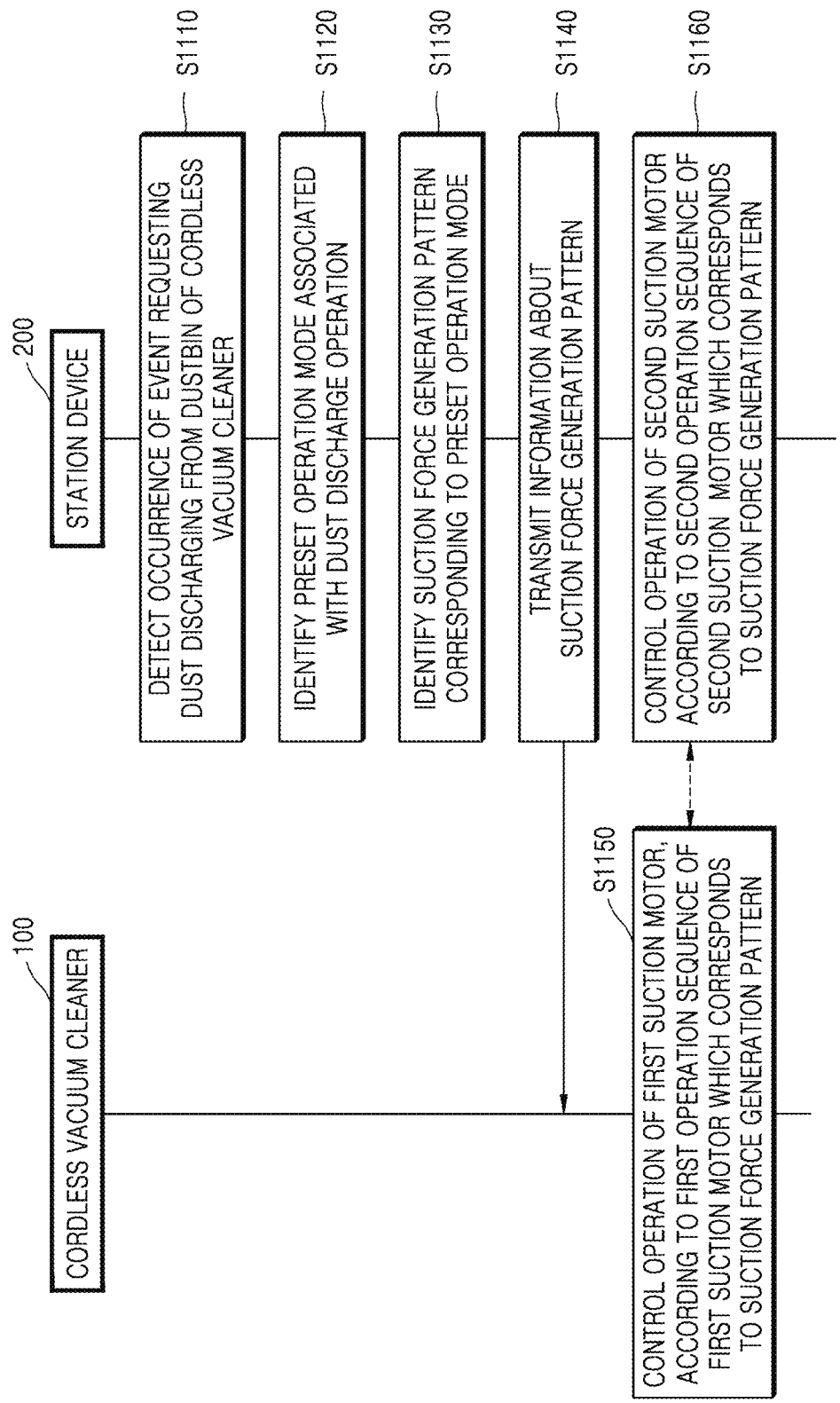
FIG. 11 illustrates a flowchart for describing a method of performing a dust discharge operation according to a suction force generation pattern corresponding to a preset operation mode, according to an embodiment of the disclosure.

FIG. 11 illustrates a flowchart for describing a method of performing a dust discharge operation according to a suction force generation pattern corresponding to a preset operation mode according to an embodiment of the disclosure.

In operation S1110, the station device 200 according to an embodiment of the disclosure may detect occurrence of an event requesting dust discharging from the dustbin 1200 of the cordless vacuum cleaner 100.

According to an embodiment of the disclosure, the event requesting dust discharging from the dustbin 1200 may include at least one of an event in which the cordless vacuum cleaner 100 is docked on the station device 200, an event in which a user selects a dust discharging start button included in the station device 200, or an event in which an icon (e.g.: To empty dustbin) requesting dust discharging is selected (e.g.: click or touch) from an execution screen of an application of the user terminal 400.

Operation S1110 corresponds to operation S710 of FIG. 7, and thus, any repetitive detailed descriptions will be omitted.

In operation S1120, the station device 200 according to an embodiment of the disclosure may identify a preset operation mode associated with a dust discharge operation.

According to an embodiment of the disclosure, the station device 200 may have a plurality of operation modes which are selectable by a user, in association with the dust discharge operation. The plurality of operation modes may be variously defined according to whether the first suction motor 1110 is operated, a dust discharge operation time, a suction force level, or the like. For example, the plurality of operation modes may include 1) a first mode in which the first suction motor 1110 and the second suction motor 207 are operated together and a dust discharge operation time is 30 seconds, 2) a second mode in which the first suction motor 1110 and the second suction motor 207 are operated together and a dust discharge operation time is 20 seconds, 3) a third mode in which the first suction motor 1110 and the second suction motor 207 are operated together and a dust discharge operation time is 10 seconds, 4) a fourth mode in which only the second suction motor 207 is operated and a dust discharge operation time is 30 seconds, and 5) a fifth mode in which only the second suction motor 207 is operated and a dust discharge operation time is 10 seconds. The plurality of operation modes may be respectively expressed as an ultra-super mode, a super mode, a normal mode, a low-noise mode, an echo mode, etc., but the disclosure is not limited thereto.

Figure 12:
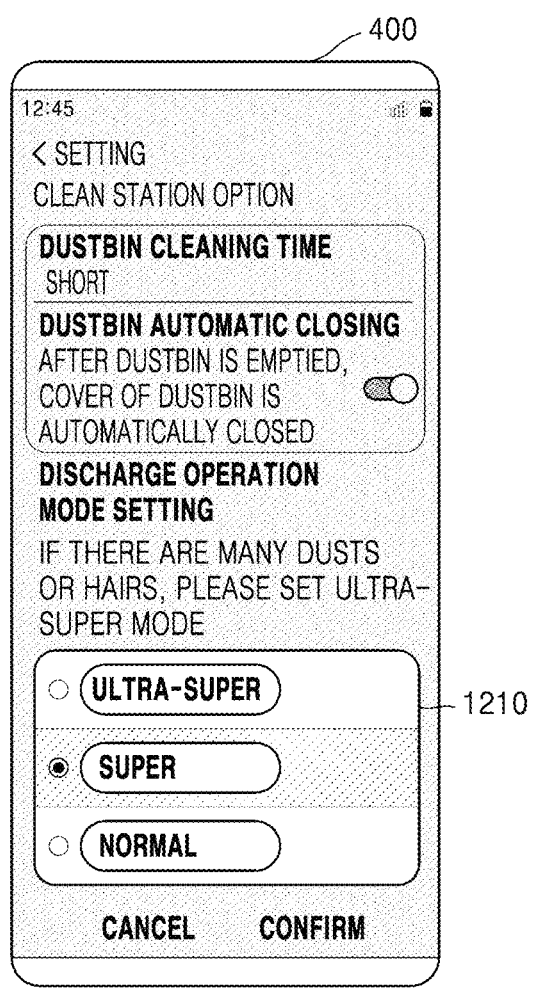
FIG. 12 illustrates a graphical user interface (GUI) for setting an operation mode according to an embodiment of the disclosure.

According to an embodiment of the disclosure, a user may select one of the plurality of operation modes via the user terminal 400. For example, referring to FIG. 12, when the user executes a particular application provided in the server device 300, the user terminal 400 may provide, on an execution screen of an application, a menu screen 1210 for setting an operation mode. The user may select one of the plurality of operation modes displayed on the menu screen 1210. For example, the user may select the super mode. Here, the user terminal 400 may transmit information about an operation mode (e.g.: the super mode) selected by the user to the station device 200 via the server device 300. The station device 200 may set an operation mode for dust discharging as the operation mode (e.g.: the super mode) selected by the user.

According to an embodiment of the disclosure, when the station device 200 detects occurrence of the event requesting dust discharging from the dustbin 1200, the station device 200 may identify a preset operation mode in association with a dust discharge operation. For example, the station device 200 may identify the operation mode (e.g.: the super mode) set by the user via the user terminal 400. When the user does not separately set an operation mode via the user terminal 400, the station device 200 may identify a default operation mode.

In operation S1130, the station device 200 according to an embodiment of the disclosure may identify a suction force generation pattern corresponding to the preset operation mode.

According to an embodiment of the disclosure, the suction force generation pattern may be variously defined based on a combination of at least two selected from an ON/OFF operation of the first suction motor 1110, an ON/OFF operation of the second suction motor 207, a suction force level of the first suction motor 1110, and a suction force level of the second suction motor 207.

In an embodiment where the station device 200 provides the plurality of operation modes related to a dust discharge operation, the station device 200 may define different suction force generation patterns respectively for the plurality of operation modes. Therefore, when the station device 200 identifies the preset operation mode from among the plurality of operation modes, the station device 200 may identify the suction force generation pattern corresponding to the preset operation mode.

The suction force generation pattern may include a plurality of time periods. In each time period, an operation condition defined based on a combination of an operation of the first suction motor 1110 and an operation of the second suction motor 207 may vary. In each time period, an operation of the first suction motor 1110 and an operation of the second suction motor 207 may be the same as or different from each other. An operation of a suction motor (e.g.: the first suction motor 1110 or the second suction motor 207) may include an ON operation of operating the suction motor, an OFF operation of not-operating the suction motor, a PWM operation of alternately repeating operating and not-operating of the suction motor, or the like, but the disclosure is not limited thereto. The operation condition which may occur according to a combination of an operation of the first suction motor 1110 and an operation of the second suction motor 207 will be described in detail below with reference to FIGS. 13A and 13B.

In an embodiment where the station device 200 provides the plurality of operation modes, information about the plurality of suction force generation patterns corresponding to the plurality of operation modes may be stored in the memory 202. When the station device 200 identifies the preset operation mode, the station device 200 may check, from among the plurality of suction force generation patterns, the suction force generation pattern corresponding to the preset operation mode. For example, when the preset operation mode is the ultra-super mode, the station device 200 may identify a first suction force generation pattern corresponding to the ultra-super mode.

In operation S1140, the station device 200 according to an embodiment of the disclosure may transmit, to the cordless vacuum cleaner 100, information about the suction force generation pattern corresponding to the preset operation mode.

According to an embodiment of the disclosure, the station device 200 may transmit information about the suction force generation pattern (e.g.: an identification value of the suction force generation pattern) corresponding to the preset operation mode to the cordless vacuum cleaner 100 via short-range wireless communication (e.g.: BLE communication). For example, when the preset operation mode is the ultra-super mode and a suction force generation pattern corresponding to the ultra-super mode is the first suction force generation pattern, the station device 200 may transmit a first identification value indicating the first suction force generation pattern to the cordless vacuum cleaner 100.

In operation S1150, the cordless vacuum cleaner 100 according to an embodiment of the disclosure may control an operation of the first suction motor 1110, according to a first operation sequence of the first suction motor 1110 which corresponds to the suction force generation pattern.

According to an embodiment of the disclosure, when the cordless vacuum cleaner 100 receives, from the station device 200, the information about the suction force generation pattern (e.g.: the identification value of the suction force generation pattern) corresponding to the preset operation mode, the cordless vacuum cleaner 100 may check the first operation sequence of the first suction motor 1110 which is stored therein to correspond to the suction force generation pattern. For example, when the first identification value indicating the first suction force generation pattern corresponding to the ultra-super mode is received, the cordless vacuum cleaner 100 may select a first first operation sequence (hereinafter, also referred to as "1-1 operation sequence") corresponding to the first identification value, from among a plurality of first operation sequences. The cordless vacuum cleaner 100 may adjust an ON/OFF operation of the first suction motor 1110, and a suction force level of the first suction motor 1110, according to the 1-1 operation sequence.

In operation S1160, the station device 200 according to an embodiment of the disclosure may control an operation of the second suction motor 207 according to a second operation sequence of the second suction motor 207 which corresponds to the identified suction force generation pattern.

For example, when the preset operation mode is the ultra-super mode and a suction force generation pattern corresponding to the ultra-super mode is the first suction force generation pattern, the station device 200 may check, from among a plurality of second operation sequences, a first second operation sequence (hereinafter, also referred to as "2-1 operation sequence") corresponding to the first suction force generation pattern. The station device 200 may adjust an ON/OFF operation of the second suction motor 207, and a suction force level of the second suction motor 207, according to the 2-1 operation sequence.

According to an embodiment of the disclosure, when the first suction motor 1110 is operated according to the 1-1 operation sequence corresponding to the first suction force generation pattern, and the second suction motor 207 is operated according to the 2-1 operation sequence corresponding to the first suction force generation pattern, an amount of airflow of the dustbin 1200 or a flow path of the dustbin 1200 is significantly changed, such that dust discharging efficiency may be substantially improved.

Hereinafter, an embodiment of an operation in which the station device 200 operates the first suction motor 1110 and the second suction motor 207 according to a suction force generation pattern corresponding to a preset operation mode will now be described in detail with reference to FIGS. 13A to 17.

Figure 13A:
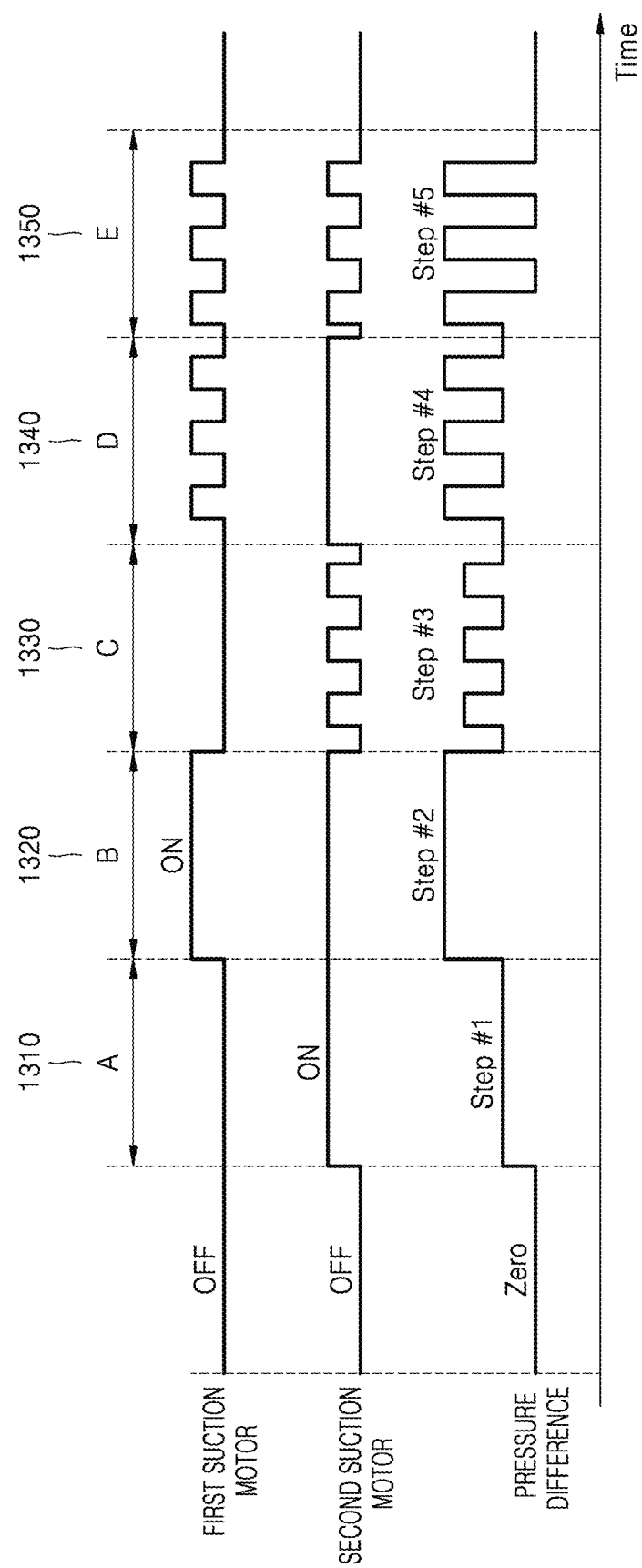
FIG. 13A illustrates various operation conditions for dust discharging according to an embodiment of the disclosure.
Figure 13B:
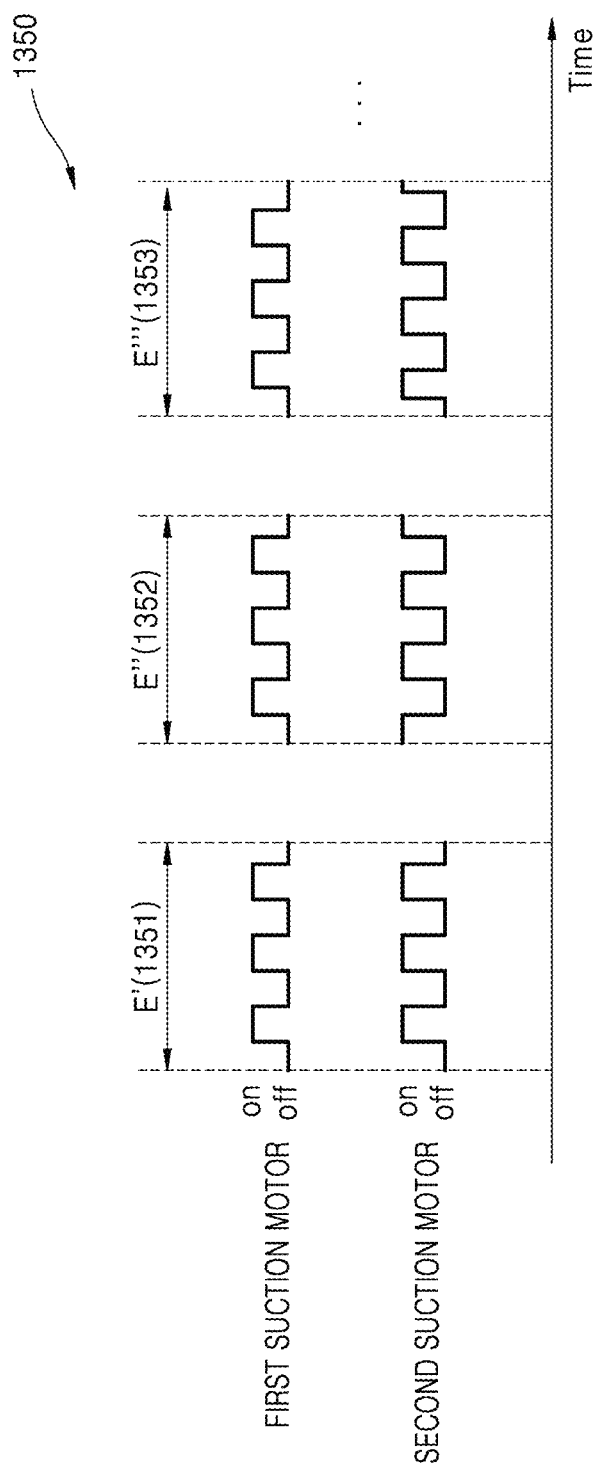
FIG. 13B illustrates various operation conditions for dust discharging according to an embodiment of the disclosure.

FIG. 13A illustrates various operation conditions for dust discharging according to an embodiment of the disclosure. FIG. 13B illustrates various operation conditions for dust discharging according to an embodiment of the disclosure.

Referring to FIG. 13A, an operation condition for dust discharging defined based on a combination of an operation of the first suction motor 1110 and an operation of the second suction motor 207 may include 5 types roughly. For example, the operation condition for dust discharging may include 1) A operation 1310 in which the first suction motor 1110 is not operated (OFF) and the second suction motor 207 is operated (ON), 2) B operation 1320 in which both the first suction motor 1110 and the second suction motor 207 are operated (ON), 3) C operation 1330 in which the first suction motor 1110 is not operated (OFF) and the second suction motor 207 repeats operating and not-operating (PWM), 4) D operation 1340 in which the first suction motor 1110 repeats operating and not-operating (PWM) and the second suction motor 207 are operated (ON), and 5) E operation 1350 in which both the first suction motor 1110 and the second suction motor 207 repeat operating and not-operating (PWM).

Referring to FIG. 13B, E operation 1350 may vary according to an operating time (ON duty) of the first suction motor 1110, an operating time (ON duty) of the second suction motor 207, an operating time difference between the first suction motor 1110 and the second suction motor 207, or the like. For example, E operation 1350 may be expressed as E' operation condition 1351 in which a PWM pattern of the first suction motor 1110 and a PWM pattern of the second suction motor 207 are the same as each other, E'' operation condition 1352 in which a PWM pattern of the first suction motor 1110 and a PWM pattern of the second suction motor 207 are opposite to each other, or E''' operation condition 1353 in which a PWM pattern of the first suction motor 1110 and a PWM pattern of the second suction motor 207 partly overlap without being synchronized with each other. In each operation condition, a pressure in the dustbin 1200 may be variously changed.

According to an embodiment of the disclosure, an amount of airflow in the dustbin 1200, a flow path in the dustbin 1200, and a suction force for dust discharging in each operation condition may differ from each other. This will be described in detail with reference to FIG. 14.

FIG. 14 illustrates various operation conditions for dust discharging according to an embodiment of the disclosure.

In general, when the first suction motor 1110 is operated, air with dust are sucked up via a suction hole of the brush device 2000 and are drawn into the dustbin 1200, and then dust is collected in the dustbin 1200 due to a centrifugal force and purified air is externally discharged via a filter unit (e.g., HEPA filter). Also, when the second suction motor 207 of the station device 200 is operated for dust discharging, an air flow stream (hereinafter, also referred to as the β flow path) due to air drawn via a discharge port via which purified air is discharged is generated, as well as an air flow stream (hereinafter, also referred to as the α flow path) due to air drawn via the suction hole of the brush device 2000. Air drawn into the station device 200 is discharged via a lower portion (the filter unit) of the station device 200.

In a case where only the second suction motor 207 of the station device 200 is operated in A operation condition 1410, an airflow amount (hereinafter, also referred to as the α airflow amount) drawn via the suction hole of the brush device 2000 may be about 70%, and an airflow amount (hereinafter, also referred to as the β airflow amount) drawn via the filter unit connected to the dustbin 1200 may be about 30%. Hereinafter, descriptions are provided, assuming that a suction force when only the second suction motor 207 of the station device 200 is operated is a normal suction force of about 100%.

In a case where the second suction motor 207 of the station device 200 together or in cooperation with the first suction motor 1110 of the cordless vacuum cleaner 100 are operated in B operation condition 1420, an airflow amount (the α airflow amount) drawn via the suction hole of the brush device 2000 may be about 140% which is increased by approximately two times, compared to A operation condition 1410. Also, an airflow amount (the β airflow amount) discharged via the filter unit connected to the dustbin 1200 may be about 20%. Therefore, a total amount of airflow (α-β) of the dustbin 1200 is about 120%, so that a suction force of B operation condition 1420 is increased, compared to the normal suction force of A operation condition 1410. Also, as not only a flow path (α flow path) in the dustbin 1200 which moves down to the second suction motor 207 of the station device 200 but also a flow path (-β flow path) of the dustbin 1200 in which air moves to the filter unit are generated, foreign substances in the dustbin 1200 may change their locations while moving up and down. Therefore, according to B operation condition 1420, it is possible to prevent foreign substances from being stuck, without moving downward, at a particular location due to a structure of the dustbin 1200.

In C operation condition 1430, the second suction motor 207 of the station device 200 may repeat an ON/OFF operation. When the second suction motor 207 is operated, an amount of airflow drawn via the suction hole of the brush device 2000 is about 70%, and an amount of airflow drawn via the filter unit connected to the dustbin 1200 is about 30%. When operating of the second suction motor 207 is stopped, an amount of airflow is 0%, and at this time, foreign substances slightly move upward (against-gravity direction)

of the dustbin 1200 and then move downward due to gravity, such that locations of the foreign substances may be changed.

In D operation condition 1440, the second suction motor 207 of the station device 200 is continuously operated, and the first suction motor 1110 of the cordless vacuum cleaner 100 may repeat an ON/OFF operation. Here, when the first suction motor 1110 is in an ON state, an amount of airflow may be about 120% (α: about 140%, β: about −20%), and when the first suction motor 1110 is in an OFF state, an amount of airflow may be about 100% (α: about 70%, β: about 30%). That is, the amount of airflow may alter at 120% and 100%. When the first suction motor 1110 is in an ON state, air is discharged to the filter unit connected to the dustbin 1200, but when the first suction motor 1110 is in an OFF state, air is drawn to the filter unit connected to the dustbin 1200. That is, a flow path when the first suction motor 1110 is in the ON state and a flow path when the first suction motor 1110 is in the OFF state are different from each other. Therefore, when the first suction motor 1110 is switched from the OFF state to the ON state, dust in the dustbin 1200 moves upward, and when the first suction motor 1110 is switched back to the OFF state, the dust moves downward such that a location of the dust may be changed. Therefore, according to D operation condition 1440, it is possible to prevent dust from being stuck, without moving downward, at a particular location due to a structure of the dustbin 1200.

In E operation condition 1450, while an ON/OFF operation is repeated on the second suction motor 207 of the station device 200, an ON/OFF operation may be repeated on the first suction motor 1110 of the cordless vacuum cleaner 100. At this time, when both the second suction motor 207 of the station device 200 and the first suction motor 1110 of the cordless vacuum cleaner 100 are in an ON state, an amount of airflow may be about 120% (α: about 140%, β: about −20%), whereas, when both the second suction motor 207 of the station device 200 and the first suction motor 1110 of the cordless vacuum cleaner 100 are in an OFF state, an amount of airflow may be about 0%, and when only the second suction motor 207 of the station device 200 is in an ON state, an amount of airflow may be 100% (α: about 140%, β: about −20%). That is, the amount of airflow may alter between 120%, 0%, and 100%.

When the first suction motor 1110 is in an ON state, air is discharged to the filter unit connected to the dustbin 1200, but, when the first suction motor 1110 is in an OFF state, air is drawn into the filter unit connected to the dustbin 1200. That is, a flow path when the first suction motor 1110 is in the ON state and a flow path when the first suction motor 1110 is in the OFF state are different from each other. Therefore, when the first suction motor 1110 is switched from the OFF state to the ON state, dust in the dustbin 1200 moves upward, and when the first suction motor 1110 is switched back to the OFF state, the dust moves downward such that a location of the dust may be changed. Therefore, according to E operation condition 1450, it is possible to prevent dust from being stuck, without moving downward, at a particular location due to a structure of the dustbin 1200.

When ON/OFF time and ON/OFF duration of the first suction motor 1110 and the second suction motor 207 are adjusted in E operation condition 1450, a change in an amount of airflow may vary in various patterns (e.g.: α: 140%→0%→70% ... , α: 140%→0%→140% ... ).

Amounts of airflow (e.g.: α: 70%, β: 30%) illustrated in FIG. 14 are merely an example, and the disclosure is not limited thereto. The amounts of airflow illustrated in FIG. 14 may change due to various factors including power consumption (suction power level) of the first suction motor 1110, power consumption (suction power level) of the second suction motor 207, a state (e.g.: a contamination level, a blockage level) of the filter unit (e.g.: a motor filter, a HEPA filter, etc.) included in the cleaner body 1000, blockage (a level of pressure loss) due to inner contamination or foreign substances in the brush device 2000 or the extension tube 3000, production specification or configuration, or the like.

According to an embodiment of the disclosure, at least some of operation conditions of A operation condition 1410 to E operation condition 1450 are combined to define suction force generation patterns, so that an amount of airflow in the dustbin 1200 may be adjusted and a flow path in the dustbin 1200 may be changed to increase dust discharging efficiency of the station device 200. The suction force generation patterns generated by combining at least some of operation conditions of A operation condition 1410 to E operation condition 1450 will now be described in detail with reference to FIG. 15A.

FIG. 15A illustrates a suction force generation pattern corresponding to a preset operation mode according to an embodiment of the disclosure.

Referring to FIG. 15A, a suction force generation pattern 1520 may be differently defined for each operation mode 1510. According to an embodiment of the disclosure, the suction force generation pattern 1520 may be differently defined, according to a function of the operation mode 1510 or an operation time of the operation mode 1510. For example, an operation sequence 1530 of the suction force generation pattern 1520 may be defined to further include D operation condition (see 1340 of FIG. 13A) or E operation condition (see 1350 of FIG. 13A) as the operation mode 1510 requests a higher dust discharging level.

A first suction force generation pattern 1521 corresponding to A operation mode 1511 may be defined in order of A operation condition 1310, B operation condition 1320, C operation condition 1330, D operation condition 1340, B operation condition 1320, D operation condition 1340, A operation condition 1310, and C operation condition 1330.

A second suction force generation pattern 1522 corresponding to B operation mode 1512 may be defined in order of A operation condition 1310, B operation condition 1320, C operation condition 1330, E operation condition 1350, B operation condition 1320, D operation condition 1340, E operation condition 1350, and C operation condition 1330.

A third suction force generation pattern 1523 corresponding to C operation mode 1513 may be defined in order of A operation condition 1310, B operation condition 1320, C operation condition 1330, E' operation condition 1351, E" operation condition 1352, D operation condition 1340, E'" operation condition 1353, and C operation condition 1330.

When A operation mode 1511 is set for the station device 200, and the station device 200 detects occurrence of an event requesting dust discharging from the dustbin 1200, the station device 200 may control operations of the first suction motor 1110 and the second suction motor 207, according to the first suction force generation pattern 1521 corresponding to A operation mode 1511. For example, the station device 200 may transmit, to the cordless vacuum cleaner 100, a control signal for allowing the first suction motor 1110 to operate according to a first operation sequence corresponding to the first suction force generation pattern 1521, and may control the second suction motor 207 according to a second operation sequence corresponding to the first suction force generation pattern 1521. The first operation sequence and the second operation sequence will now be further described with reference to FIG. 15B.

Figure 15B:
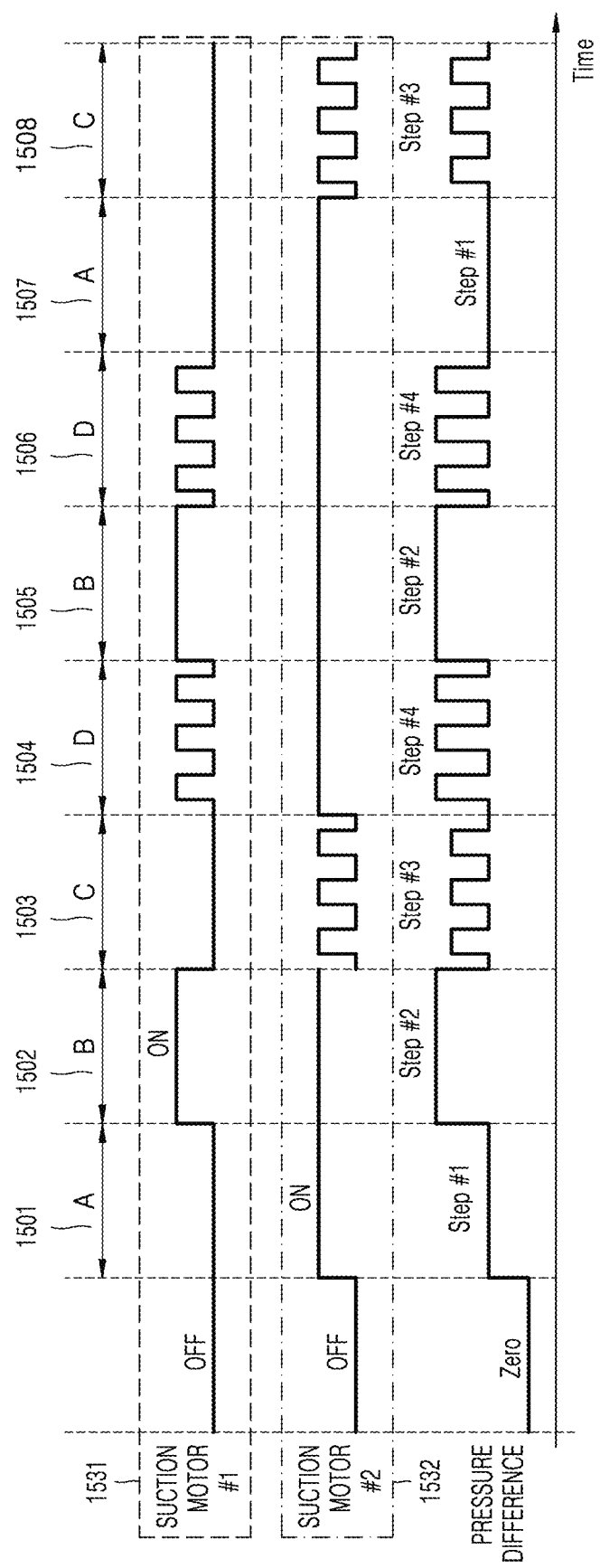
FIG. 15B illustrates a first operation sequence and a second operation sequence corresponding to suction force generation patterns, according to an embodiment of the disclosure.

FIG. 15B illustrates a first operation sequence and a second operation sequence corresponding to suction force generation patterns according to an embodiment of the disclosure.

According to an embodiment of the disclosure, when A operation mode 1511 is set for the station device 200, and the station device 200 detects occurrence of an event requesting dust discharging from the dustbin 1200, the station device 200 may identify the first suction force generation pattern 1521 corresponding to A operation mode 1511. The first suction force generation pattern 1521 may be configured of a first operation sequence 1531 for the first suction motor 1110 and a second operation sequence 1532 for the second suction motor 207. The first operation sequence 1531 may be stored in the memory 1900 of the cordless vacuum cleaner 100, and the second operation sequence 1532 may be stored in the memory 202 of the station device 200.

According to an embodiment of the disclosure, the station device 200 may transmit, to the cordless vacuum cleaner 100, a control signal including an identification value indicating the first suction force generation pattern 1521 (or A operation mode 1511). Here, the cordless vacuum cleaner 100 may check the first operation sequence 1531 stored in correspondence to the first suction force generation pattern 1521, and may operate the first suction motor 1110 according to the first operation sequence 1531. For example, the at least one processor 1001 of the cordless vacuum cleaner 100 may operate the first suction motor 1110 in an OFF state during a first time period 1501, in an ON state during a second time period 1502, in an OFF state during a third time period 1503, in PWM state (ON/OFF repetition) during a fourth time period 1504, in an ON state during a fifth time period 1505, in PWM state (ON/OFF repetition) during a sixth time period 1506, and in an OFF state during a seventh time period 1507 and an eighth time period 1508.

The station device 200 may check the second operation sequence 1532 stored in correspondence to the first suction force generation pattern 1521, and may operate the second suction motor 207 according to the second operation sequence 1532. For example, the station device 200 may operate the second suction motor 207 in an ON state during the first time period 1501 and the second time period 1502, in PWM state (ON/OFF repetition) during the third time period 1503, in an ON state during the fourth time period 1504 to the seventh time period 1507, and in PWM state (ON/OFF repetition) during the eighth time period 1508.

A suction force generation pattern may be variously changed according to a change in a suction force level of the first suction motor 1110 or a change in a suction force level of the second suction motor 207. The suction force generation pattern will now be further described with reference to FIG. 16.

FIG. 16 illustrates various operation conditions according to a change in a suction force level according to an embodiment of the disclosure.

Referring to FIG. 16, A operation condition (see 1410 of FIG. 14) in which only the second suction motor 207 is operated may vary according to a suction force level (power consumption) of the second suction motor 207. For example, A operation condition 1410 may include A-1 operation condition 1601 in which a suction force level of the second suction motor 207 is 250 W and A-2 operation condition 1602 in which a suction force level of the second suction motor 207 is 100 W.

In A-1 operation condition 1601 in which the suction force level of the second suction motor 207 is 250 W, an amount of airflow may be about 100% (α: about 70%, β: about 30%). On the other hand, in A-2 operation condition 1602 in which the suction force level of the second suction motor 207 is 100 W, an amount of airflow may be about 40% which is lower than A-1 operation condition 1601.

B operation condition (see 1420 of FIG. 14) in which both the first suction motor 1110 and the second suction motor 207 are operated together may vary according to a suction force level (power consumption) of the first suction motor 1110 or a suction force level (power consumption) of the second suction motor 207. For example, B operation condition 1420 may include B-1 operation condition 1603 in which a suction force level of the first suction motor 1110 is 20 W and a suction force level of the second suction motor 207 is 250 W, B-2 operation condition 1604 in which a suction force level of the first suction motor 1110 is 90 W and a suction force level of the second suction motor 207 is 250 W, and B-3 operation condition 1605 in which a suction force level of the first suction motor 1110 is 90 W and a suction force level of the second suction motor 207 is 100 W.

In B-1 operation condition 1603, an amount of airflow may be about 120% (α: 140%, β: −20%). On the other hand, in B-2 operation condition 1604, an amount of airflow may be about 160% (α: 200%, β: −40%) which is increased, compared to B-1 operation condition 1603. That is, when a suction force level of the first suction motor 1110 is increased, an amount of airflow may be increased.

Also, in B-3 operation condition 1605, an amount of airflow may be about 50% (α: 110%, β: −60%) which is decreased, compared to B-2 operation condition 1604. That is, when a suction force level of the second suction motor 207 is decreased, an amount of airflow may be decreased.

Therefore, according to an embodiment of the disclosure, when the first suction motor 1110 is an OFF state, the station device 200 may change an amount of airflow by adjusting power consumption (suction force level) of the second suction motor 207. Also, when both the first suction motor 1110 and the second suction motor 207 are in an ON state, the station device 200 may adjust an amount of airflow by transmitting a control signal for adjusting power consumption (suction force level) of the first suction motor 1110 to the cordless vacuum cleaner 100 or adjusting power consumption (suction force level) of the second suction motor 207.

FIG. 17 illustrates a suction force generation pattern corresponding to a preset operation mode according to an embodiment of the disclosure.

Referring to FIG. 17, a suction force generation pattern 1720 may be differently defined for each operation mode 1710. According to an embodiment of the disclosure, at least some operation conditions of A operation condition (see 1310 of FIG. 13A) to E operation condition (see 1350 of FIG. 13A) are combined with one another, and power consumption (suction force level) of the first suction motor 1110 or the second suction motor 207 is set, so that the suction force generation pattern 1720 corresponding to the operation mode 1710 may be defined.

A first suction force generation pattern 1721 corresponding to A operation mode 1711 may be defined in order of A-1 operation condition 1601, B-1 operation condition 1603, C operation condition 1330, D operation condition 1340, B-2 operation condition 1604, D operation condition 1430, A-2 operation condition 1602, and C operation condition 1330.

A second suction force generation pattern 1722 corresponding to B operation mode 1712 may be defined in order of A-1 operation condition 1601, A-2 operation condition 1602, B-1 operation condition 1603, B-2 operation condition 1604, C operation condition 1330, E operation condition 1350, B-3 operation condition 1605, D operation condition 1340, E operation condition 1350, and C operation condition 1330.

A third suction force generation pattern 1723 corresponding to C operation mode 1713 may be defined in order of A-1 operation condition 1601, B-1 operation condition 1603, C operation condition 1330, E' operation condition 1351, E" operation condition 1352, D operation condition 1340, E'" operation condition 1353, and C operation condition 1330.

According to an embodiment of the disclosure, after the station device 200 performs a dust discharge operation, the station device 200 may check whether dust discharging from the dustbin 1200 is well (or effectively) performed. For example, the station device 200 may check whether dust discharging is well performed, by using the first pressure sensor 1400 of the cordless vacuum cleaner 100 or the second pressure sensor 206 of the station device 200. Hereinafter, an operation in which the station device 200 checks whether dust discharging is well performed will now be described in detail with reference to FIG. 18.

Figure 18:
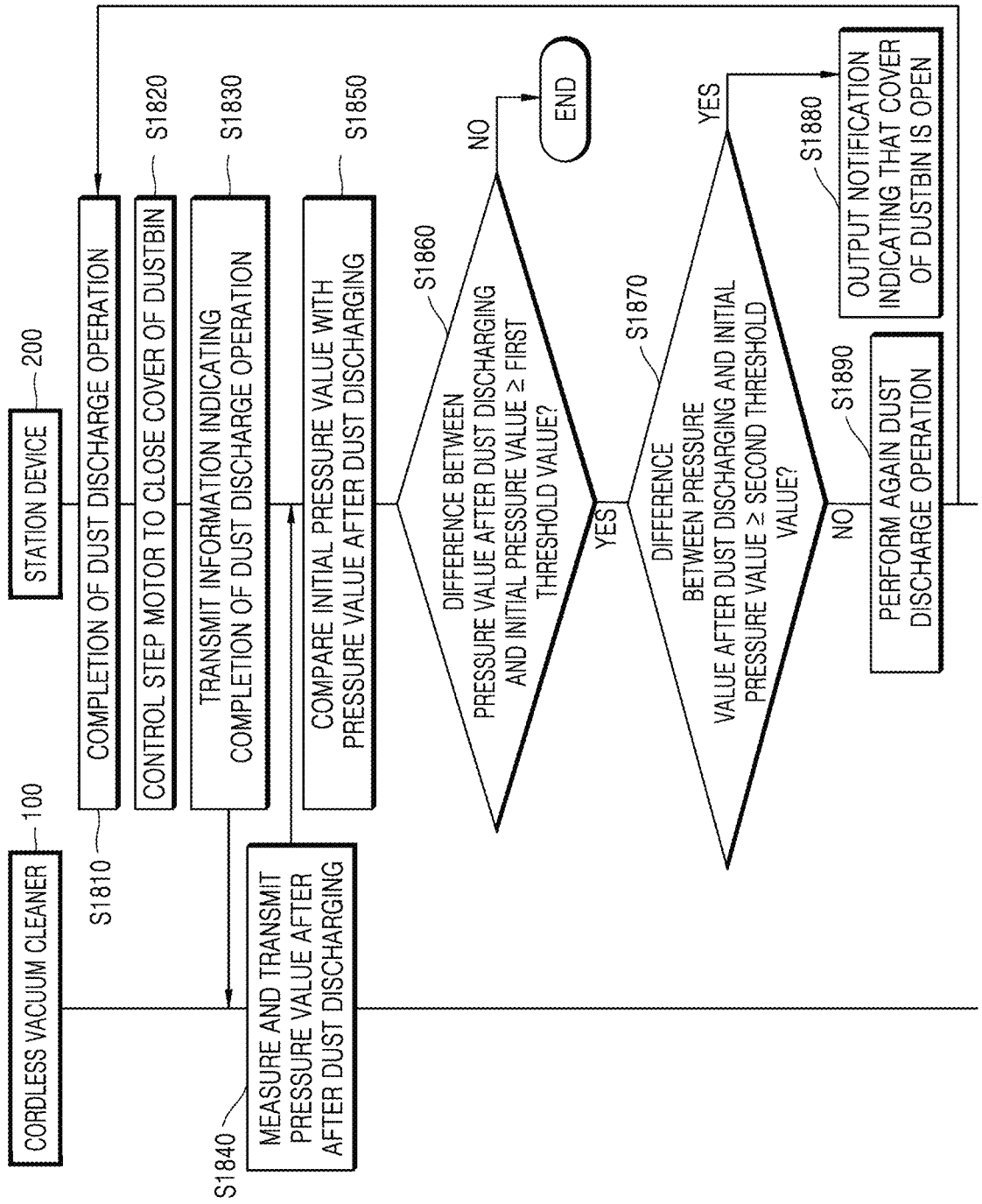
FIG. 18 illustrates a flowchart for describing a method by which a station device determines, by using an initial pressure value, a state of a dustbin after dust is discharged, according to an embodiment of the disclosure.

FIG. 18 illustrates a flowchart for describing a method by which the station device 200 determines, by using an initial pressure value, a state of the dustbin 1200 after dust is discharged, according to an embodiment of the disclosure.

In operation S1810, the station device 200 according to an embodiment of the disclosure may complete a dust discharge operation.

According to an embodiment of the disclosure, the station device 200 may operate both the first suction motor 1110 and the second suction motor 207, thereby performing a dust discharge operation during an operation time corresponding to a preset operation mode. For example, when a super mode is set for the station device 200, the station device 200 may perform a dust discharge operation for 20 seconds and then may complete the dust discharge operation. When an ultra-super mode is set for the station device 200, the station device 200 may perform a dust discharge operation for 30 seconds and then may complete the dust discharge operation.

In operation S1820, when the dust discharge operation is completed, the station device 200 according to an embodiment of the disclosure may control a step motor to close the cover 10 of the dustbin 1200.

According to an embodiment of the disclosure, in a case where an automatic close mode in which the cover 10 of the dustbin 1200 is to be automatically closed is set, the station device 200 may control the step motor to close the cover 10 of the dustbin 1200 when the dust discharge operation is completed.

Figure 19A:
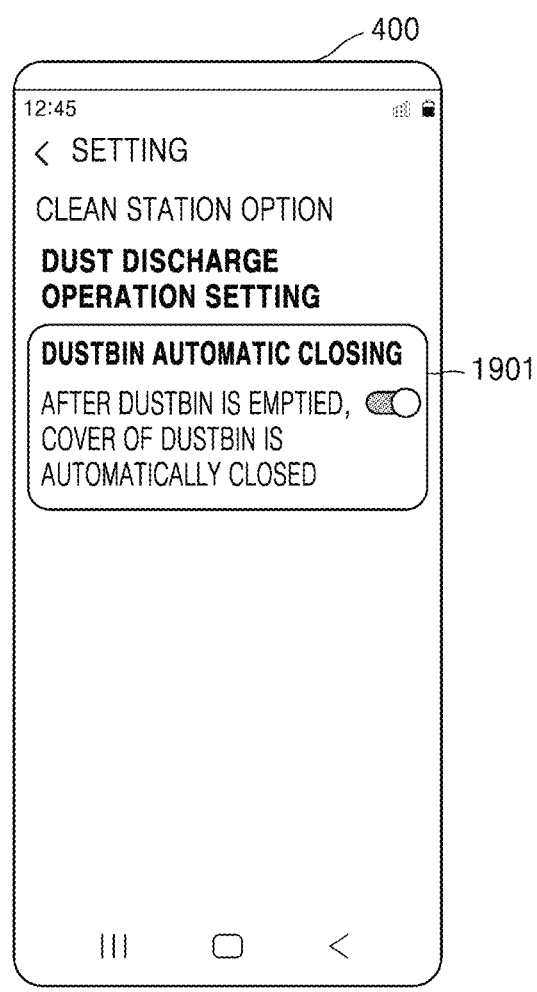
FIG. 19A illustrates a GUI associated with closing of a cover of a dustbin according to an embodiment of the disclosure.

Referring to FIG. 19A, when a user executes a particular application provided by the server device 300, the user terminal 400 may provide, on an execution screen of the application, a graphical user interface (GUI) 1901 for setting an automatic close mode. When the user activates the automatic close mode via the GUI 1901, the user terminal 400 may transmit information indicating activation of the automatic close mode to the station device 200 via the server device 300. Here, the station device 200 may set the automatic close mode.

In operation S1830, when the dust discharge operation is completed, the station device 200 according to an embodiment of the disclosure may transmit information indicating completion of the dust discharge operation to the cordless vacuum cleaner 100.

According to an embodiment of the disclosure, as the cordless vacuum cleaner 100 is docked on the station device 200, the station device 200 may transmit the information indicating completion of the dust discharge operation via short-range wireless communication (e.g.: BLE communication) to the cordless vacuum cleaner 100.

In operation S1840, when the cordless vacuum cleaner 100 according to an embodiment of the disclosure receives the information indicating completion of the dust discharge operation from the station device 200, the cordless vacuum cleaner 100 may measure a pressure value after dust discharging and may transmit the measured pressure value to the station device 200.

According to an embodiment of the disclosure, the at least one processor 1001 of the cordless vacuum cleaner 100 may shortly operate the first suction motor 1110 with reference power consumption while the cover 10 of the dustbin 1200 is close. Here, the at least one processor 1001 of the cordless vacuum cleaner 100 may obtain, from the first pressure sensor 1400, the pressure value measured by the first pressure sensor 1400. The first pressure sensor 1400 may be provided at the suction duct 40.

According to an embodiment of the disclosure, the cordless vacuum cleaner 100 may transmit the pressure value after dust discharging which is measured by the first pressure sensor 1400 (hereinafter, also referred to as the pressure value of the first pressure sensor 1400) to the station device 200 via short-range wireless communication (e.g.: BLE communication).

In operation S1850, the station device 200 according to an embodiment of the disclosure may compare an initial pressure value with the pressure value of the first pressure sensor 1400 after dust discharging.

The initial pressure value may be a pressure value measured by the first pressure sensor 1400 by operating the first suction motor 1110 with reference power consumption when there are no foreign substances in the dustbin 1200.

According to an embodiment of the disclosure, the station device 200 may store the initial pressure value of the first pressure sensor 1400 in the memory 202 or may receive the initial pressure value from the cordless vacuum cleaner 100.

When dust discharging from the dustbin 1200 is well or effectively performed, the pressure value of the first pressure sensor 1400 after dust discharging may be close to the initial pressure value (the pressure value when there are no foreign substances in the dustbin 1200). When dust discharging from the dustbin 1200 is not performed well, a lot of foreign substances remain still in the dustbin 1200, such that the pressure value of the first pressure sensor 1400 after dust discharging may be less than the initial pressure value.

In operation S1860, when a difference between the initial pressure value and the pressure value of the first pressure sensor 1400 after dust discharging is less than a first threshold value (NO of S1860), the station device 200 according to an embodiment of the disclosure may determine that dust discharging is well performed.

For example, the initial pressure value may be 700 Pa, the pressure value of the first pressure sensor 1400 after dust discharging may be 690 Pa, and the first threshold value may be 20 Pa. Here, a difference between the initial pressure value and the pressure value of the first pressure sensor 1400 after dust discharging is 10 pascals (Pa) that is less than the first threshold value (e.g., 20 Pa), and thus, the station device 200 may determine that dust discharging from the dustbin 1200 is well performed. Therefore, the station device 200 may not perform again the dust discharge operation.

In operations S1870 and S1880, the difference between the initial pressure value and the pressure value of the first pressure sensor 1400 after dust discharging is equal to or greater than a second threshold value that is greater than the first threshold value (YES of S1870), the station device 200 according to an embodiment of the disclosure may output a notification indicating that the cover 10 of the dustbin 1200 is open.

For example, the initial pressure value may be 700 Pa, the pressure value of the first pressure sensor 1400 after dust discharging may be 0.1 Pa, and the second threshold value may be 500 Pa. Here, a difference between the initial pressure value and the pressure value of the first pressure sensor 1400 after dust discharging is about 700 Pa that is greater than the second threshold value (e.g., 500 Pa), and thus, the station device 200 may determine that the cover 10 of the dustbin 1200 is open.

According to an embodiment of the disclosure, when the automatic close mode is set for the station device 200, the station device 200 may control the step motor to close the cover 10 of the dustbin 1200 after the dust discharge operation is completed. However, when foreign substances (e.g.: chopstick, toothpick, straw, etc.) are stuck between the dustbin 1200 and the cover 10, the cover 10 of the dustbin 1200 may not be closed by the step motor. Here, even when the cordless vacuum cleaner 100 operates the first suction motor 1110 with reference power consumption, the pressure value measured by the first pressure sensor 1400 may be close to zero. Accordingly, when the pressure value of the first pressure sensor 1400 is close to zero (when the difference between the initial pressure value and the pressure value of the first pressure sensor 1400 is equal to or greater than the second threshold value), the station device 200 may output a notification indicating to check a state of the cover 10 of the dustbin 1200.

According to an embodiment of the disclosure, the station device 200 may output the notification indicating that the cover 10 of the dustbin 1200 is open, via the output interface of the station device 200, via the output interface of the cordless vacuum cleaner 100, or via the user terminal 400.

Figure 19B:
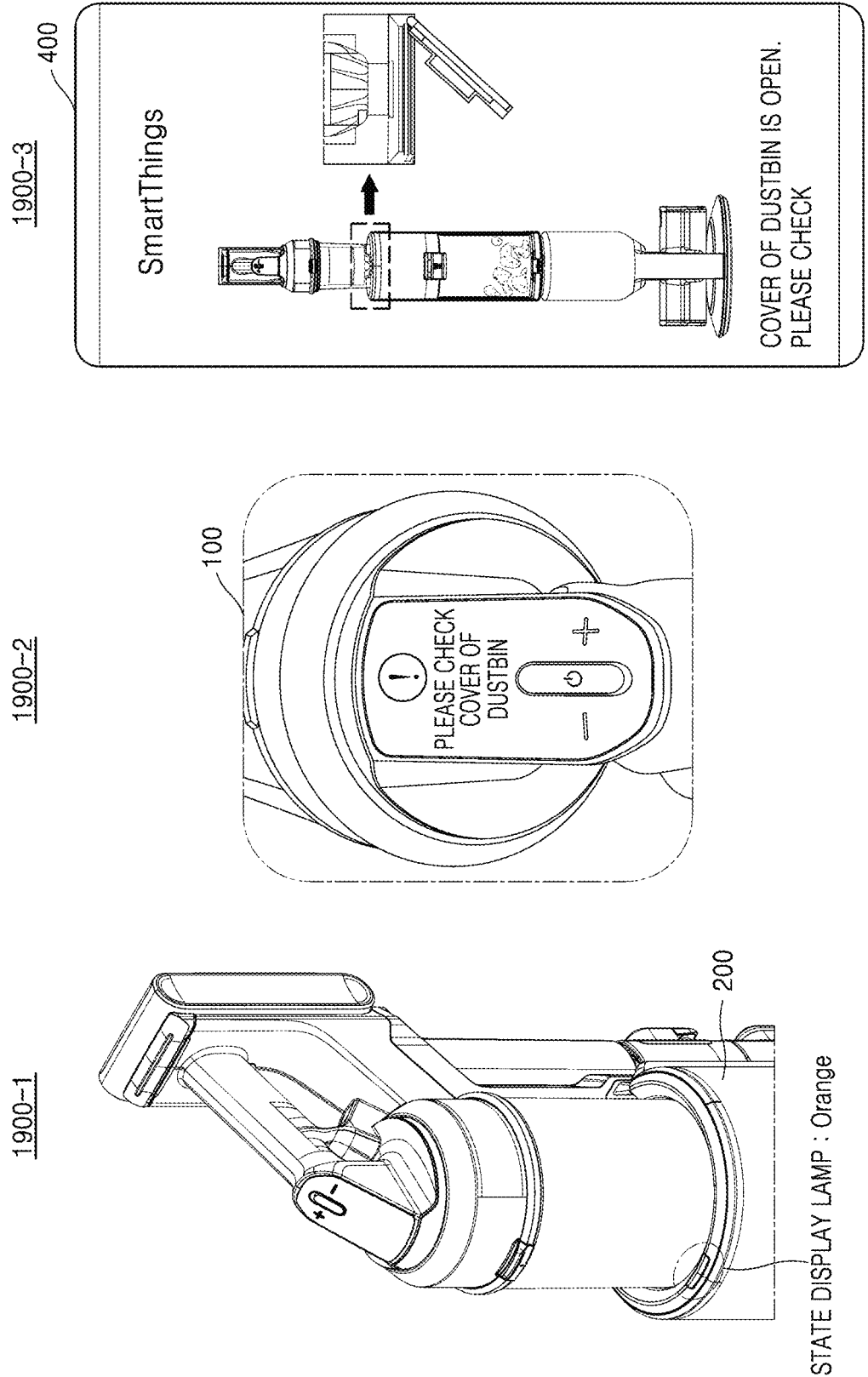
FIG. 19B illustrates an operation of outputting a notification indicating that a cover of a dustbin is open, according to an embodiment of the disclosure.

Referring to 1900-1 of FIG. 19B, the station device 200 may control a state display lamp (e.g.: LED) to output color (e.g.: orange color) indicating that the cover 10 of the dustbin 1200 is open. When the state display lamp of the station device 200 turns to orange color, a user may recognize that the cover 10 of the dustbin 1200 is open.

Referring to 1900-2 of FIG. 19B, the station device 200 may transmit information indicating that the cover 10 of the dustbin 1200 is open, to the cordless vacuum cleaner 100 via short-range wireless communication (e.g.: BLE communication). Here, the cordless vacuum cleaner 100 may control the output interface (e.g.: LCD) to output a notification indicating to check the cover 10 of the dustbin 1200. The user may check the notification of the cordless vacuum cleaner 100, and may close the cover 10 of the dustbin 1200 before using the cordless vacuum cleaner 100.

Referring to 1900-3 of FIG. 19B, the station device 200 may transmit the information indicating that the cover 10 of the dustbin 1200 is open, to the server device 300 via long-range wireless communication (e.g.: Wi-Fi communication). Here, the server device 300 may transmit the information indicating that the cover 10 of the dustbin 1200 is open, to the user terminal 400 registered in the same account as the station device 200. Based on the information received from the server device 300, the user terminal 400 may output, on an execution window of an application, a notification indicating that the cover of the dustbin 1200 is open.

Referring back to FIG. 18, in operation S1890, in a case where the difference between the initial pressure value and the pressure value of the first pressure sensor 1400 after dust discharging is equal to or greater than the first threshold value (YES of S1860) but is less than the second threshold value (NO of S1870), the station device 200 according to an embodiment of the disclosure may perform again the dust discharge operation.

For example, the initial pressure value may be 700 Pa, the pressure value of the first pressure sensor 1400 after dust discharging may be 400 Pa, and the first threshold value may be 20 Pa. Here, a difference between the initial pressure value and the pressure value of the first pressure sensor 1400 after dust discharging is 300 Pa that is greater than the first threshold value (e.g., 20 Pa), and thus, the station device 200 may determine that foreign substances still remain in the dustbin 1200. Therefore, the station device 200 may perform again the dust discharge operation.

While FIG. 18 shows an embodiment in which the station device 200 determines whether dust discharging from the dustbin 1200 is well performed, but the disclosure is not limited thereto. According to an embodiment of the disclosure, after the dust discharge operation of the station device 200 is completed, the cordless vacuum cleaner 100 may determine whether dust discharging from the dustbin 1200 is well performed. An operation in which the cordless vacuum cleaner 100 determines whether dust discharging from the dustbin 1200 is well performed will now be described in detail with reference to FIG. 20.

Figure 20:
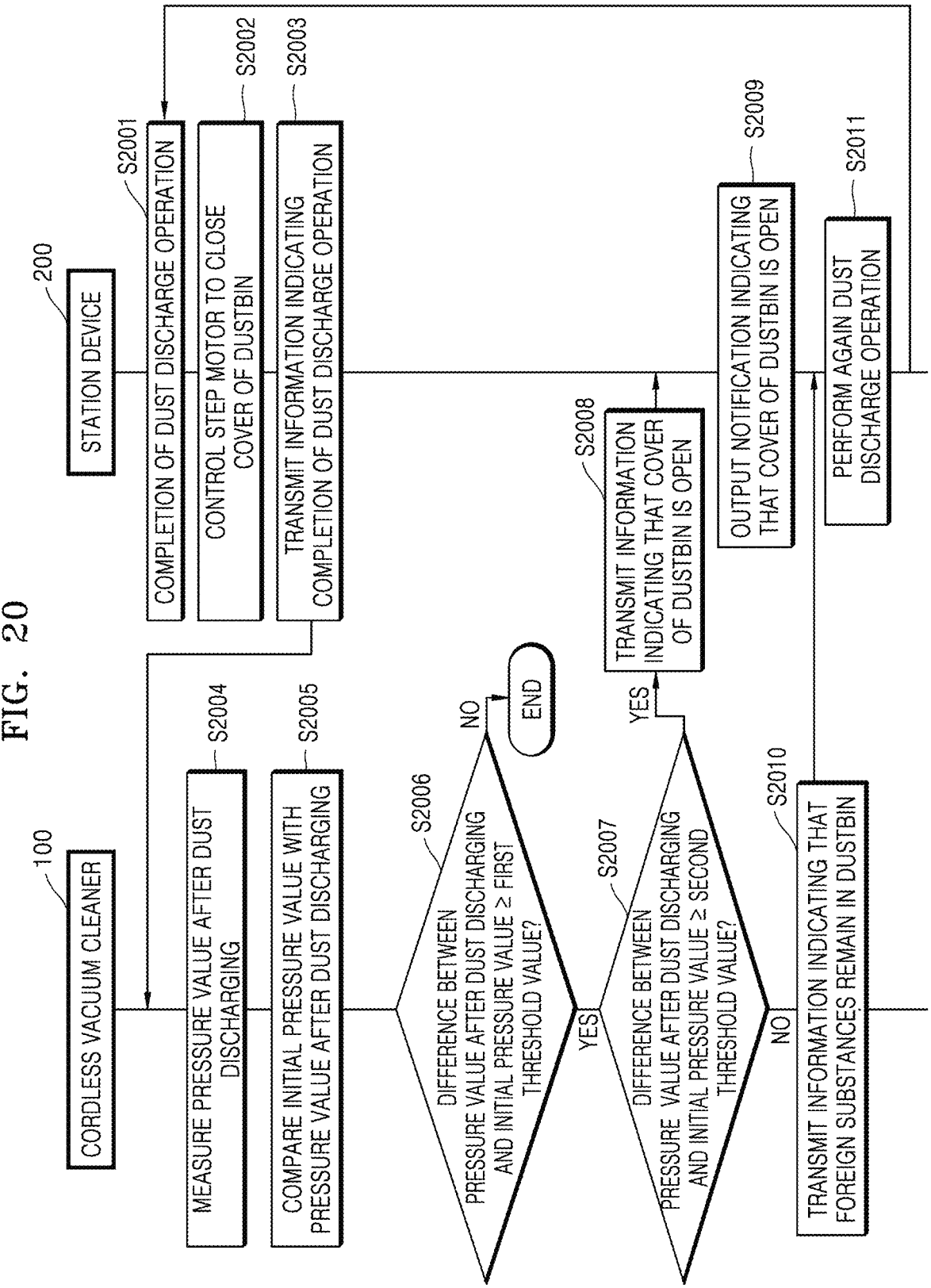
FIG. 20 illustrates a method by which a cordless vacuum cleaner determines, by using an initial pressure value, a state of a dustbin after dust is discharged, according to an embodiment of the disclosure.

FIG. 20 illustrates an embodiment of a method by which the cordless vacuum cleaner 100 determines, by using an initial pressure value, a state of the dustbin 1200 after dust is discharged, according to an embodiment of the disclosure.

In operation S2001, the station device 200 according to an embodiment of the disclosure may complete a dust discharge operation. In operation S2002, when the dust discharge operation is completed, the station device 200 according to an embodiment of the disclosure may control a step motor to close the cover 10 of the dustbin 1200. In operation S2003, the station device 200 according to an embodiment of the disclosure may transmit information indicating completion of the dust discharge operation to the cordless vacuum cleaner 100. Operations S2001 to S2003 correspond to operations S1810 to S1830 of FIG. 18, and thus, any repetitive detailed descriptions thereof will be omitted.

In operation S2004, when the cordless vacuum cleaner 100 according to an embodiment of the disclosure receives the information indicating completion of the dust discharge operation from the station device 200, the cordless vacuum cleaner 100 may measure a pressure value after dust discharging.

According to an embodiment of the disclosure, the at least one processor 1001 of the cordless vacuum cleaner 100 may shortly operate the first suction motor 1110 with reference power consumption while the cover 10 of the dustbin 1200 is close. Here, the at least one processor 1001 of the cordless vacuum cleaner 100 may obtain, from the first pressure sensor 1400, the pressure value measured by the first pressure sensor 1400. The first pressure sensor 1400 may be provided at the suction duct 40.

In operation S2005, the cordless vacuum cleaner 100 according to an embodiment of the disclosure may compare an initial pressure value with the pressure value after dust discharging.

The initial pressure value may be a pressure value measured by the first pressure sensor 1400 by operating the first suction motor 1110 with reference power consumption when there are no foreign substances in the dustbin 1200. According to an embodiment of the disclosure, the cordless vacuum cleaner 100 may store the initial pressure value of the first pressure sensor 1400 in the memory 1900.

When dust discharging from the dustbin 1200 is well performed, the pressure value of the first pressure sensor 1400 after dust discharging has to be close to the initial pressure value. When dust discharging from the dustbin 1200 is not performed well, a lot of foreign substances remain still in the dustbin 1200, such that the pressure value of the first pressure sensor 1400 after dust discharging may be less than the initial pressure value.

In operation S2006, when a difference between the initial pressure value and the pressure value of the first pressure sensor 1400 after dust discharging is less than a first threshold value (NO of S2006), the cordless vacuum cleaner 100 according to an embodiment of the disclosure may determine that dust discharging from the dustbin 1200 is well performed.

For example, the initial pressure value may be 700 Pa, the pressure value of the first pressure sensor 1400 after dust discharging may be 690 Pa, and the first threshold value may be 20 Pa. Here, a difference between the initial pressure value and the pressure value of the first pressure sensor 1400 after dust discharging is 10 Pa that is less than the first threshold value (e.g., 20 Pa), and thus, the cordless vacuum cleaner 100 may determine that dust discharging from the dustbin 1200 is well performed.

According to an embodiment of the disclosure, the cordless vacuum cleaner 100 may transmit information indicating success in dust discharging to the station device 200 via short-range wireless communication (e.g.: BLE communication).

In operations S2007 and S2008, in a case where the difference between the initial pressure value and the pressure value of the first pressure sensor 1400 after dust discharging is equal to or greater than the first threshold value (YES of S2007), the cordless vacuum cleaner 100 according to an embodiment of the disclosure may transmit information indicating that the cover 10 of the dustbin 1200 is open, to the station device 200.

According to an embodiment of the disclosure, when an automatic close mode is set for the station device 200, the station device 200 may control the step motor to close the cover 10 of the dustbin 1200 after the dust discharge operation is completed. However, when foreign substances (e.g.: chopstick, toothpick, straw, etc.) are stuck between the dustbin 1200 and the cover 10, the cover 10 of the dustbin 1200 may not be closed by the step motor. Here, even when the cordless vacuum cleaner 100 operates the first suction motor 1110 with reference power consumption, the pressure value measured by the first pressure sensor 1400 may be close to zero. Accordingly, when the pressure value of the first pressure sensor 1400 is close to zero (when the difference between the initial pressure value and the pressure value of the first pressure sensor 1400 is equal to or greater than a second threshold value), the cordless vacuum cleaner 100 may transmit the information indicating that the cover 10 of the dustbin 1200 is open, to the station device 200.

Also, according to an embodiment of the disclosure, the cordless vacuum cleaner 100 may output, via the output interface, a notification indicating that the cover 10 of the dustbin 1200 is open (refer to 1900-2 of FIG. 19B).

In operation S2009, when the station device 200 according to an embodiment of the disclosure receives, from the cordless vacuum cleaner 100, the information indicating that the cover 10 of the dustbin 1200 is open, the station device 200 may output a notification indicating that the cover 10 of the dustbin 1200 is open.

According to an embodiment of the disclosure, the station device 200 may output a notification indicating that the cover 10 of the dustbin 1200 is open, via the output interface (e.g.: the state display lamp) of the station device 200 or via the user terminal 400 (refer to 1900-1 and 1900-3 of FIG. 19B).

In operation S2010, in a case where the difference between the initial pressure value and the pressure value of the first pressure sensor 1400 after dust discharging is equal to or greater than the first threshold value (YES of S2006) but is less than the second threshold value (NO of S2007), the cordless vacuum cleaner 100 according to an embodiment of the disclosure may transmit, to the station device 200, information indicating that foreign substances remain in the dustbin 1200.

For example, the initial pressure value may be 700 Pa, the pressure value of the first pressure sensor 1400 after dust discharging may be 400 Pa, and the first threshold value may be 20 Pa. Here, a difference between the initial pressure value and the pressure value of the first pressure sensor 1400 after dust discharging is 300 Pa that is greater than the first threshold value (e.g., 20 Pa), and thus, the cordless vacuum cleaner 100 may determine that foreign substances still remain in the dustbin 1200. Here, the cordless vacuum cleaner 100 may transmit the information indicating that foreign substances remain in the dustbin 1200, to the station device 200 via short-range wireless communication (e.g.: BLE communication).

In operation S2011, when the station device 200 according to an embodiment of the disclosure receives, from the cordless vacuum cleaner 100, the information indicating that foreign substances remain in the dustbin 1200, the station device 200 may perform again a dust discharge operation.

For example, the station device 200 may control the step motor to open the cover of the dustbin 1200, and may operate both the second suction motor 207 of the station device 200 and the first suction motor 1110 of the cordless vacuum cleaner 100, thereby performing the dust discharge operation.

According to an embodiment of the disclosure, the cordless vacuum cleaner 100 or the station device 200 may determine whether dust discharging from the dustbin 1200 is well performed, by using a pressure value of the first pressure sensor 1400 before dust discharging. Hereinafter, an operation in which the station device 200 determines whether dust discharging from the dustbin 1200 is well performed, based on a result of comparison between a first pressure value of the first pressure sensor 1400 before dust discharging and a second pressure value of the first pressure sensor 1400 after dust discharging will now be described in detail with reference to FIG. 21.

Figure 21:
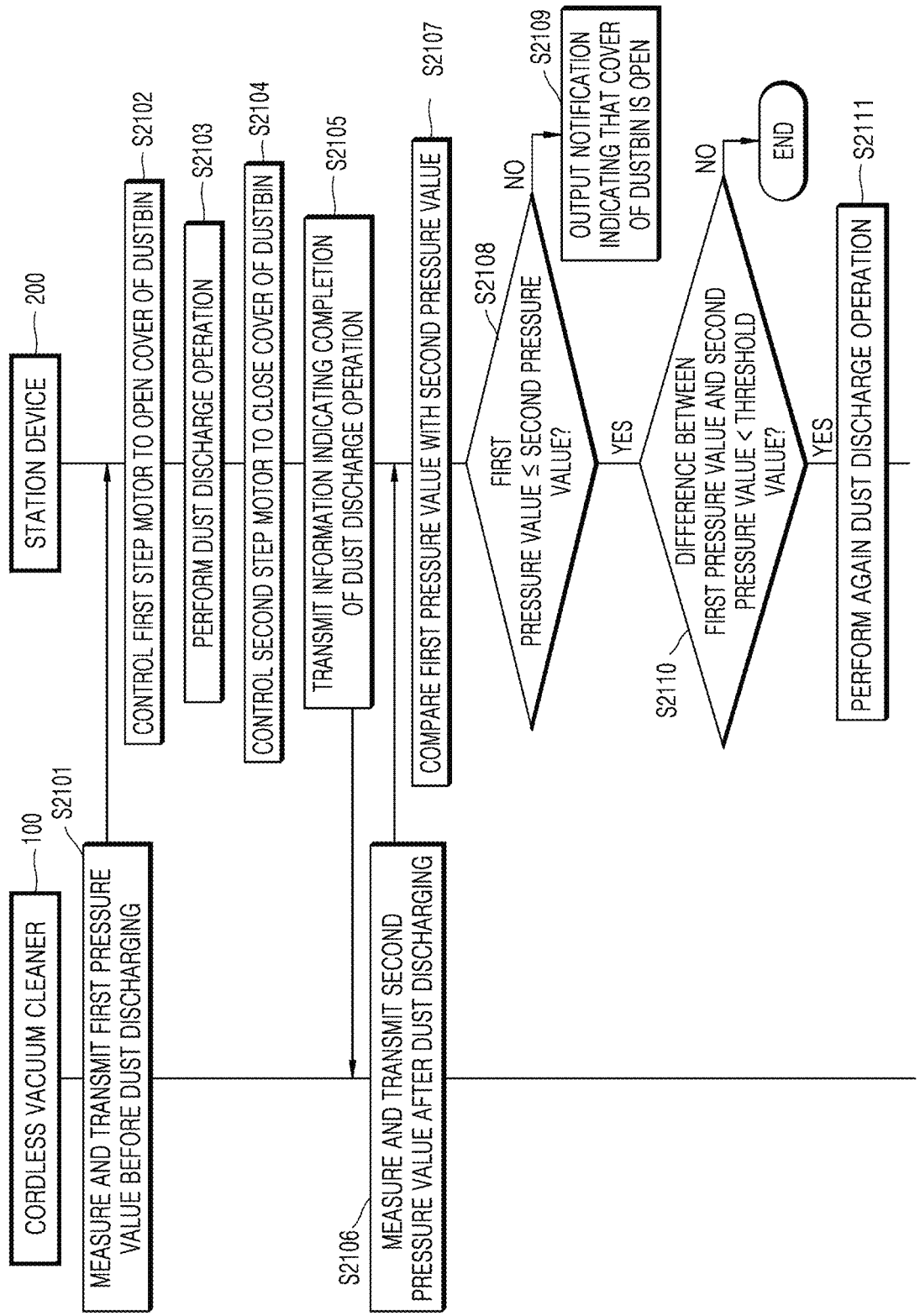
FIG. 21 illustrates a flowchart for describing a method by which a station device determines a state of a dustbin after dust discharging, by using a first pressure sensor of a cordless vacuum cleaner, according to an embodiment of the disclosure.

FIG. 21 illustrates a flowchart for describing a method by which the station device 200 determines a state of the dustbin 1200 after dust discharging, by using the first pressure sensor 1400 of the cordless vacuum cleaner 100, according to an embodiment of the disclosure.

In operation S2101, the cordless vacuum cleaner 100 according to an embodiment of the disclosure may measure a first pressure value before dust discharging and may transmit the first pressure value before dust discharging to the cordless vacuum cleaner 100.

According to an embodiment of the disclosure, before dust discharging, the at least one processor 1001 of the cordless vacuum cleaner 100 may shortly operate the first suction motor 1110 with reference power consumption while the cover 10 of the dustbin 1200 is close. Here, the at least one processor 1001 of the cordless vacuum cleaner 100 may obtain, from the first pressure sensor 1400, a first pressure value before dust discharging which is measured by the first pressure sensor 1400. In a case where the first pressure sensor 1400 is provided at the suction duct 40, the first pressure value may be decreased as a lot of foreign substances are collected in the dustbin 1200.

According to an embodiment of the disclosure, the cordless vacuum cleaner 100 may transmit the first pressure value before dust discharging to the station device 200 via short-range wireless communication (e.g.: BLE communication).

In operation S2102, after the station device 200 according to an embodiment of the disclosure receives the first pressure value of the first pressure sensor 1400 before dust discharging, the station device 200 may control the first step motor to open the cover 10 of the dustbin 1200.

According to an embodiment of the disclosure, in a case where an operation mode of the station device 200 is an automatic discharge mode, the station device 200 may detect docking of the cordless vacuum cleaner 100, and may control the first step motor to open the cover 10 of the dustbin 1200 when the first pressure value of the first pressure sensor 1400 is received from the cordless vacuum cleaner 100.

According to an embodiment of the disclosure, in a case where an operation mode of the station device 200 is a manual discharge mode, when a user input of selecting a dust discharging start button is received and the first pressure value of the first pressure sensor 1400 is received from the cordless vacuum cleaner 100, the station device 200 may control the first step motor to open the cover 10 of the dustbin 1200.

In operation S2103, the station device 200 according to an embodiment of the disclosure may perform a dust discharge operation.

For example, the station device 200 may identify a suction force generation pattern corresponding to a preset operation mode, and may allow the first suction motor 1110 of the cordless vacuum cleaner 100 and the second suction motor 207 of the station device 200 to be operated together, thereby performing the dust discharge operation.

In operation S2104, the station device 200 according to an embodiment of the disclosure may control the second step motor to close the cover 10 of the dustbin 1200 when the dust discharge operation is completed.

According to an embodiment of the disclosure, in a case where an automatic close mode in which the cover 10 of the dustbin 1200 is to be automatically closed is set, the station device 200 may control the second step motor to close the cover 10 of the dustbin 1200 when the dust discharge operation is completed.

In operation S2105, the station device 200 according to an embodiment of the disclosure may transmit information indicating completion of the dust discharge operation to the cordless vacuum cleaner 100

According to an embodiment of the disclosure, as the cordless vacuum cleaner 100 is docked on the station device 200, the station device 200 may transmit the information indicating completion of the dust discharge operation via short-range wireless communication (e.g.: BLE communication) to the cordless vacuum cleaner 100.

In operation S2106, the cordless vacuum cleaner 100 according to an embodiment of the disclosure may measure a second pressure value after dust discharging, and may transmit the second pressure value after dust discharging to the station device 200.

According to an embodiment of the disclosure, the at least one processor 1001 of the cordless vacuum cleaner 100 may shortly operate the first suction motor 1110 with reference power consumption while the cover 10 of the dustbin 1200 is close. Here, the at least one processor 1001 of the cordless vacuum cleaner 100 may obtain, from the first pressure sensor 1400, a second pressure value measured by the first pressure sensor 1400.

According to an embodiment of the disclosure, the cordless vacuum cleaner 100 may transmit the second pressure value after dust discharging, which is measured by the first pressure sensor 1400, to the station device 200 via short-range wireless communication (e.g.: BLE communication)

In operation S2107, the station device 200 according to an embodiment of the disclosure may compare the first pressure value before dust discharging with the second pressure value after dust discharging.

According to an embodiment of the disclosure, the station device 200 may compare the first pressure value of the first pressure sensor 1400 which is received from the cordless vacuum cleaner 100 before the dust discharge operation with the second pressure value of the first pressure sensor 1400 which is received from the cordless vacuum cleaner 100 after the dust discharge operation. When dust discharging from the dustbin 1200 is well performed, the second pressure value after dust discharging has to be significantly greater than the first pressure value before dust discharging.

In operations S2108 and S2109, when the second pressure value of the first pressure sensor 1400 after dust discharging is less than the first pressure value of the first pressure sensor 1400 before dust discharging (NO of S2108), the station device 200 according to an embodiment of the disclosure may output a notification indicating that the cover 10 of the dustbin 1200 is open.

According to an embodiment of the disclosure, when an automatic close mode is set for the station device 200, the station device 200 may control the second step motor to close the cover 10 of the dustbin 1200 after the dust discharge operation is completed. However, when foreign substances (e.g.: chopstick, toothpick, straw, etc.) are stuck between the dustbin 1200 and the cover 10, the cover 10 of the dustbin 1200 may not be closed by the second step motor. Here, even when the cordless vacuum cleaner 100 operates the first suction motor 1110 with reference power consumption, the second pressure value measured by the first pressure sensor 1400 may be close to zero. Accordingly, when the second pressure value of the first pressure sensor 1400 is close to zero (i.e., when the second pressure value after dust discharging is less than the first pressure value before dust discharge), the station device 200 may output a notification indicating to check a state of the cover 10 of the dustbin 1200.

According to an embodiment of the disclosure, the station device 200 may output the notification indicating that the cover 10 of the dustbin 1200 is open, via the output interface of the station device 200, via the output interface of the cordless vacuum cleaner 100, or via the user terminal 400 (refer to FIG. 19B).

In operation S2110, when the second pressure value after dust discharging is equal to or greater than the first pressure value before dust discharging (YES of S2108), and a difference between the first pressure value and the second pressure value is equal to or greater than a threshold value (NO of S2110), the station device 200 according to an embodiment of the disclosure may determine that dust discharging is well performed.

For example, the first pressure value of the first pressure sensor 1400 before dust discharging may be 100 Pa, the second pressure value of the first pressure sensor 1400 after dust discharging may be 700 Pa, and the threshold value may be 500 Pa. Here, the difference between the first pressure value of the first pressure sensor 1400 before dust discharging and the second pressure value of the first pressure sensor 1400 after dust discharging is 600 Pa that is greater than the threshold value (e.g., 500 Pa), and thus, the station device 200 may determine that dust discharging from the dustbin 1200 is successful. Therefore, the station device 200 may not additionally perform a dust discharge operation.

In operation S2111, when the second pressure value after dust discharging is equal to or greater than the first pressure value before dust discharging (YES of S2108) but the difference between the first pressure value and the second pressure value is less than the threshold value (YES of S2110), the station device 200 according to an embodiment of the disclosure may perform again the dust discharge operation.

For example, the first pressure value of the first pressure sensor 1400 before dust discharging may be 100 Pa, the second pressure value of the first pressure sensor 1400 after dust discharging may be 400 Pa, and the threshold value may be 500 Pa. Here, the difference between the first pressure value of the first pressure sensor 1400 before dust discharging and the second pressure value of the first pressure sensor 1400 after dust discharging is 300 Pa that is less than the threshold value (e.g., 500 Pa), and thus, the station device 200 may determine that foreign substances (e.g.: dust, hair, etc.) still remain in the dustbin 1200. Therefore, the station device 200 may perform again the dust discharge operation by operating the first suction motor 1110 and the second suction motor 207.

While FIG. 21 shows an embodiment in which the station device 200 determines whether dust discharging from the dustbin 1200 is well performed, but the disclosure is not limited thereto. According to an embodiment of the disclosure, after the dust discharge operation of the station device 200 is completed, the cordless vacuum cleaner 100 may determine whether dust discharging from the dustbin 1200 is well performed. An operation in which the cordless vacuum cleaner 100 determines whether dust discharging from the dustbin 1200 is well performed will now be described in detail with reference to FIG. 22.

Figure 22:
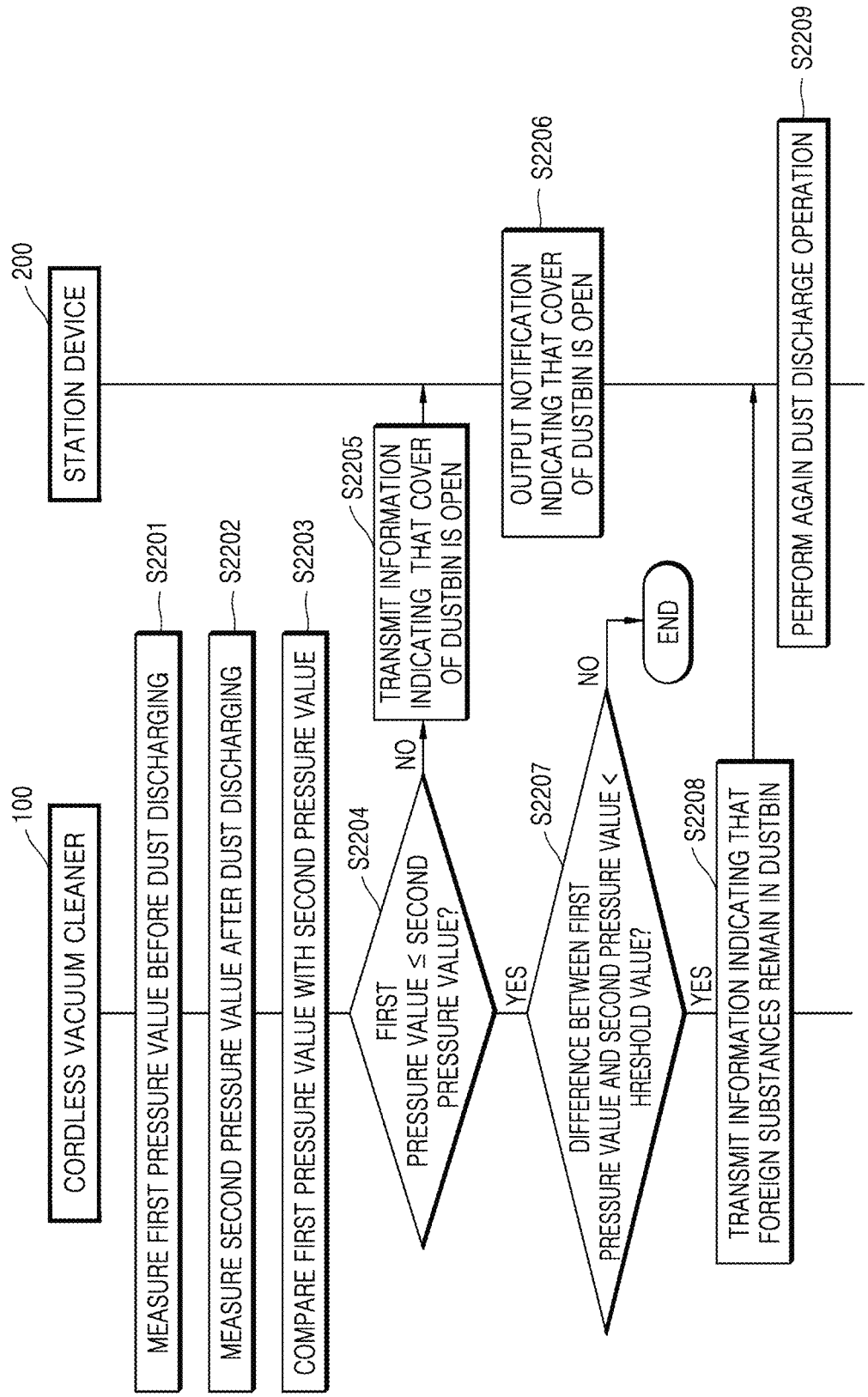
FIG. 22 illustrates a method by which a cordless vacuum cleaner determines, by using a first pressure sensor, a state of a dustbin after dust is discharged, according to an embodiment of the disclosure.

FIG. 22 illustrates a method by which the cordless vacuum cleaner 100 determines, by using the first pressure sensor 1400, a state of the dustbin 1200 after dust is discharged, according to an embodiment of the disclosure.

In operation S2201, the cordless vacuum cleaner 100 according to an embodiment of the disclosure may measure a first pressure value before dust discharging.

According to an embodiment of the disclosure, before dust discharging, the at least one processor 1001 of the cordless vacuum cleaner 100 may shortly operate the first suction motor 1110 with reference power consumption while the cover 10 of the dustbin 1200 is close. Here, the at least one processor 1001 of the cordless vacuum cleaner 100 may obtain, from the first pressure sensor 1400, a first pressure value before dust discharging which is measured by the first pressure sensor 1400. In a case where the first pressure sensor 1400 is provided at the suction duct 40, the first pressure value may be decreased as a lot of foreign substances are collected in the dustbin 1200.

In operation S2202, the cordless vacuum cleaner 100 according to an embodiment of the disclosure may measure a second pressure value after dust discharging.

According to an embodiment of the disclosure, when the cordless vacuum cleaner 100 receives, from the station device 200, information indicating completion of a dust discharge operation, the cordless vacuum cleaner 100 may measure a second pressure value after dust discharging by using the first pressure sensor 1400. For example, the at least one processor 1001 of the cordless vacuum cleaner 100 may shortly operate the first suction motor 1110 with reference power consumption while the cover 10 of the dustbin 1200 is close. Here, the at least one processor 1001 of the cordless vacuum cleaner 100 may obtain, from the first pressure sensor 1400, the second pressure value measured by the first pressure sensor 1400.

In operation S2203, the cordless vacuum cleaner 100 according to an embodiment of the disclosure may compare the first pressure value before dust discharging with the second pressure value after dust discharging.

According to an embodiment of the disclosure, the cordless vacuum cleaner 100 may compare the first pressure value of the first pressure sensor 1400 which is measured before dust discharging with the second pressure value of the first pressure sensor 1400 which is measured after dust discharging. In a case where the first pressure sensor 1400 is provided at the suction duct 40 and dust discharging from the dustbin 1200 is well performed, the second pressure value after dust discharging has to be significantly greater than the first pressure value before dust discharging.

In operations S2204 and S2205, when the second pressure value after dust discharging is less than the first pressure value before dust discharging (NO of S2204), the cordless vacuum cleaner 100 according to an embodiment of the disclosure may transmit, to the station device 200, information indicating that the cover 10 of the dustbin 1200 is open.

According to an embodiment of the disclosure, when an automatic close mode is set for the station device 200, the station device 200 may control the second step motor to close the cover 10 of the dustbin 1200 after the dust discharge operation is completed. However, when foreign substances (e.g.: chopstick, toothpick, straw, etc.) are stuck between the dustbin 1200 and the cover 10, the cover 10 of the dustbin 1200 may not be closed by the second step motor. Here, even when the cordless vacuum cleaner 100 operates the first suction motor 1110 with reference power consumption, the second pressure value measured by the first pressure sensor 1400 may be close to zero. Accordingly, when the second pressure value of the first pressure sensor 1400 is close to zero (i.e., when the second pressure value after dust discharging is less than the first pressure value before dust discharge), the cordless vacuum cleaner 100 may determine that the cover 10 of the dustbin 1200 is open. Therefore, the cordless vacuum cleaner 100 may transmit, to the station device 200, the information indicating that the cover 10 of the dustbin 1200 is open.

Also, according to an embodiment of the disclosure, the cordless vacuum cleaner 100 may output, via the output interface, a notification indicating that the cover 10 of the dustbin 1200 is open (refer to 1900-2 of FIG. 19B).

In operation S2206, when the station device 200 according to an embodiment of the disclosure receives, from the cordless vacuum cleaner 100, the information indicating that the cover 10 of the dustbin 1200 is open, the station device 200 may output a notification indicating that the cover 10 of the dustbin 1200 is open.

According to an embodiment of the disclosure, the station device 200 may output a notification indicating that the cover 10 of the dustbin 1200 is open, via the output interface (e.g.: the state display lamp) of the station device 200 or via the user terminal 400 (refer to 1900-1 and 1900-3 of FIG. 19B).

In operation S2207, when the second pressure value after dust discharging is equal to or greater than the first pressure value before dust discharging (YES of S2204), and a difference between the first pressure value and the second pressure value is equal to or greater than a threshold value (NO of S2207), the cordless vacuum cleaner 100 according to an embodiment of the disclosure may determine that dust discharging is well performed.

For example, the first pressure value of the first pressure sensor 1400 before dust discharging may be 100 Pa, the second pressure value of the first pressure sensor 1400 after dust discharging may be 700 Pa, and the threshold value may be 500 Pa. Here, the difference between the first pressure value of the first pressure sensor 1400 before dust discharging and the second pressure value of the first pressure sensor 1400 after dust discharging is 600 Pa that is greater than the threshold value (e.g., 500 Pa), and thus, the cordless vacuum cleaner 100 may determine that dust discharging from the dustbin 1200 is successful.

In operation S2208, when the second pressure value after dust discharging is equal to or greater than the first pressure value before dust discharging (YES of S2204) but the difference between the first pressure value and the second pressure value is less than the threshold value (YES of S2207), the cordless vacuum cleaner 100 according to an embodiment of the disclosure may transmit, to the station device 200, information indicating that foreign substances remain in the dustbin 1200.

For example, the first pressure value of the first pressure sensor 1400 before dust discharging may be 100 Pa, the second pressure value of the first pressure sensor 1400 after dust discharging may be 400 Pa, and the threshold value may be 500 Pa. Here, the difference between the first pressure value of the first pressure sensor 1400 before dust discharging and the second pressure value of the first pressure sensor 1400 after dust discharging is 300 Pa that is less than the threshold value (e.g., 500 Pa), and thus, the station device 200 may determine that foreign substances (e.g.: dust, hair, etc.) still remain in the dustbin 1200. Therefore, the cordless vacuum cleaner 100 may transmit the information indicating that foreign substances remain in the dustbin 1200, to the station device 200 via short-range wireless communication (e.g.: BLE communication).

In operation S2209, when the station device 200 according to an embodiment of the disclosure receives, from the cordless vacuum cleaner 100, the information indicating that foreign substances remain in the dustbin 1200, the station device 200 may perform again the dust discharge operation.

For example, the station device 200 may control the first step motor to open the cover 10 of the dustbin 1200, and may operate both the second suction motor 207 of the station device 200 and the first suction motor 1110 of the cordless vacuum cleaner 100, thereby performing the dust discharge operation.

According to an embodiment of the disclosure, the station device 200 may determine whether dust discharging from the dustbin 1200 is well performed, by using the second pressure sensor 206 of the station device 200, instead of a pressure value measured by the first pressure sensor 1400 of the cordless vacuum cleaner 100. Hereinafter, an operation in which the station device 200 determines whether dust discharging from the dustbin 1200 is well performed, by using the second pressure sensor 206, will now be described in detail with reference to FIG. 23.

Figure 23:
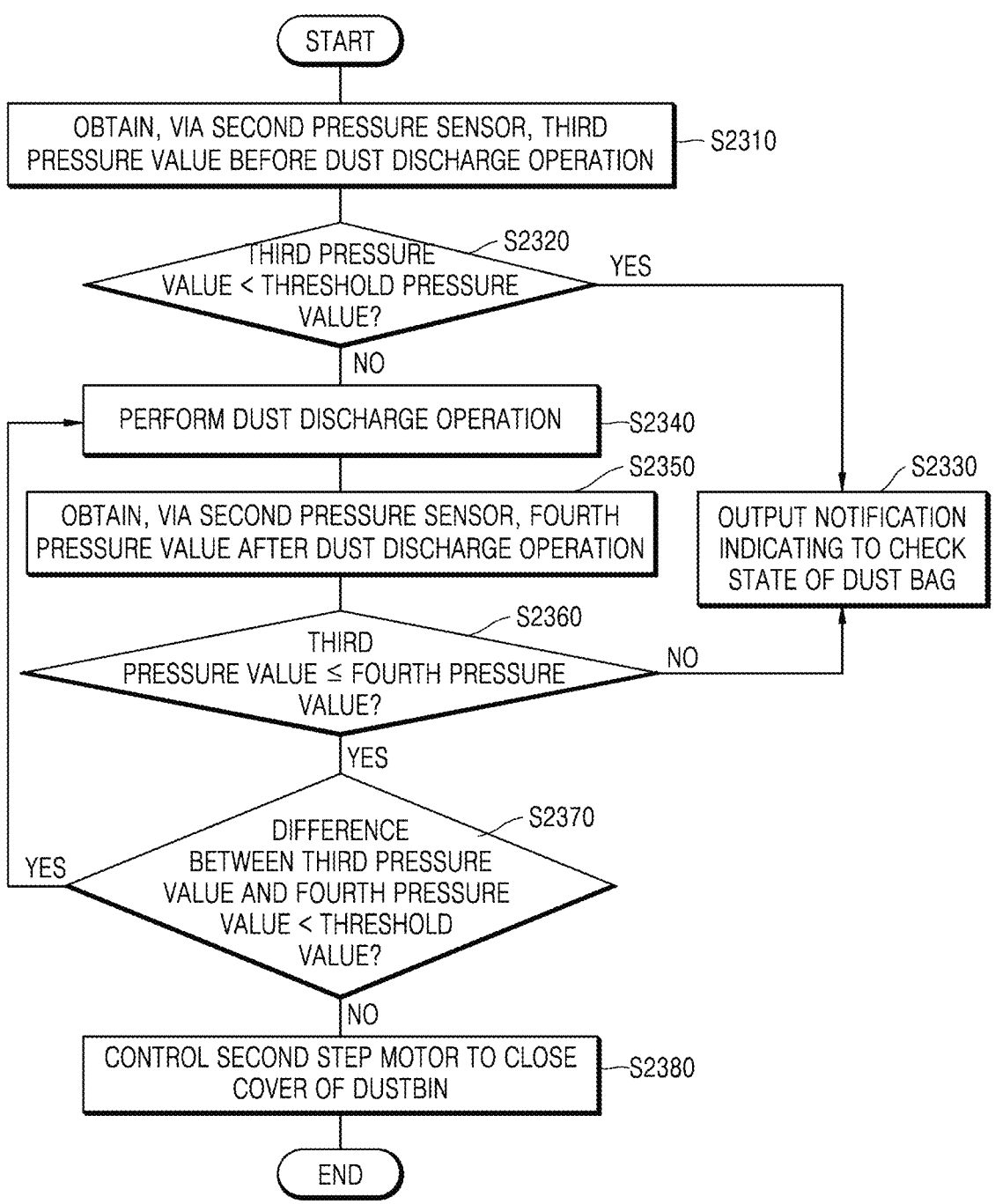
FIG. 23 illustrates a flowchart for describing a method by which a station device determines, by using a second pressure sensor, a state of a dustbin or a state of a dust bag after dust discharging, according to an embodiment of the disclosure.

FIG. 23 illustrates a flowchart for describing a method by which the station device 200 determines, by using the second pressure sensor 206, a state of the dustbin 1200 or a state of a dust bag after dust discharging, according to an embodiment of the disclosure.

In operation S2310, the station device 200 according to an embodiment of the disclosure may obtain, via the second pressure sensor 206, a third pressure value before a dust discharge operation.

According to an embodiment of the disclosure, in a case where an operation mode of the station device 200 is an automatic discharge mode, when the station device 200 detects docking of the cordless vacuum cleaner 100, the station device 200 may control the first step motor to open the cover 10 of the station device 200. Here, the station device 200 may obtain a third pressure value before a dust discharge operation via the second pressure sensor 206 while the station device 200 shortly operates the second suction motor 207 with reference power consumption.

In operations S2320 and S2330, when the third pressure value is less than a threshold pressure value (YES of S2320), the station device 200 according to an embodiment of the disclosure may output a notification indicating to check a state of a dust bag.

According to an embodiment of the disclosure, in a case where the dust bag included in the collector 209 is torn before a dust discharge operation, even when the second suction motor 207 is operated, the third pressure value measured by the second pressure sensor 206 may be very small. The threshold pressure value may be a pressure value that is normally measured by the second pressure sensor 206 when the dust bag is not torn.

Therefore, when the third pressure value is less than the threshold pressure value, the station device 200 may determine that the dust bag included in the collector 209 is torn, and may output a notification indicating to check a state of the dust bag.

According to an embodiment of the disclosure, the station device 200 may output the notification indicating to check a state of the dust bag, via the output interface of the station device 200, via the output interface of the cordless vacuum cleaner 100, or via the user terminal 400.

Figure 24:
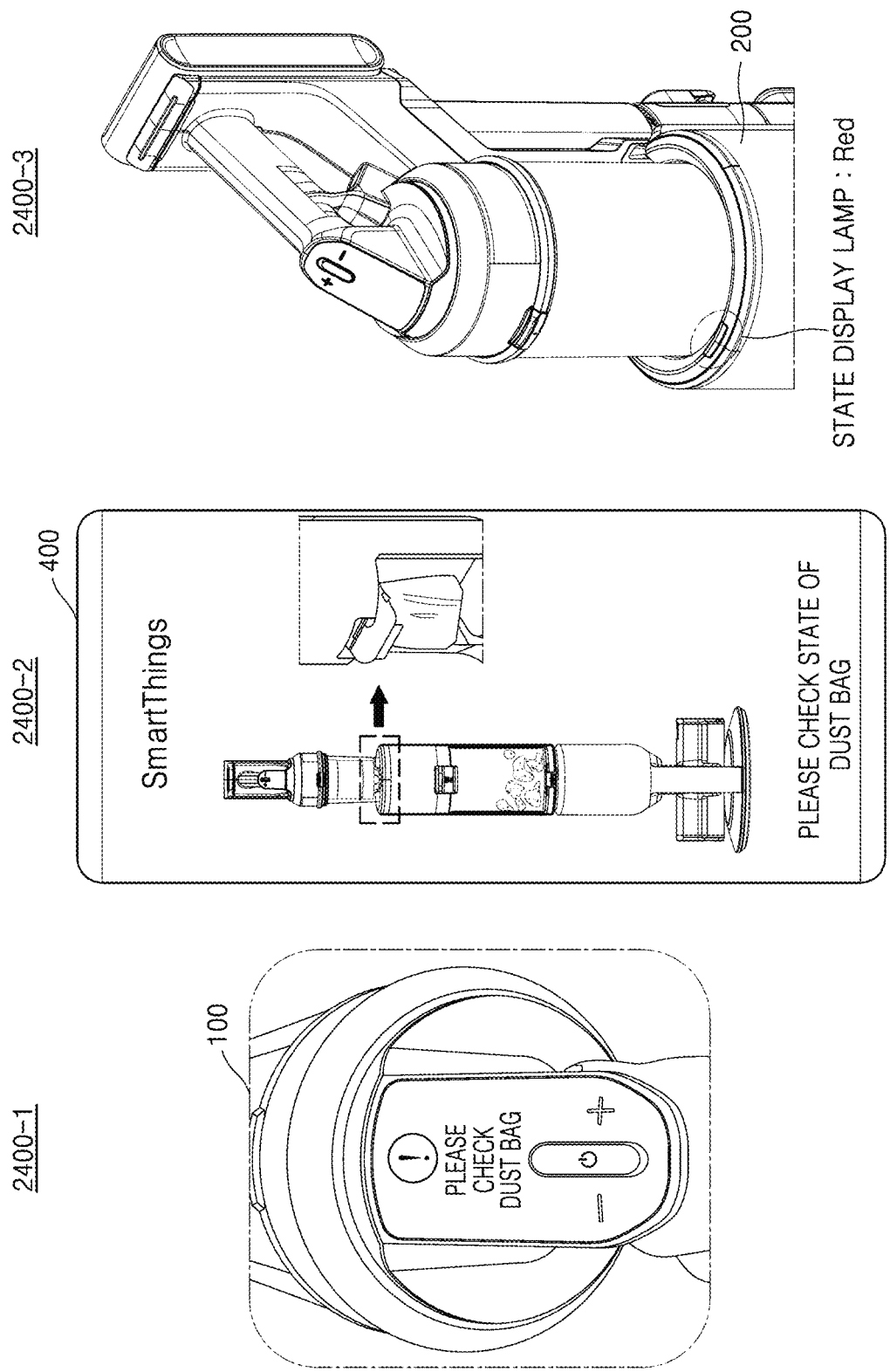
FIG. 24 illustrates an operation of outputting a notification indicating to check a state of a dust bag, according to an embodiment of the disclosure.

Referring to 2400-1 of FIG. 24, the station device 200 may transmit information indicating to check the dust bag of the station device 200 to the cordless vacuum cleaner 100 via short-range wireless communication (e.g.: BLE communication). Here, the cordless vacuum cleaner 100 may control the output interface (e.g.: LCD) to output the notification indicating to check the dust bag of the station device 200. A user may check the notification of the cordless vacuum cleaner 100, and may replace the dust bag of the station device 200.

Referring to 2400-2 of FIG. 24, the station device 200 may transmit information indicating to check the dust bag of the station device 200 to the server device 300 via long-range wireless communication (e.g.: Wi-Fi communication). Here, the server device 300 may transmit the information indicating to check the dust bag of the station device 200 to the user terminal 400 registered in the same account as the station device 200. Based on the information received from the server device 300, the user terminal 400 may output, on an execution window of an application, the notification indicating to check the state of the dust bag.

Referring to 2400-3 of FIG. 24, the station device 200 may control the state display lamp (e.g.: LED) to output color (e.g.: red color) indicating that the dust bag is damaged. When the state display lamp of the station device 200 turns to red color, a user may recognize that it is requested to check the dust bag.

In operation S2340, when the third pressure value is equal to or greater than the threshold pressure value (NO of S2320), the station device 200 according to an embodiment of the disclosure may perform a dust discharge operation.

According to an embodiment of the disclosure, the station device 200 may identify a suction force generation pattern corresponding to a preset operation mode, and may allow the first suction motor 1110 of the cordless vacuum cleaner 100 and the second suction motor 207 of the station device 200 to be operated together, thereby performing the dust discharge operation. For example, the station device 200 may transmit, to the cordless vacuum cleaner 100, a control signal for operating the first suction motor 1110 of the station device 100 for dust discharging, and may operate both the first suction motor 1110 and the second suction motor 207, thereby performing the dust discharge operation.

In operation S2350, the station device 200 according to an embodiment of the disclosure may obtain, via the second pressure sensor 206, a fourth pressure value after the dust discharge operation.

According to an embodiment of the disclosure, after the dust discharge operation is completed, the station device 200 may shortly operate the second suction motor 207 with reference power consumption before the cover 10 of the dustbin 1200 is closed. Here, the station device 200 may obtain the fourth pressure value after the dust discharge operation via the second pressure sensor 206.

In operation S2360, when the fourth pressure value after the dust discharge operation is less than a third pressure value before the dust discharge operation (NO of S2360), the station device 200 according to an embodiment of the disclosure may determine that the dust bag is torn.

For example, when the dust bag included in the collector 209 is damaged during the dust discharge operation, the fourth pressure value after the dust discharge operation may become less than the third pressure value before the dust discharge operation. Therefore, the station device 200 may output a notification indicating to check a state of the dust bag (S2330).

In operation S2370, when the fourth pressure value after the dust discharge operation is equal to or greater than the third pressure value before the dust discharge operation (YES of S2360) but a difference between the third pressure value and the fourth pressure value is less than a threshold value (YES of S2370), the station device 200 according to an embodiment of the disclosure may perform again the dust discharge operation (S2340).

According to an embodiment of the disclosure, when dust discharging from the dustbin 1200 is well performed and thus dust is collected in the collector 209, the fourth pressure value after the dust discharge operation has to be greater than the third pressure value before the dust discharge operation. However, when the fourth pressure value after the dust discharge operation is similar to the third pressure value before the dust discharge operation, the station device 200 may determine that dust discharging from the dustbin 1200 is not performed well. Therefore, the station device 200 may perform again the dust discharge operation (S2340).

In operation S2380, when the fourth pressure value after the dust discharge operation is equal to or greater than the third pressure value before the dust discharge operation (YES of S2360) but the difference between the third pressure value and the fourth pressure value is equal to or greater than the threshold value (NO of S2370), the station device 200 according to an embodiment of the disclosure may control the second step motor to close the cover 10 of the dustbin 1200. That is, when the third pressure value is equal to or greater than the threshold value the fourth pressure value by the threshold value, the station device 200 may determine that dust discharging from the dustbin 1200 is well performed and may complete the dust discharge operation.

Figure 25:
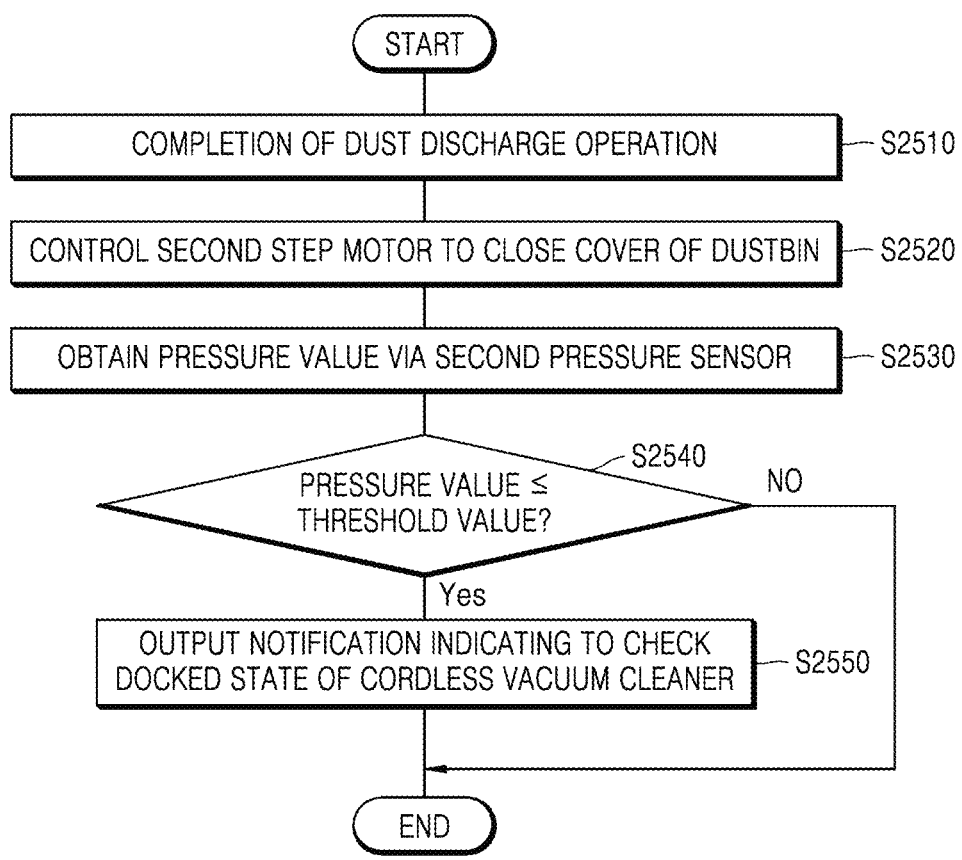
FIG. 25 illustrates a method of identifying a docked state of a cordless vacuum cleaner, according to an embodiment of the disclosure.

FIG. 25 illustrates a method of identifying a docked state of the cordless vacuum cleaner 100 according to an embodiment of the disclosure.

In operation S2510, the station device 200 according to an embodiment of the disclosure may complete a dust discharge operation.

According to an embodiment of the disclosure, the station device 200 may identify a suction force generation pattern corresponding to a preset operation mode, and may allow the first suction motor 1110 of the cordless vacuum cleaner 100 and the second suction motor 207 of the station device 200 to be operated together, thereby performing the dust discharge operation. For example, the station device 200 may transmit, to the cordless vacuum cleaner 100, a control signal for operating the first suction motor 1110 of the station device 100 for dust discharging, and may operate both the first suction motor 1110 and the second suction motor 207, thereby performing the dust discharge operation.

In operation S2520, the station device 200 according to an embodiment of the disclosure may control the second step motor to close the cover 10 of the dustbin 1200.

According to an embodiment of the disclosure, in a case where an automatic close mode in which the cover 10 of the dustbin 1200 is to be automatically closed is set, the station device 200 may control the second step motor to close the cover 10 of the dustbin 1200 when the dust discharge operation is completed.

In operation S2530, the station device 200 according to an embodiment of the disclosure may obtain a pressure value in a flow path via the second pressure sensor 206 after the cover 10 of the dustbin 1200 is closed.

For example, after the dust discharge operation is completed and the cover 10 of the dustbin 1200 is closed, the station device 200 may shortly operate the second suction motor 207 with reference power consumption. Here, the station device 200 may obtain the pressure value in the flow path via the second pressure sensor 206.

In operation S2540, when the pressure value of the second pressure sensor 206 is greater than a threshold value (NO of S2540), the station device 200 according to an embodiment of the disclosure may determine that the docked state of the cordless vacuum cleaner 100 is appropriate.

For example, when the cover 10 of the dustbin 1200 is closed while the cordless vacuum cleaner 100 is appropriately docked on the station device 200, the pressure value measured by the second pressure sensor 206 may be very great. Therefore, when the obtained pressure value is greater than the threshold value, the station device 200 may determine that the docked state of the cordless vacuum cleaner 100 is appropriate.

In operation S2550, when the pressure value of the second pressure sensor 206 is less than the threshold value (YES of S2540), the station device 200 according to an embodiment of the disclosure may output a notification indicating to check the docked state of the cordless vacuum cleaner 100.

For example, when the cordless vacuum cleaner 100 is not appropriately docked on the station device 200, a gap occurs between the cleaner body 1000 of the cordless vacuum cleaner 100 and an inner circumferential surface of the station device 200, such that the pressure value of the second pressure sensor 206 may be decreased. Therefore, when the pressure value of the second pressure sensor 206 is less than the threshold value, the station device 200 may determine that the cordless vacuum cleaner 100 is not appropriately docked on the station device 200.

According to an embodiment of the disclosure, the station device 200 may output the notification indicating to check the docked state of the cordless vacuum cleaner 100, via the output interface of the station device 200, via the output interface of the cordless vacuum cleaner 100, or via the user terminal 400. This will be described with reference to FIG. 26.

Figure 26:
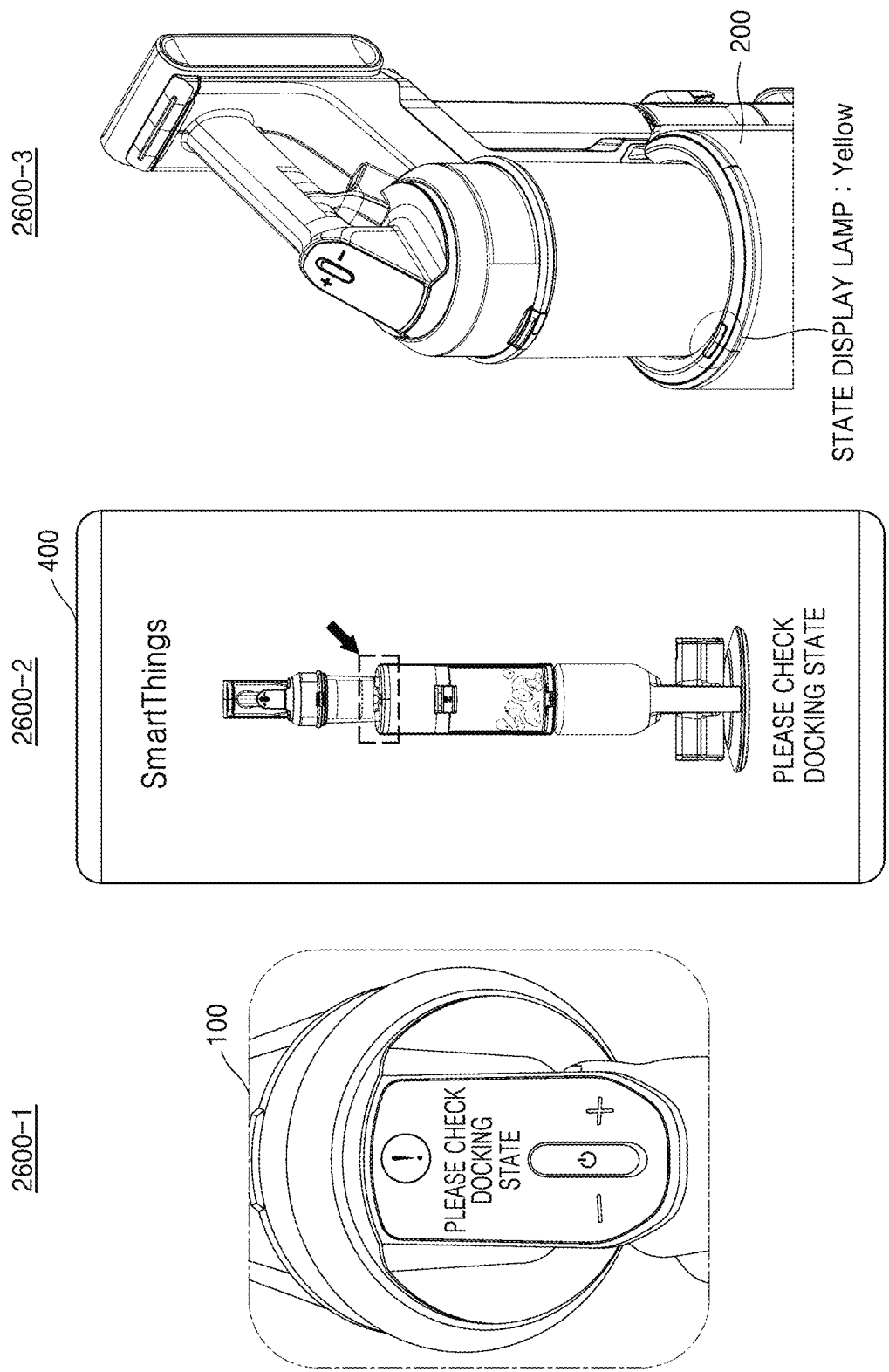
FIG. 26 illustrates an operation of outputting a notification indicating to check a docked state of a cordless vacuum cleaner, according to an embodiment of the disclosure.

FIG. 26 illustrates an operation of outputting a notification indicating to check a docked state of the cordless vacuum cleaner 100 according to an embodiment of the disclosure.

Referring to 2600-1 of FIG. 26, the station device 200 may transmit information indicating that the cordless vacuum cleaner 100 is not appropriately docked on the station device 200, to the cordless vacuum cleaner 100 via short-range wireless communication (e.g.: BLE communication). Here, the cordless vacuum cleaner 100 may control the output interface (e.g.: LCD) to output a notification indicating to check the docked state of the cordless vacuum cleaner 100. A user may check the notification of the cordless vacuum cleaner 100, and may appropriately dock the cordless vacuum cleaner 100 on the station device 200.

Referring to 2600-2 of FIG. 26, the station device 200 may transmit the information indicating that the cordless vacuum cleaner 100 is not appropriately docked on the station device 200, to the server device 300 via long-range wireless communication (e.g.: Wi-Fi communication). Here, the server device 300 may transmit the information indicating that the cordless vacuum cleaner 100 is not appropriately docked on the station device 200, to the user terminal 400 registered in the same account as the station device 200. Based on the information received from the server device 300, the user terminal 400 may output, on an execution window of an application, a notification indicating to check the docked state of the cordless vacuum cleaner 100.

Referring to 2600-3 of FIG. 26, the station device 200 may control the state display lamp (e.g.: LED) to output color (e.g.: yellow color) indicating that the cordless vacuum cleaner 100 is not appropriately docked on the station device 200. When the state display lamp of the station device 200 turns to yellow color, a user may recognize that it is requested to check a docked state of the cordless vacuum cleaner 100.

An embodiment of the disclosure may provide the station device 200 with which dust discharging efficiency of the dustbin 1200 may be improved by both operating the first suction motor 1110 of the cordless vacuum cleaner 100 and the second suction motor 207 of the station device 200 in cooperation with each other.

The station device 200 according to an embodiment of the disclosure may include: the communication interface 201 configured to communicate with the cordless vacuum cleaner 100 including the first suction motor 1110; the second suction motor 207 configured to generate a suction force for sucking up dust in the dustbin 1200 included in the cordless vacuum cleaner 100; the collector 209 configured to collect dust discharged from the dustbin 1200; and the at least one processor 203 configured to control a dust discharge operation for discharging the dust in the dustbin 1200 to the collector 209. The at least one processor 203 may be configured to, based on detection of occurrence of an event requesting dust discharging from the dustbin 1200, transmit, to the cordless vacuum cleaner 100 via the communication interface 201, a control signal for operating the first suction motor 1110 of the cordless vacuum cleaner 100 for the dust discharge operation. The at least one processor 203 may be configured to operate the second suction motor 207 in cooperation with operating of the first suction motor 1110 for the dust discharge operation.

According to an embodiment of the disclosure, the event requesting discharging the dust from the dustbin 1200 may include at least one of an event in which the cordless vacuum cleaner 100 is docked on the station device 200 or an event in which a user selects a dust discharging start button included in the station device 200.

The at least one processor 203 may be configured to receive information about availability or non-availability of the first suction motor 1110 for the dust discharge operation, from the cordless vacuum cleaner 100 via short-range wireless communication. The availability or the non-availability of the first suction motor 1110 for the dust discharge operation may be determined based on at least one of a remaining quantity of the battery 1500 included in the cordless vacuum cleaner 100 or a temperature of the battery 1500.

The at least one processor 203 may be configured to, when the first suction motor 1110 is available for the dust discharge operation, operate the second suction motor 207 together or in cooperation with the first suction motor 1110. The at least one processor 203 may be configured to, when the first suction motor 1110 is not available for the dust discharge operation, operate only the second suction motor 207.

The at least one processor 203 may be configured to identify a preset operation mode associated with the dust discharge operation. The at least one processor 203 may be configured to identify a suction force generation pattern corresponding to the preset operation mode. The at least one processor 203 may be configured to transmit information of the suction force generation pattern to the cordless vacuum cleaner 100 to allow the first suction motor 1110 to operate according to a first operation sequence corresponding to the suction force generation pattern. The at least one processor 203 may be configured to control an operation of the second suction motor 207, according to a second operation sequence corresponding to the suction force generation pattern.

The suction force generation pattern according to an embodiment of the disclosure may be defined based on a combination of at least two selected from an ON/OFF operation of the first suction motor 1110, an ON/OFF operation of the second suction motor 207, a suction force level of the first suction motor 1110, and a suction force level of the second suction motor 207.

The at least one processor 203 may be configured to control the ON/OFF operation of the second suction motor 207 or the suction force level of the second suction motor 207, based on the second operation sequence.

The at least one processor 203 may be configured to obtain an initial pressure value which is measured by the first pressure sensor (1400) of the cordless vacuum cleaner (100) in a state where no dust is present in the dustbin (1200). The at least one processor 203 may be configured to receive, from the cordless vacuum cleaner 100, a pressure value which is measured by the first pressure sensor 1400 of the cordless vacuum cleaner 100 after the cover 10 of the dustbin 1200 is closed in response to the dust discharge operation being completed. The at least one processor 203 may be configured to perform again the dust discharge operation when a difference between the initial pressure value and the received pressure value is equal to or greater than a first threshold value.

The at least one processor 203 may be configured to identify that the cover 10 of the dustbin 1200 is open when the difference between the initial pressure value and the received pressure value is equal to or greater than a second threshold value which is greater than the first threshold value. The at least one processor 203 may be configured to output a notification indicating that the cover 10 of the dustbin 1200 is open.

The at least one processor 203 may be configured to receive, from the cordless vacuum cleaner 100, a first pressure value which is measured by the first pressure sensor 1400 of the cordless vacuum cleaner 100 before opening the cover 10 of the dustbin 1200 for the dust discharge operation. The at least one processor 203 may be configured to receive a second pressure value which is measured by the first pressure sensor 1400 of the cordless vacuum cleaner 100 after the cover 10 of the dustbin 1200 is closed in response to the dust discharge operation being completed. The at least one processor 203 may be configured to perform again the dust discharge operation when a difference between the first pressure value and the second pressure value is less than a third threshold value.

The at least one processor 203 may be configured to identify that the cover 10 of the dustbin 1200 is open when the second pressure value is less than the first pressure value. The at least one processor 203 may be configured to output a notification indicating that the cover 10 of the dustbin 1200 is open.

The at least one processor 203 may be configured to obtain a third pressure value via the second pressure sensor 206 of the station device 200 before the dust discharge operation. The at least one processor 203 may be configured to obtain a fourth pressure value via the second pressure sensor 206 of the station device 200 after completion of the dust discharge operation. The at least one processor 203 may be configured to perform again the dust discharge operation when a difference between the third pressure value and the fourth pressure value is less than a fourth threshold value.

The at least one processor 203 may be configured to, when the fourth pressure value is smaller than the third pressure value, output a notification indicating to check a state of a dust bag included in the collector 209.

The at least one processor 203 may be configured to control the step motor to close the cover 10 of the dustbin 1200 in response to the dust discharge operation being completed. The at least one processor 203 may be configured to obtain a pressure value in a flow path via the second pressure sensor 206 of the station device 200 after a cover of the dustbin 1200 is closed. The at least one processor 203 may be configured to output a notification indicating to check a docked state of the cordless vacuum cleaner 100 when the pressure value obtained in the flow path is less than a fifth threshold value.

An operating method of the station device 200 for discharging dust from a cordless vacuum cleaner 100 according to an embodiment of the disclosure may include detecting occurrence of an event requesting discharging dust from the dustbin 1200 included in the cordless vacuum cleaner 100 to the station device 200 (S710), and performing a dust discharge operation for discharging dust in the dustbin 1200 to a collector 209 of the station device based on detecting of the occurrence of the event (S730). The performing the dust discharge operation may include transmitting, to the cordless vacuum cleaner 100 via short-range wireless communication, a control signal for operating the first suction motor 1110 of the cordless vacuum cleaner 100 for the dust discharge operation (S720), and operating the second suction motor 207 of the station device 200 in cooperation with the first suction motor 1110.

The operating method of the station device 200 may further include receiving, by the communication interface 201 of the station device 200 via short-range wireless communication, information about availability or non-availability of the first suction motor 1110 for the dust discharge operation. The availability or the non-availability of the first suction motor 1110 for the dust discharge operation may be determined based on at least one of a remaining quantity of the battery 1500 included in the cordless vacuum cleaner 100 or a temperature of the battery 1500.

The operating method of the station device 200 may include identifying a preset operation mode associated with the dust discharge operation (S1120). The operating method of the station device 200 may include identifying a suction force generation pattern corresponding to the preset operation mode (S1130). The operating method of the station device 200 may include transmitting information of the suction force generation pattern to the cordless vacuum cleaner 100 to allow the first suction motor 1110 to operate according to a first operation sequence corresponding to the suction force generation pattern (S1140). The operating method of the station device 200 may include controlling an operation of the second suction motor 207, according to a second operation sequence corresponding to the suction force generation pattern (S1160).

The operating method of the station device 200 may include obtaining an initial pressure value which is measured by the first pressure sensor 1400 of the cordless vacuum cleaner 100 in a state where no dust is present in the dustbin 1200. The operating method of the station device 200 may include receiving, from the cordless vacuum cleaner 100, a pressure value which is measured by the first pressure sensor 1400 of the cordless vacuum cleaner 100 after the cover 10 of the dustbin 1200 is closed in response to the dust discharge operation being completed. The operating method of the station device 200 may include performing again the dust discharge operation when a difference between the initial pressure value and the received pressure value is equal to or greater than a first threshold value.

The operating method of the station device 200 may include obtaining a third pressure value via the second pressure sensor 206 of the station device 200 before the dust discharge operation. The operating method of the station device 200 may include obtaining a fourth pressure value via the second pressure sensor 206 of the station device 200 after completion of the dust discharge operation. The operating method of the station device 200 may include performing again the dust discharge operation when a difference between the third pressure value and the fourth pressure value is less than a threshold value.

A machine-readable storage medium may be provided in the form of a non-transitory storage medium. In this regard, the term "non-transitory storage medium" merely means that the storage medium is a tangible device, and does not include a signal (e.g., an electromagnetic wave), and this term does not differentiate between a case where data is semi-permanently stored in the storage medium and a case where the data is temporarily stored in the storage medium. For example, the non-transitory storage medium may include a buffer in which data is temporarily stored.

According to an embodiment of the disclosure, the method according to any embodiment disclosed in the present specification may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices (e.g., smart phones) directly. For electronic distribution, at least a part of the computer program product (e.g., a downloadable app) may be temporarily generated or be at least temporarily stored in a machine-readable storage medium, e.g., a server of a manufacturer, a server of an application store, or a memory of a relay server.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A station device to which dust is discharged from a cordless vacuum cleaner, the station device comprising:
    a communication interface configured to communicate with the cordless vacuum cleaner comprising a first suction motor;
    a second suction motor configured to generate a suction force for sucking up dust in a dustbin included in the cordless vacuum cleaner;
    a collector configured to collect the dust discharged from the dustbin; and
    at least one processor configured to control a dust discharge operation for discharging the dust in the dustbin to the collector,
    wherein the at least one processor is configured to
    based on detection of occurrence of an event requesting discharging dust from the dustbin, transmit, to the cordless vacuum cleaner via the communication interface, a control signal for operating the first suction motor of the cordless vacuum cleaner for the dust discharge operation, and
    operate the second suction motor in cooperation with the first suction motor for the dust discharge operation.

2. The station device of claim 1, wherein the event requesting discharging the dust from the dustbin comprises at least one of an event in which the cordless vacuum cleaner is docked on the station device or an event in which a user selects a dust discharging start button of the station device.

3. The station device of claim 1, wherein
    the at least one processor is further configured to control the communication interface to receive information about availability or non-availability of the first suction motor for the dust discharge operation, from the cordless vacuum cleaner via short-range wireless communication, and
    the availability or non-availability of the first suction motor for the dust discharge operation is determined based on at least one of a remaining quantity of a battery included in the cordless vacuum cleaner or a temperature of the battery.

4. The station device of claim 3, wherein the at least one processor is further configured to,
    when the first suction motor is available for the dust discharge operation, operate the second suction motor in cooperation with the first suction motor, and
    when the first suction motor is not available for the dust discharge operation, operate only the second suction motor.

5. The station device of claim 1, wherein the at least one processor is further configured to
    identify a preset operation mode associated with the dust discharge operation,
    identify a suction force generation pattern corresponding to the preset operation mode,
    transmit information of the suction force generation pattern to the cordless vacuum cleaner to allow the first suction motor to operate according to a first operation sequence corresponding to the suction force generation pattern, and
    control an operation of the second suction motor, according to a second operation sequence corresponding to the suction force generation pattern.

6. The station device of claim 5, wherein the suction force generation pattern is defined based on a combination of at least two selected from an ON/OFF operation of the first suction motor, an ON/OFF operation of the second suction motor, a suction force level of the first suction motor, and a suction force level of the second suction motor.

7. The station device of claim 6, wherein the at least one processor is further configured to control the ON/OFF operation of the second suction motor or the suction force level of the second suction motor, based on the second operation sequence corresponding to the suction force generation pattern.

8. The station device of claim 1, wherein the at least one processor is further configured to
    obtain an initial pressure value which is measured by a first pressure sensor of the cordless vacuum cleaner in a state where no dust is present in the dustbin,
    receive, from the cordless vacuum cleaner, a pressure value which is measured by the first pressure sensor of the cordless vacuum cleaner after a cover of the dustbin is closed in response to the dust discharge operation being completed, and
    perform again the dust discharge operation when a difference between the initial pressure value and the pressure value is equal to or greater than a first threshold value.

9. The station device of claim 8, wherein the at least one processor is further configured to
    identify that the cover of the dustbin is open when the difference between the initial pressure value and the pressure value received from the cordless vacuum cleaner is equal to or greater than a second threshold value which is greater than the first threshold value, and output a notification indicating that the cover of the dustbin is open.

10. The station device of claim 1, wherein the at least one processor is further configured to
receive, from the cordless vacuum cleaner, a first pressure value which is measured by a first pressure sensor of the cordless vacuum cleaner before opening a cover of the dustbin for the dust discharge operation,
receive a second pressure value which is measured by the first pressure sensor of the cordless vacuum cleaner after the cover of the dustbin is closed in response to the dust discharge operation being completed, and
perform again the dust discharge operation when a difference between the first pressure value and the second pressure value is less than a third threshold value.

11. The station device of claim 10, wherein the at least one processor is further configured to
identify that the cover of the dustbin is open when the second pressure value is less than the first pressure value, and
output a notification indicating that the cover of the dustbin is open.

12. The station device of claim 1, wherein the at least one processor is further configured to
obtain a third pressure value via a second pressure sensor of the station device before the dust discharge operation,
obtain a fourth pressure value via the second pressure sensor of the station device after completion of the dust discharge operation, and
perform again the dust discharge operation when a difference between the third pressure value and the fourth pressure value is less than a fourth threshold value.

13. The station device of claim 12, wherein the at least one processor is further configured to, when the fourth pressure value is less than the third pressure value, output a notification indicating to check a state of a dust bag included in the collector.

14. The station device of claim 1, wherein the at least one processor is further configured to
control a step motor to close a cover of the dustbin in response to the dust discharge operation being completed,
obtain a pressure value in a flow path via a second pressure sensor of the station device after the cover of the dustbin is closed, and
output a notification indicating to check a docked state of the cordless vacuum cleaner when the pressure value obtained in the flow path is less than a fifth threshold value.

* * * * *